(12) United States Patent
Fukaya et al.

(10) Patent No.: US 10,886,787 B2
(45) Date of Patent: Jan. 5, 2021

(54) POWER SUPPLY APPARATUS CAPABLE OF SUPPLYING POWER TO MULTIPLE POWER RECEIVING APPARATUSES, CONTROL METHOD THEREOF, AND STORAGE MEDIUM

(71) Applicant: CANON KABUSHIKI KAISHA, Tokyo (JP)

(72) Inventors: Yudai Fukaya, Kawasaki (JP); Shogo Hachiro, Warabi (JP); Katsuya Nakano, Yokohama (JP); Jun Suzuki, Kawasaki (JP); Koji Nishimori, Kawasaki (JP); Yoshihiko Okamoto, Yokohama (JP)

(73) Assignee: CANON KABUSHIKI KAiSHA, Tokyo (JP)

( * ) Notice: Subject to any disclaimer, the term of this patent is extended or adjusted under 35 U.S.C. 154(b) by 241 days.

(21) Appl. No.: 15/984,769

(22) Filed: May 21, 2018

(65) Prior Publication Data
US 2018/0342905 A1 Nov. 29, 2018

(30) Foreign Application Priority Data

May 24, 2017 (JP) ................................ 2017-102961

(51) Int. Cl.
*H02J 50/20* (2016.01)
*H02J 50/40* (2016.01)
(Continued)

(52) U.S. Cl.
CPC .............. *H02J 50/20* (2016.02); *H02J 50/40* (2016.02); *H02J 7/0047* (2013.01); *H02J 50/80* (2016.02)

(58) Field of Classification Search
CPC ....... H02J 50/20–27; H02J 50/40; H02J 50/80
See application file for complete search history.

(56) References Cited

U.S. PATENT DOCUMENTS 10,148,097 B1 * 12/2018 Leabman ............. H04B 5/0037
2007/0173214 A1 * 7/2007 Mickle ................. H04B 1/1607
455/127.1

(Continued)

FOREIGN PATENT DOCUMENTS

JP  2010-530210 A  9/2010
WO 2008/156571 A2 12/2008

*Primary Examiner* — Rexford N Barnie
*Assistant Examiner* — David A Shiao
(74) *Attorney, Agent, or Firm* — Cowan, Liebowitz & Latman, P.C.

(57) ABSTRACT

A power supply apparatus, that can wirelessly supply power to a plurality of power receiving apparatuses, comprises: a plurality of antennae; and a control unit, wherein the control unit carries out control so that information pertaining to sending timings of calibration signals is sent, via the plurality of antennae, to the plurality of power receiving apparatuses; the control unit carries out control so that calibration signals sent from the plurality of power receiving apparatuses are received via the plurality of antennae; and the control unit controls an output of each antenna based on the calibration signals sent from the plurality of power receiving apparatuses so that power is supplied wirelessly to the plurality of power receiving apparatuses from corresponding ones of the plurality of antennae.

16 Claims, 42 Drawing Sheets

(51) Int. Cl.
*H02J 50/80* (2016.01)
*H02J 7/00* (2006.01)

(56) References Cited

U.S. PATENT DOCUMENTS

| | | | |
|---|---|---|---|
| 2008/0309452 A1* | 12/2008 | Zeine | H02J 50/20 |
| | | | 340/5.1 |
| 2013/0193756 A1* | 8/2013 | Fukaya | H02J 50/12 |
| | | | 307/29 |
| 2014/0223204 A1* | 8/2014 | Haraguchi | H02J 7/025 |
| | | | 713/300 |
| 2016/0359376 A1* | 12/2016 | Zeine | H04W 4/12 |
| 2016/0359377 A1* | 12/2016 | Zeine | H02J 50/40 |
| 2016/0359379 A1* | 12/2016 | Zeine | H02J 7/045 |
| 2019/0140487 A1* | 5/2019 | Zeine | H02J 50/90 |

* cited by examiner

FIG. 4A

WHEN NUMBER OF POWER RECEIVING DEVICES HAS INCREASED AND EXCEEDS 12

| ITEM NUMBER | POWER RECEIVING DEVICE NAME | TIMING GROUP | FREQUENCY | POWER SUPPLY REQUIRED |
|---|---|---|---|---|
| 1 | POWER RECEIVING DEVICE 1 | FIRST TIMING | FREQUENCY 1 | POWER SUPPLY REQUIRED |
| 2 | POWER RECEIVING DEVICE 2 | FIRST TIMING | FREQUENCY 2 | POWER SUPPLY REQUIRED |
| ⋮ | ⋮ | ⋮ | ⋮ | ⋮ |
| 12 | POWER RECEIVING DEVICE 12 | FIRST TIMING | FREQUENCY 12 | POWER SUPPLY REQUIRED |
| 13 | POWER RECEIVING DEVICE 13 | SECOND TIMING | FREQUENCY 1 | POWER SUPPLY REQUIRED |
| 14 | POWER RECEIVING DEVICE 14 | SECOND TIMING | FREQUENCY 2 | POWER SUPPLY REQUIRED |
| 15 | POWER RECEIVING DEVICE 15 | SECOND TIMING | FREQUENCY 3 | POWER SUPPLY REQUIRED |

FIG. 4B

WHEN NUMBER OF POWER RECEIVING DEVICES HAS DECREASED AND IS LESS THAN 12

| ITEM NUMBER | POWER RECEIVING DEVICE NAME | TIMING GROUP | FREQUENCY | POWER SUPPLY REQUIRED |
|---|---|---|---|---|
| 1 | POWER RECEIVING DEVICE 1 | FIRST TIMING | FREQUENCY 1 | POWER SUPPLY REQUIRED |
| 2 | POWER RECEIVING DEVICE 13 | FIRST TIMING | FREQUENCY 2 | POWER SUPPLY REQUIRED |
| ⋮ | ⋮ | ⋮ | ⋮ | ⋮ |
| 11 | POWER RECEIVING DEVICE 12 | FIRST TIMING | FREQUENCY 12 | POWER SUPPLY REQUIRED |

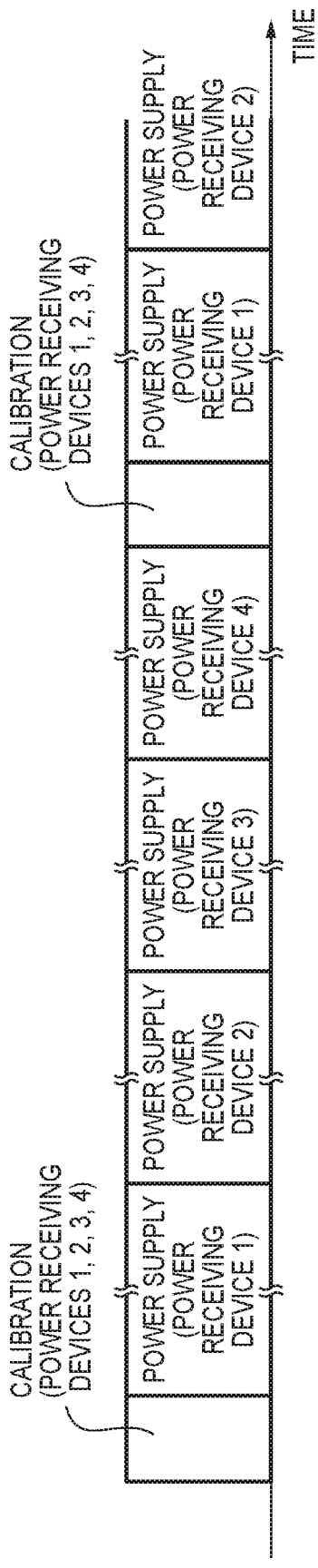
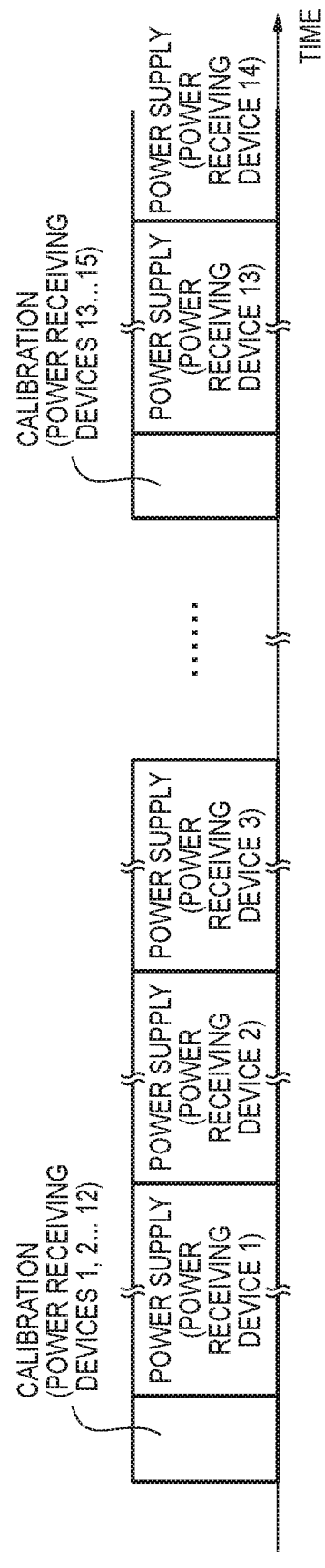

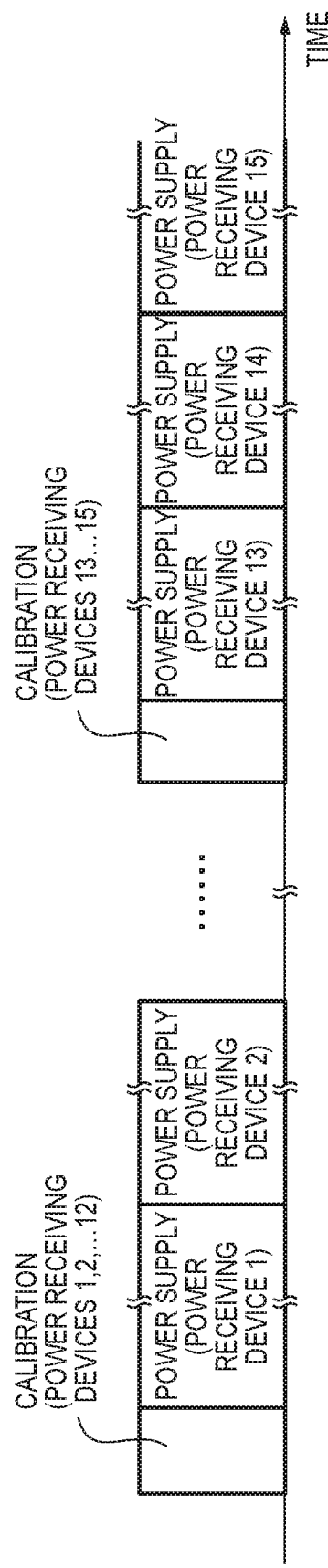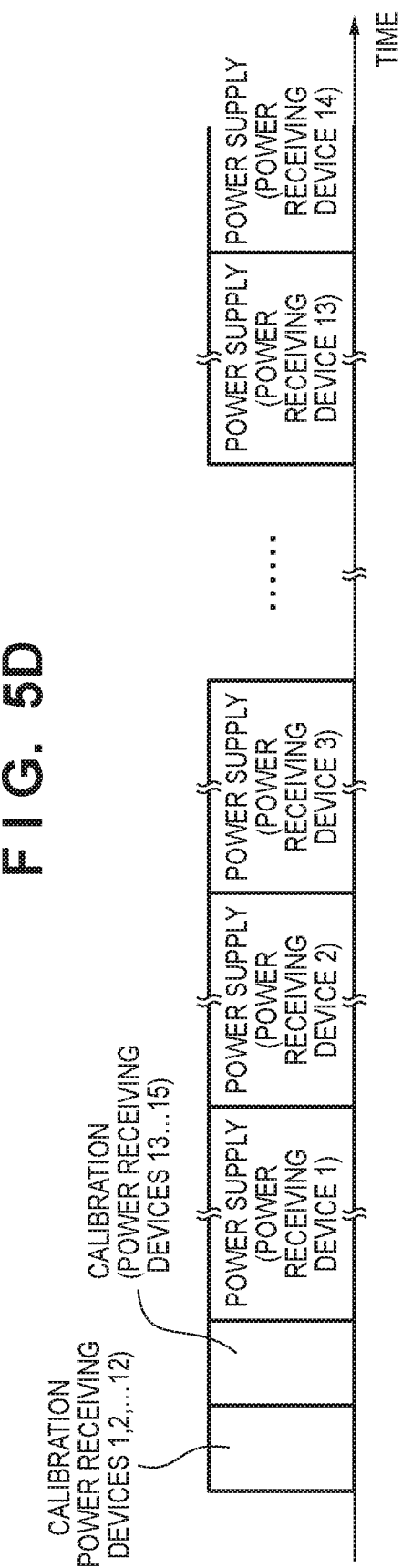

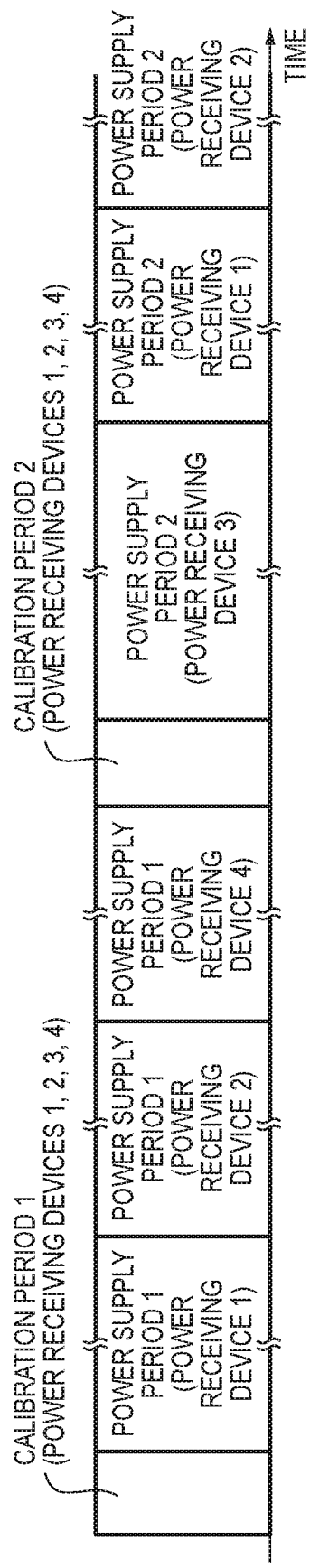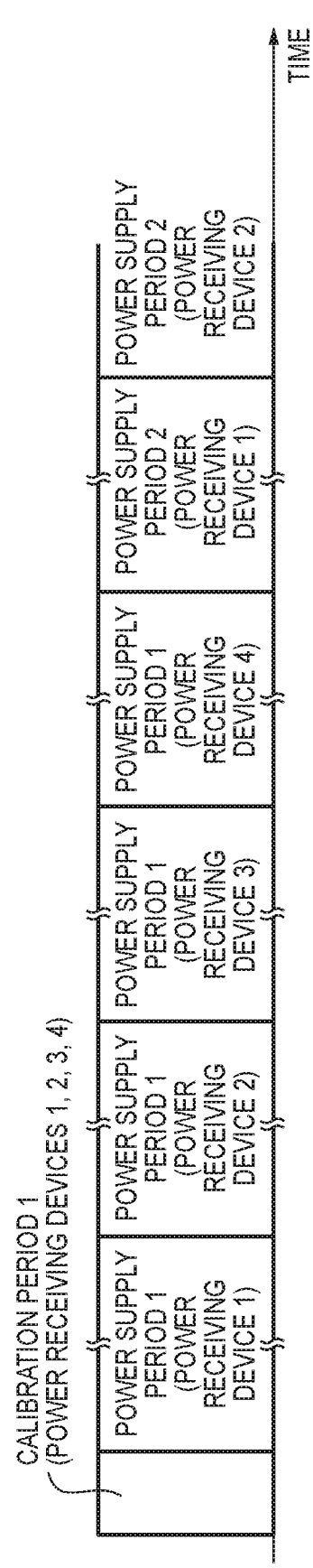

F I G. 10A
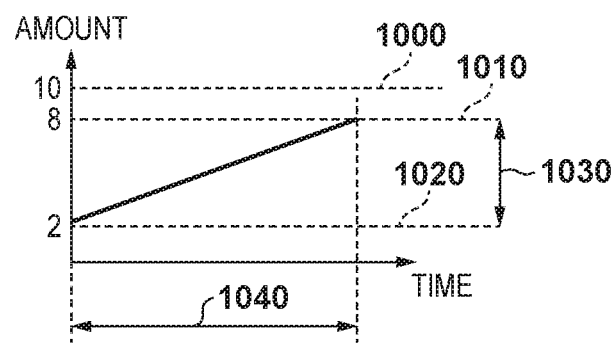

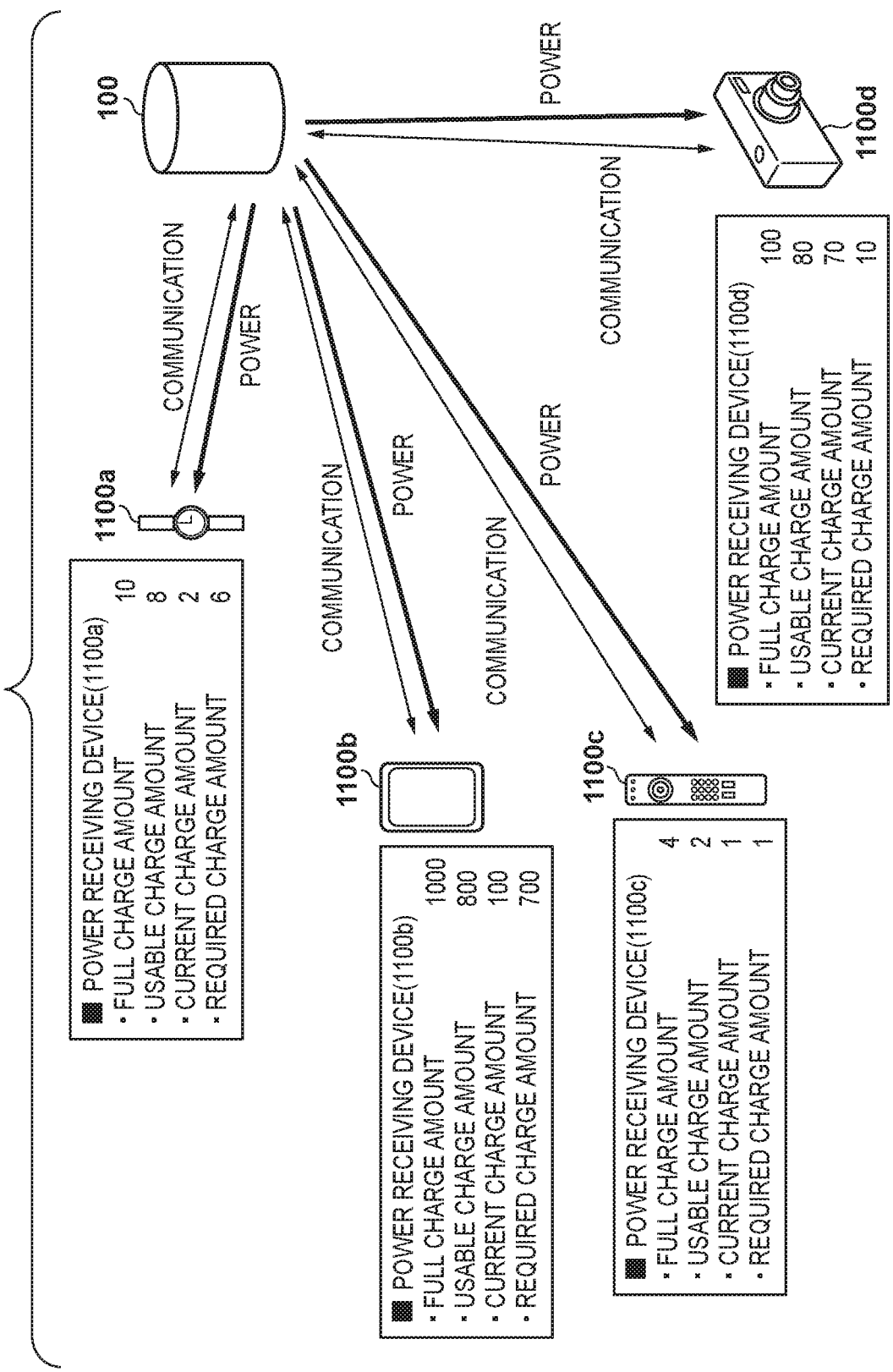

F I G. 12

| ITEM NUMBER | POWER RECEIVING DEVICE NAME | TIMING GROUP | FREQUENCY | CHARGE AMOUNT INFORMATION | REQUIRED CHARGE TIME | POWER SUPPLY ORDER |
|---|---|---|---|---|---|---|
| 1 | POWER RECEIVING DEVICE 1 | FIRST TIMING | FREQUENCY 1 | 10 | 0.06h | 2 |
| 2 | POWER RECEIVING DEVICE 2 | FIRST TIMING | FREQUENCY 2 | 1000 | 7h | 4 |
| 3 | POWER RECEIVING DEVICE 3 | FIRST TIMING | FREQUENCY 3 | 4 | 0.01h | 1 |
| 4 | POWER RECEIVING DEVICE 4 | FIRST TIMING | FREQUENCY 4 | 100 | 0.1h | 3 |

F I G. 15A

| POWER RECEIVING DEVICE NAME | POWER SUPPLY EFFICIENCY VALUE |
|---|---|

1500

F I G. 15B

| POWER RECEIVING DEVICE 1200a | 0.5 | 1500a |
| POWER RECEIVING DEVICE 1200b | 0.7 | 1500b |
| POWER RECEIVING DEVICE 1200c | 0.01 | 1500c |
| POWER RECEIVING DEVICE 1200d | 0.4 | 1500d |

F I G. 15C

| POWER RECEIVING DEVICE 1200b | 0.7 | 1500b |
| POWER RECEIVING DEVICE 1200a | 0.5 | 1500a |
| POWER RECEIVING DEVICE 1200d | 0.4 | 1500d |
| POWER RECEIVING DEVICE 1200c | 0.01 | 1500c |

F I G. 15D

| POWER RECEIVING DEVICE 1200b | 0.7 | 1500b |
| POWER RECEIVING DEVICE 1200a | 0.5 | 1500a |
| POWER RECEIVING DEVICE 1200d | 0.4 | 1500d |

FIG. 17

| NODE NUMBER | POWER RECEIVING DEVICE | GROUP | INDEPENDENT PERMISSION | OPERATING NUMBER | POINTER |
|---|---|---|---|---|---|
| 1 | POWER RECEIVING DEVICE 1 | A | 1 | 3 | ADDRESS OF NODE 2 |
| 2 | POWER RECEIVING DEVICE 2 | D | 0 | 2 | ADDRESS OF NODE 3 |
| 3 | POWER RECEIVING DEVICE 3 | B | 0 | 2 | ADDRESS OF NODE 4 |
| 4 | POWER RECEIVING DEVICE 4 | A | 1 | 3 | ADDRESS OF NODE 5 |
| 5 | POWER RECEIVING DEVICE 5 | C | 1 | 2 | ADDRESS OF NODE 6 |
| 6 | POWER RECEIVING DEVICE 6 | A | 1 | 3 | ADDRESS OF NODE 7 |
| 7 | POWER RECEIVING DEVICE 7 | B | 0 | 2 | null |

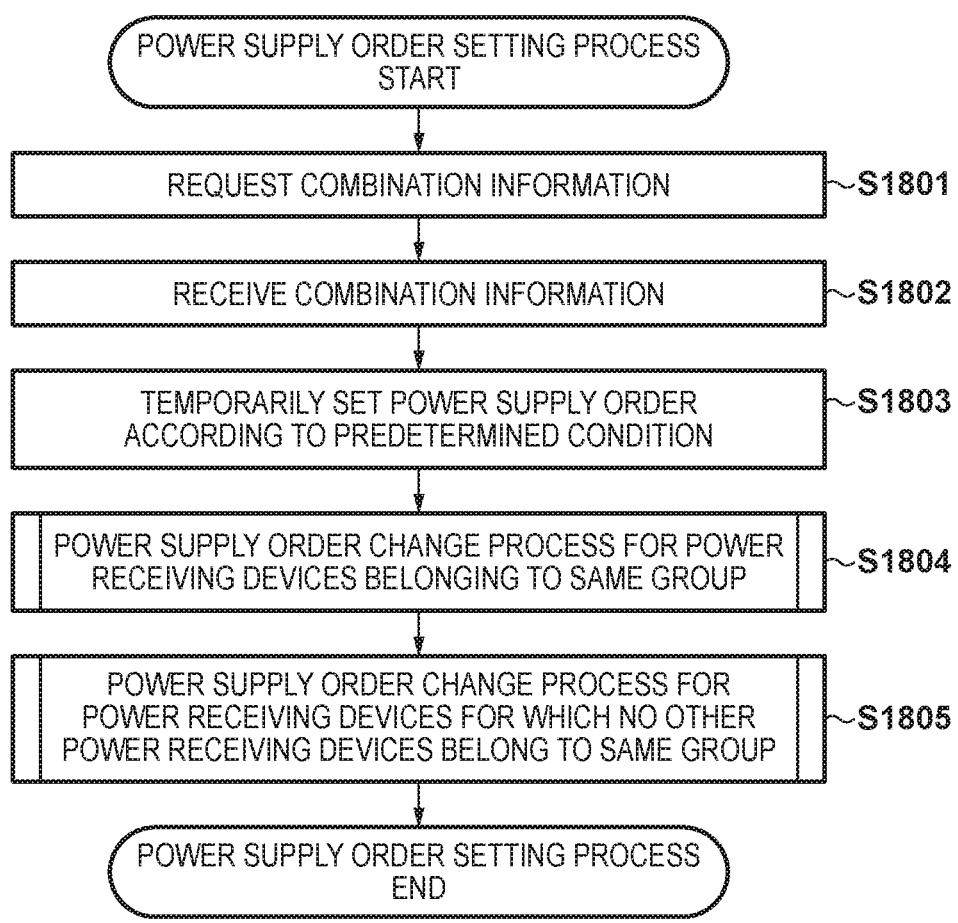

FIG. 21A

LIST AFTER POWER SUPPLY ORDER CHANGE PROCESS FOR POWER RECEIVING DEVICES BELONGING TO SAME GROUP ENDS

| NODE NUMBER | POWER RECEIVING DEVICE | GROUP | INDEPENDENT PERMISSION | OPERATING NUMBER | POINTER |
|---|---|---|---|---|---|
| 1 | POWER RECEIVING DEVICE 1 | A | 1 | 3 | ADDRESS OF NODE 4 |
| 4 | POWER RECEIVING DEVICE 4 | A | 1 | 3 | ADDRESS OF NODE 6 |
| 6 | POWER RECEIVING DEVICE 6 | A | 1 | 3 | ADDRESS OF NODE 2 |
| 2 | POWER RECEIVING DEVICE 2 | D | 0 | 2 | ADDRESS OF NODE 3 |
| 3 | POWER RECEIVING DEVICE 1 | B | 0 | 2 | ADDRESS OF NODE 7 |
| 7 | POWER RECEIVING DEVICE 4 | B | 0 | 2 | ADDRESS OF NODE 5 |
| 5 | POWER RECEIVING DEVICE 5 | C | 1 | 2 | null |

FIG. 21B

LIST AFTER POWER SUPPLY ORDER CHANGE PROCESS FOR POWER RECEIVING DEVICES FOR WHICH NO OTHER POWER RECEIVING DEVICES BELONG TO SAME GROUP ENDS

| NODE NUMBER | POWER RECEIVING DEVICE | GROUP | INDEPENDENT PERMISSION | OPERATING NUMBER | POINTER |
|---|---|---|---|---|---|
| 1 | POWER RECEIVING DEVICE 1 | A | 1 | 3 | ADDRESS OF NODE 4 |
| 4 | POWER RECEIVING DEVICE 4 | A | 1 | 3 | ADDRESS OF NODE 6 |
| 6 | POWER RECEIVING DEVICE 6 | A | 1 | 3 | ADDRESS OF NODE 3 |
| 3 | POWER RECEIVING DEVICE 3 | B | 0 | 2 | ADDRESS OF NODE 7 |
| 7 | POWER RECEIVING DEVICE 7 | B | 0 | 2 | ADDRESS OF NODE 5 |
| 5 | POWER RECEIVING DEVICE 5 | C | 1 | 2 | ADDRESS OF NODE 2 |
| 2 | POWER RECEIVING DEVICE 2 | D | 0 | 2 | null |

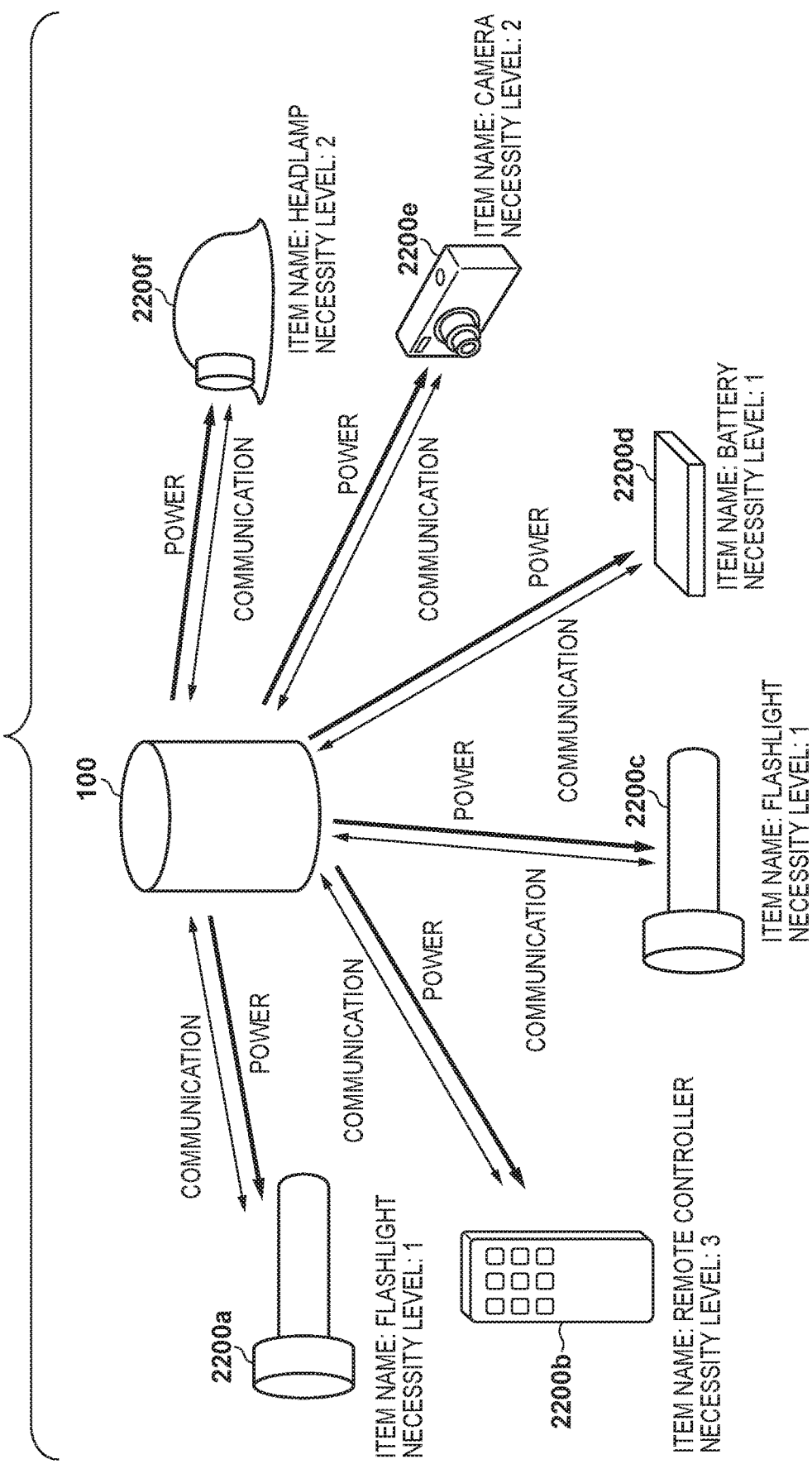

FIG. 24AA

| POWER RECEIVING DEVICE NAME | ITEM INFORMATION | EMERGENCY SITUATION NECESSITY LEVEL INFORMATION |
|---|---|---|

| POWER RECEIVING DEVICE 2200a | FLASHLIGHT | LEVEL 1 | ~2400a |
| POWER RECEIVING DEVICE 2200b | REMOTE CONTROLLER | LEVEL 3 | ~2400b |
| POWER RECEIVING DEVICE 2200c | FLASHLIGHT | LEVEL 1 | ~2400c |
| POWER RECEIVING DEVICE 2200d | BATTERY | LEVEL 1 | ~2400d |
| POWER RECEIVING DEVICE 2200e | CAMERA | LEVEL 2 | ~2400e |
| POWER RECEIVING DEVICE 2200f | HEADLAMP | LEVEL 2 | ~2400f |

FIG. 24AC

| POWER RECEIVING DEVICE 2200a | FLASHLIGHT | LEVEL 1 | ~2400a |
| POWER RECEIVING DEVICE 2200c | FLASHLIGHT | LEVEL 1 | ~2400c |
| POWER RECEIVING DEVICE 2200d | BATTERY | LEVEL 1 | ~2400d |
| POWER RECEIVING DEVICE 2200e | CAMERA | LEVEL 2 | ~2400e |
| POWER RECEIVING DEVICE 2200f | HEADLAMP | LEVEL 2 | ~2400f |
| POWER RECEIVING DEVICE 2200b | REMOTE CONTROLLER | LEVEL 3 | ~2400b |

FIG. 24B

| POWER RECEIVING DEVICE 2200a | FLASHLIGHT | LEVEL 1 | ~2400a |
| POWER RECEIVING DEVICE 2200d | BATTERY | LEVEL 1 | ~2400d |
| POWER RECEIVING DEVICE 2200c | FLASHLIGHT | LEVEL 1 | ~2400c |
| POWER RECEIVING DEVICE 2200e | CAMERA | LEVEL 2 | ~2400e |
| POWER RECEIVING DEVICE 2200f | HEADLAMP | LEVEL 2 | ~2400f |
| POWER RECEIVING DEVICE 2200b | REMOTE CONTROLLER | LEVEL 3 | ~2400b |

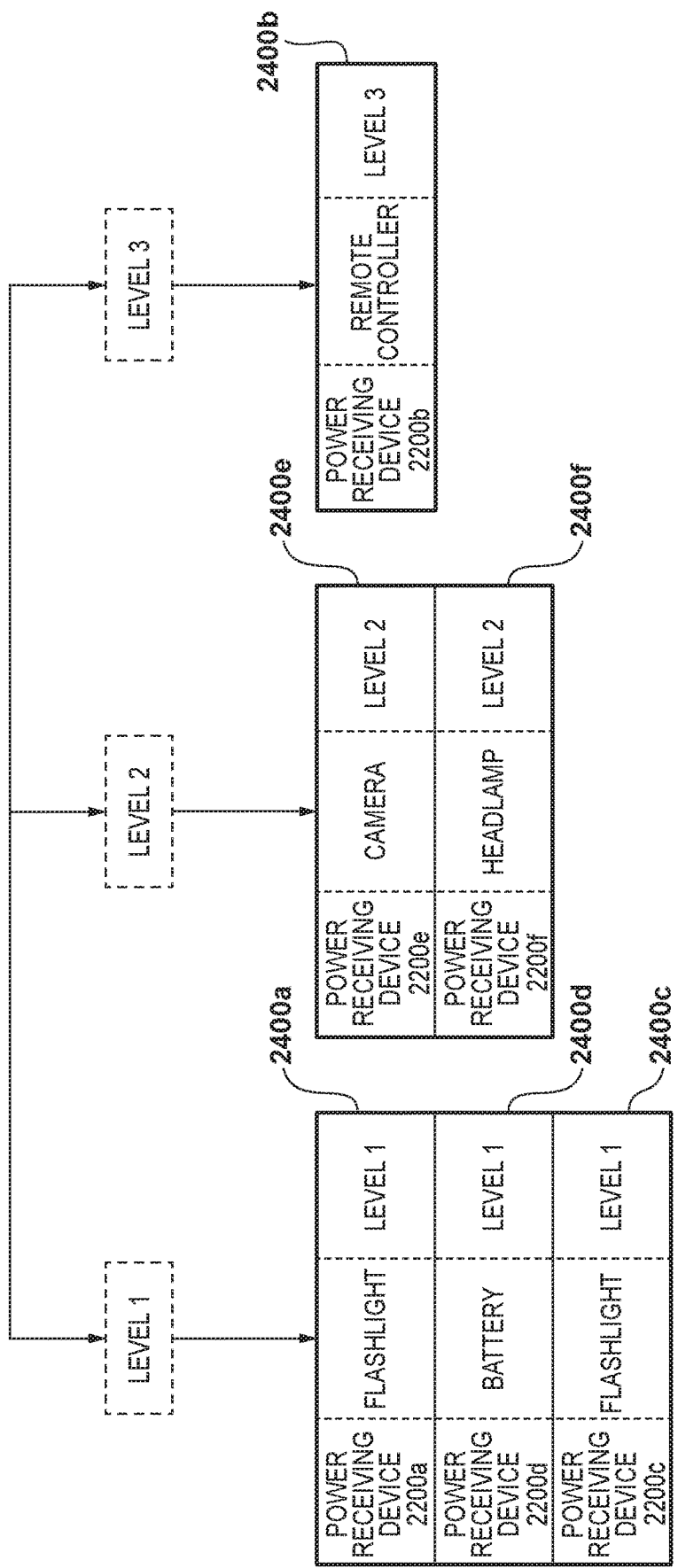

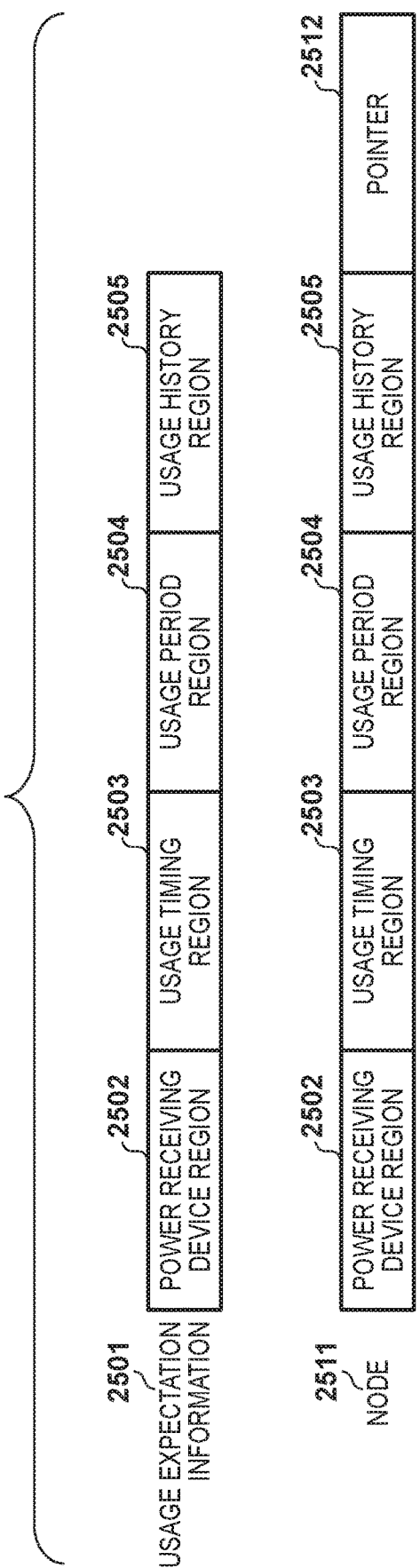

FIG. 27

| NODE NUMBER | POWER RECEIVING DEVICE | USAGE TIMING | USAGE PERIOD | USAGE HISTORY | POINTER |
|---|---|---|---|---|---|
| 1 | POWER RECEIVING DEVICE 1 | 10 HOURS | 1 HOUR | 1 HOUR | ADDRESS OF NODE 2 |
| 2 | POWER RECEIVING DEVICE 2 | 0.1 HOURS | 2 HOURS | 2 HOURS | ADDRESS OF NODE 3 |
| 3 | POWER RECEIVING DEVICE 3 | 0 HOURS | 0 HOURS | 3 HOURS | ADDRESS OF NODE 4 |
| 4 | POWER RECEIVING DEVICE 4 | 10 HOURS | 2 HOURS | 7 HOURS | ADDRESS OF NODE 5 |
| 5 | POWER RECEIVING DEVICE 5 | 0 HOURS | 0 HOURS | 7 HOURS | ADDRESS OF NODE 6 |
| 6 | POWER RECEIVING DEVICE 6 | 5 HOURS | 1 HOUR | 1 HOUR | null |

F I G. 32A

LIST AFTER END OF POWER SUPPLY ORDER CHANGE PROCESS FOR POWER RECEIVING DEVICES IN ORDER OF CLOSEST USAGE TIMING

| NODE NUMBER | POWER RECEIVING DEVICE | USAGE TIMING | USAGE PERIOD | USAGE HISTORY | POINTER |
|---|---|---|---|---|---|
| 3 | POWER RECEIVING DEVICE 3 | 0 HOURS | 0 HOURS | 3 HOURS | ADDRESS OF NODE 5 |
| 5 | POWER RECEIVING DEVICE 5 | 0 HOURS | 0 HOURS | 7 HOURS | ADDRESS OF NODE 2 |
| 2 | POWER RECEIVING DEVICE 2 | 0.1 HOURS | 2 HOURS | 2 HOURS | ADDRESS OF NODE 6 |
| 6 | POWER RECEIVING DEVICE 6 | 5 HOURS | 1 HOUR | 1 HOUR | ADDRESS OF NODE 1 |
| 1 | POWER RECEIVING DEVICE 1 | 10 HOURS | 1 HOUR | 7 HOURS | ADDRESS OF NODE 4 |
| 4 | POWER RECEIVING DEVICE 4 | 10 HOURS | 2 HOURS | 1 HOUR | null |

F I G. 32B

LIST AFTER END OF POWER SUPPLY ORDER CHANGE PROCESS FOR POWER RECEIVING DEVICES WHERE USAGE TIMING IS WITHIN PREDETERMINED AMOUNT OF TIME

| NODE NUMBER | POWER RECEIVING DEVICE | USAGE TIMING | USAGE PERIOD | USAGE HISTORY | POINTER |
|---|---|---|---|---|---|
| 6 | POWER RECEIVING DEVICE 6 | 5 HOURS | 1 HOUR | 1 HOUR | ADDRESS OF NODE 1 |
| 1 | POWER RECEIVING DEVICE 1 | 10 HOURS | 1 HOUR | 7 HOURS | ADDRESS OF NODE 4 |
| 4 | POWER RECEIVING DEVICE 4 | 10 HOURS | 2 HOURS | 1 HOUR | ADDRESS OF NODE 2 |
| 2 | POWER RECEIVING DEVICE 2 | 0.1 HOURS | 2 HOURS | 2 HOURS | ADDRESS OF NODE 5 |
| 5 | POWER RECEIVING DEVICE 5 | 0 HOURS | 0 HOURS | 7 HOURS | ADDRESS OF NODE 3 |
| 3 | POWER RECEIVING DEVICE 3 | 0 HOURS | 0 HOURS | 3 HOURS | null |

FIG. 32C

LIST AFTER END OF POWER SUPPLY ORDER CHANGE PROCESS FOR POWER RECEIVING DEVICES HAVING SAME USAGE TIMING

| NODE NUMBER | POWER RECEIVING DEVICE | USAGE TIMING | USAGE PERIOD | USAGE HISTORY | POINTER |
|---|---|---|---|---|---|
| 6 | POWER RECEIVING DEVICE 6 | 5 HOURS | 1 HOUR | 1 HOUR | ADDRESS OF NODE 4 |
| 4 | POWER RECEIVING DEVICE 4 | 10 HOURS | 2 HOURS | 7 HOURS | ADDRESS OF NODE 1 |
| 1 | POWER RECEIVING DEVICE 1 | 10 HOURS | 1 HOUR | 1 HOUR | ADDRESS OF NODE 2 |
| 2 | POWER RECEIVING DEVICE 2 | 0.1 HOURS | 2 HOURS | 2 HOURS | ADDRESS OF NODE 3 |
| 3 | POWER RECEIVING DEVICE 3 | 0 HOURS | 0 HOURS | 3 HOURS | ADDRESS OF NODE 5 |
| 5 | POWER RECEIVING DEVICE 5 | 0 HOURS | 0 HOURS | 7 HOURS | null |

POWER SUPPLY APPARATUS CAPABLE OF SUPPLYING POWER TO MULTIPLE POWER RECEIVING APPARATUSES, CONTROL METHOD THEREOF, AND STORAGE MEDIUM

BACKGROUND OF THE INVENTION

Field of the Invention

The present invention relates to a power supply apparatus, a control method thereof, and a storage medium.

Description of the Related Art

Recently, wireless power supply systems in which a power supply device including an array antenna constituted by a plurality of antenna elements outputs power as microwaves to supply the power to a power receiving device wirelessly have become known.

In such a system, the strength of a signal received by the power receiving device (a calibration signal) is sent to the power supply device, and the power supply device detects the direction of the power receiving device from the received calibration signal and adjusts the power, and the phase of the power, supplied to the antenna elements of the array antenna. Such a wireless power supply system enables highly-efficient wireless power supply by the power supply device directing microwave beams at the power receiving device (Japanese Patent Laid-Open No. 2010-530210).

However, with the above-described past technique, if the power supply device is to supply power to a plurality of power receiving devices, the calibration with the power receiving devices and the supply of power from the power supply device must be carried out sequentially for each of the plurality of power receiving devices. The time taken up by calibration will rise with the number of power receiving devices, which shortens the amount of time for which power can be supplied to each power receiving device and reduces the efficiency of the power supply per unit of time.

SUMMARY OF THE INVENTION

The present invention has been made in consideration of the aforementioned problems, and realizes a wireless power supply technique that, when a power supply apparatus supplies power to a plurality of power receiving apparatuses, improves the efficiency of the supply of power to the power receiving apparatuses per unit of time.

In order to solve the aforementioned problems, one aspect of the present invention provides a power supply apparatus that can wirelessly supply power to a plurality of power receiving apparatuses, the power supply apparatus comprising: a plurality of antennae; and a control unit, wherein the control unit carries out control so that information pertaining to sending timings of calibration signals is sent, via the plurality of antennae, to the plurality of power receiving apparatuses; the control unit carries out control so that calibration signals sent from the plurality of power receiving apparatuses are received via the plurality of antennae; and the control unit controls an output of each antenna based on the calibration signals sent from the plurality of power receiving apparatuses so that power is supplied wirelessly to the plurality of power receiving apparatuses from corresponding ones of the plurality of antennae.

Another aspect of the present invention provides a control method of a power supply apparatus, the power supply apparatus including a plurality of antennae and a control unit and being capable of supplying power wirelessly to a plurality of power receiving apparatuses, the control method comprising: sending information pertaining to sending timings of calibration signals, via the plurality of antennae, to the plurality of power receiving apparatuses; receiving calibration signals sent from the plurality of power receiving apparatuses via the plurality of antennae; and controlling an output of each antenna based on the calibration signals sent from the plurality of power receiving apparatuses so that power is supplied wirelessly to the plurality of power receiving apparatuses from corresponding ones of the plurality of antennae.

Still another aspect of the present invention provides a non-transitory computer-readable storage medium storing a program for causing a computer to execute a control method of a power supply apparatus, the power supply apparatus including a plurality of antennae and a control unit and being capable of supplying power wirelessly to a plurality of power receiving apparatuses, the control method comprising: sending information pertaining to sending timings of calibration signals, via the plurality of antennae, to the plurality of power receiving apparatuses; receiving calibration signals sent from the plurality of power receiving apparatuses via the plurality of antennae; and controlling an output of each antenna based on the calibration signals sent from the plurality of power receiving apparatuses so that power is supplied wirelessly to the plurality of power receiving apparatuses from corresponding ones of the plurality of antennae.

Yet another aspect of the present invention provides a power supply apparatus that can wirelessly supply power to a plurality of power receiving apparatuses, the power supply apparatus comprising: a plurality of antennae; and a control unit, wherein the control unit carries out control so that information pertaining to signal features of calibration signals are sent to the plurality of power receiving apparatuses by the communication unit, the information pertaining to the signal features being information indicating different signal features for each of the plurality of power receiving apparatuses; the control unit carries out control so that calibration signals sent from the plurality of power receiving apparatuses that have received the information pertaining to signal features are received via the plurality of antennae; and the control unit controls an output of each antenna based on the calibration signals sent from the plurality of power receiving apparatuses so that power is supplied wirelessly to the plurality of power receiving apparatuses from corresponding ones of the plurality of antennae.

Still yet another aspect of the present invention provides a power supply apparatus that can wirelessly supply power to a plurality of power receiving apparatuses, the power supply apparatus comprising: a plurality of antennae; and a control unit, wherein the control unit carries out control so that calibration signals sent from the plurality of power receiving apparatuses are received via the plurality of antennae; the control unit controls an output of each antenna based on the calibration signals sent from the plurality of power receiving apparatuses so that power is supplied wirelessly to the plurality of power receiving apparatuses from corresponding ones of the plurality of antennae; and wherein the control unit receives the calibration signal from one of the plurality of power receiving apparatuses, receives the calibration signal from another of the plurality of power receiving apparatuses, and then controls an output of each antenna so that power is supplied wirelessly to the one power receiving apparatus and the other power receiving apparatus from corresponding ones of the plurality of antennae.

According to the present invention, when a power supply apparatus supplies power to a plurality of power receiving apparatuses, the efficiency, per unit of time, of supplying power to the power receiving apparatuses can be improved.

Further features of the invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention, and together with the description, serve to explain the principles of the invention.

FIGS. 4A and 4B are examples of list information indicating registration states of a plurality of power receiving devices according to the first embodiment.

FIGS. 5A to 5D are timing charts illustrating control processes according to the first embodiment.

FIGS. 9A and 9B are timing charts illustrating control processes according to the second embodiment.

FIG. 10A is a diagram illustrating charging amount information and a required charging time.

FIG. 10B is a diagram illustrating a system configuration and charging amount information of power receiving devices according to a third embodiment.

FIG. 12 is an example of list information indicating registration states of a plurality of power receiving devices according to the third embodiment.

FIGS. 15A to 15D are diagrams illustrating states of information lists according to the fourth embodiment.

FIG. 17 is a diagram illustrating a list of nodes held by the power supply device according to the fifth embodiment.

FIG. 18 is a flowchart illustrating a sequence of operations in a power supply order setting process according to the fifth embodiment.

FIGS. 21A and 21B are diagrams illustrating a power supply order after the power supply order setting process has been carried out, according to the fifth embodiment.

FIG. 22 is a diagram illustrating the configuration of a power supply system according to a sixth embodiment.

FIGS. 24AA, 24AB, 24AC, 24B, and 24C are diagrams illustrating states of information lists according to the sixth embodiment.

FIG. 25 is a diagram illustrating the structure of usage expectation information held by a power receiving device and the structure of a node held by a power supply device according to a seventh embodiment.

FIG. 27 is a diagram illustrating a list of nodes held by the power supply device according to the seventh embodiment.

FIGS. 32A to 32C are diagrams illustrating a power supply order after the power supply order setting process has been carried out, according to the seventh embodiment.

DESCRIPTION OF THE EMBODIMENTS

First Embodiment

Figure 1:
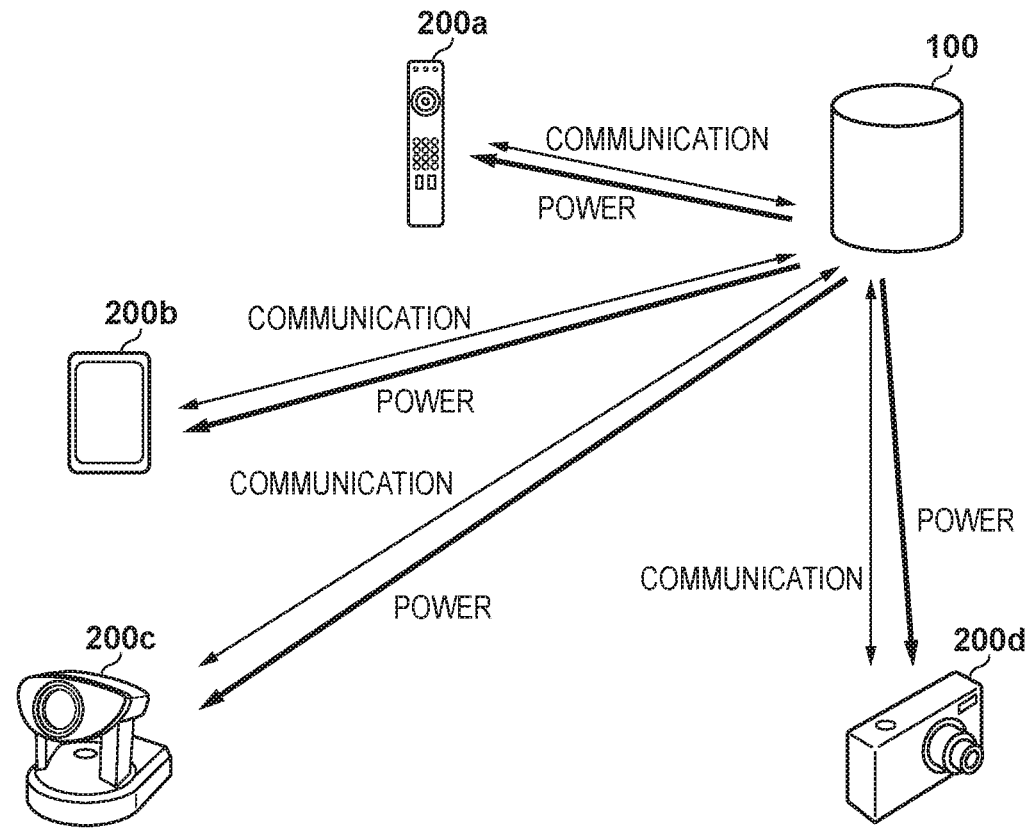
FIG. 1 is a diagram illustrating an example of the configuration of a wireless power supply system according to a first embodiment.

Hereinafter, exemplary embodiments of the present invention will be described in detail with reference to the drawings. The following describes an example of a wireless power supply system in which a power supply apparatus can supply power to a plurality of power receiving apparatuses. The power receiving apparatuses are described as a power receiving device 200a, a power receiving device 200b, a power receiving device 200c, and a power receiving device 200d, which are a remote controller, a smartphone, a network camera, and a digital camera, respectively. However, the power receiving apparatuses are not limited thereto. The devices may include personal computers, music players, game consoles, tablet terminals, AR or MR goggles, watch- or eyeglass-type information terminals, and so on, for example. A power supply device 100, which can be placed on a tabletop and upon which a plurality of such power receiving devices can be placed, will be described as an example of the power supply apparatus. However, the size and placement location is not limited, and the power supply device may include devices that can be placed on a tabletop, the floor, and in a vehicle, as well as devices that can be installed outdoors, such as in parking lots.

System Configuration

As illustrated in FIG. 1, the wireless power supply system according to the present embodiment is constituted by the power supply device 100 and a plurality of power receiving devices 200 (the individual numbers of the power receiving devices are 200a, 200b, 200c, and 200d). The power receiving device 200a, the power receiving device 200b, and the power receiving device 200d are mobile devices, whereas the power receiving device 200c is a stationary device.

A wireless power supply system including the power supply device 100 and the power receiving devices 200 will be described next with reference to FIG. 2. The same functional configuration can be implemented in each of the power receiving devices 200. As such, FIG. 2 illustrates only a single representative example of the configuration of the power receiving devices.

Figure 2:
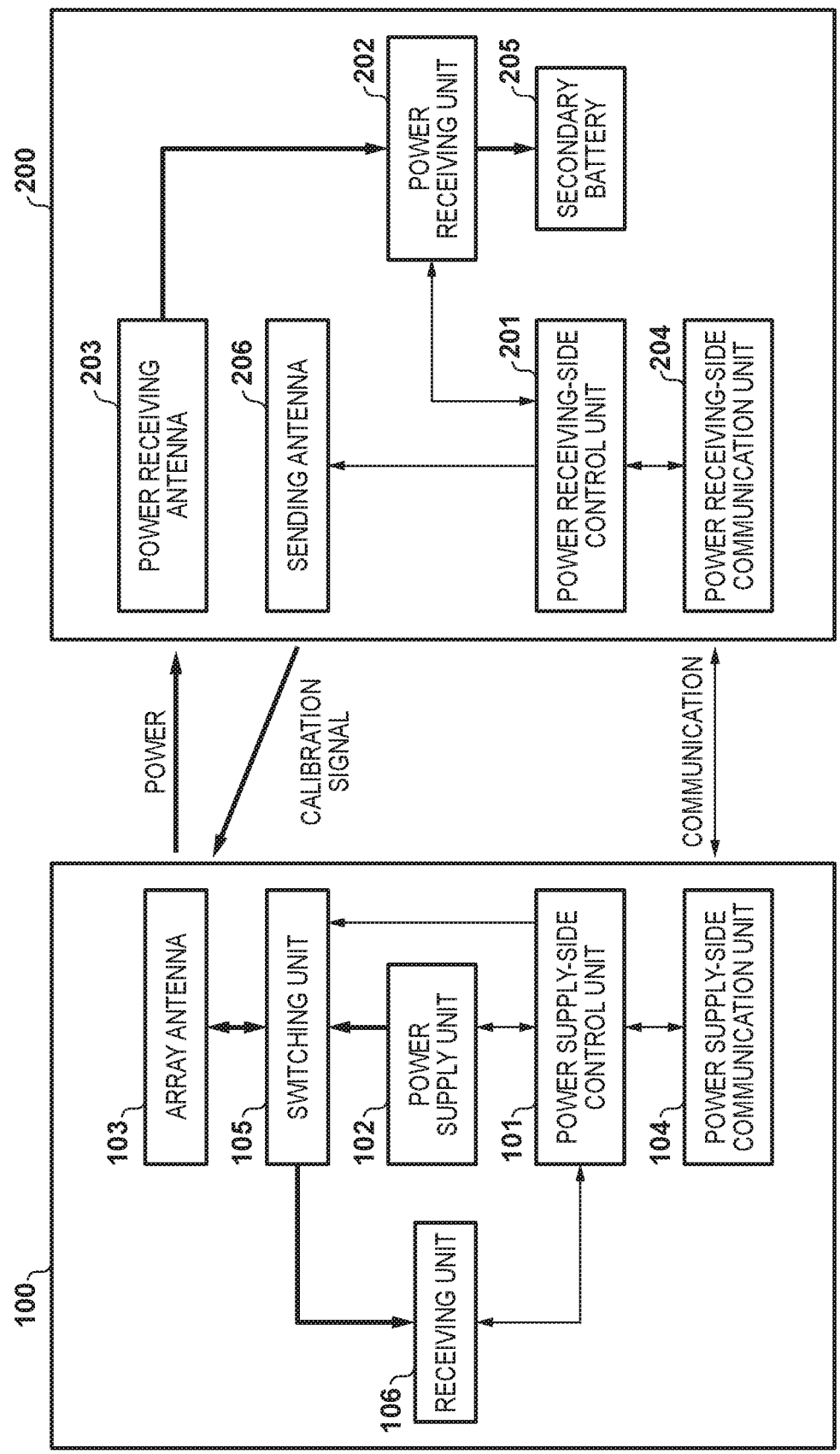
FIG. 2 is a block diagram illustrating an example of the functional configuration of a power supply device and a power receiving device according to the first embodiment.

Note that one or more of the function blocks illustrated in FIG. 2 may be implemented by hardware such as an ASIC or a programmable logic array (PLA), or may be implemented by software executed by a programmable processor such as a CPU or an MPU. The function blocks may also be realized as a combination of software and hardware. Accordingly, in the following descriptions, even when different function blocks are indicated as being the primary elements carrying out operations, those function blocks may actually be realized by the same instance of hardware.

Configuration of Power Supply Device

The configuration of the power supply device 100 will be described first. The power supply device 100 is constituted by a power supply-side control unit 101, a power supply unit 102, an array antenna 103, a power supply-side communication unit 104, a switching unit 105, and a receiving unit 106.

The power supply-side control unit 101 includes a CPU, ROM, and RAM, and controls the overall operations of the power supply device 100, the internal exchange of digital data, and so on by loading programs stored in the ROM into the RAM and executing the programs. The power supply unit 102 is connected to the switching unit 105 and the power supply-side control unit 101, and supplies power to the array antenna 103 through the switching unit 105 under the control of the power supply-side control unit 101.

The array antenna 103 is constituted by a plurality of antenna elements. The plurality of antenna elements are connected to the power supply unit 102 individually through the switching unit 105, and receive phase- and amplitude-controlled power from the power supply unit 102. The power supplied from the power supply unit 102 is power having its phase and amplitude controlled by the power supply-side control unit 101. The array antenna 103 outputs the combined power output from the antenna elements as supplied power. The supplied power output from the array antenna 103 is the combined output of the phase- and amplitude-controlled power output from the antenna elements and thus has directivity. Because the array antenna 103 has such directivity, the power supply device 100 can radiate the supplied power in the directions of the power receiving devices 200. Here, each antenna element may be a directional antenna element or a nondirectional antenna element.

The power supply-side communication unit 104 is constituted by an antenna for wireless communication and a communication control unit. The power supply-side communication unit 104 communicates with the power receiving devices 200 according to a predetermined communication method. The "predetermined communication method" used by the power supply-side communication unit 104 is a wireless communication method, and is a communication method based on the Wireless Local Area Network (wireless LAN) standard, the Bluetooth (trade name) standard, or the like, for example. In addition to the power receiving devices 200, the power supply-side communication unit 104 can communicate with any electronic device compliant with the same communication method.

The switching unit 105 is constituted by a switching element, and is connected to the array antenna 103, the power supply unit 102, and the receiving unit 106. The switching unit 105 is controlled by the power supply-side control unit 101. The power supply-side control unit 101 controls the switching unit 105 to connect the array antenna 103 and the receiving unit 106 during a calibration period, and controls the switching unit 105 to connect the array antenna 103 and the power supply unit 102 during a power supply period.

The receiving unit 106 is connected to the array antenna 103 and the power supply-side control unit 101, and sends calibration signals received from the power receiving devices 200 to the power supply-side control unit 101. The receiving unit 106 includes a filter circuit, and also has a function for demultiplexing multiplexed calibration signals.

Overview of Process of Controlling Wireless Power Supply by Power Supply Device 100

An overview of a process of controlling the wireless power supply, carried out by the above-described power supply device 100, will be given next.

(1) The power supply device 100 communicates wirelessly with the power receiving device 200 using the power supply-side communication unit 104, and detects that the power receiving device 200 is present in a predetermined range.

(2) Upon detecting that the power receiving device 200 is present in the predetermined range, the power supply device 100 requests that the power receiving device 200 send a calibration signal (e.g. a reception signal strength of the power receiving device) as a calibration process.

(3) The power supply device 100 receives the calibration signal from the power receiving device 200 using the array antenna 103, and identifies the direction of the power receiving device 200 from phase differences between the signals output from the antenna elements of the array antenna 103.

(4) Upon identifying the direction of the power receiving device 200, the power supply-side control unit 101 carries out a power supply process. In the power supply process, the power supply unit 102 outputs supplied power to the power receiving device 200 by controlling the amplitude and phase of the power applied to each of the antenna elements in the array antenna 103 so as to follow the direction of the detected power receiving device 200.

(5) Upon a predetermined amount of time passing after the start of the supply of power, the power supply device 100 stops the power supply process and carries out the calibration process again. The calibration process is carried out periodically because the positions of the power receiving devices 200 vary when those devices are mobile devices like the power receiving device 200a, the power receiving device 200b, and the power receiving device 200d. The present embodiment is directed at a plurality of power receiving devices 200, and as such the calibration process is carried out for each of the power receiving devices 200.

Here, the power supply device 100 according to the present embodiment carries out control such that the plurality of power receiving devices 200 do not send their calibration signals at separate times, but instead send the calibration signals at the same time. In other words, the time required for the calibration process can be shortened by the plurality of power receiving devices 200 sending their calibration signals at the same time.

However, if the plurality of power receiving devices 200 send their calibration signals at the same time, the power supply device 100 cannot distinguish between the calibration signals. Thus multiplexing information serving as feature information of the calibration signals is sent to each of the power receiving devices 200 in advance.

An example in which the multiplexing information is frequency information indicating that the calibration signals sent by the power receiving devices 200 have different frequencies will be described here. However, code information indicating different codes, modulation information indicating different modulations, or the like may be used instead.

In this manner, the power supply device 100 sends different feature information (the frequency information) to each of the power receiving devices 200 and carries out control such that the power receiving devices 200 send their calibration signals at the same time. This makes it possible to reduce the time taken up by the calibration process and increase the time efficiency of the supply of power.

Configuration of Power Receiving Devices

The configuration of the power receiving devices 200 will be described next. Each of the power receiving devices 200 is constituted by a power receiving-side control unit 201, a power receiving unit 202, a power receiving antenna 203, a power receiving-side communication unit 204, a secondary battery 205, and a sending antenna 206.

The power receiving-side control unit 201 includes a CPU, ROM, and RAM, and controls the overall operations of the power receiving device 200, the internal exchange of digital data, and so on by loading programs stored in the ROM into the RAM and executing the programs. The power receiving unit 202 receives AC power from the power supply device 100 received by the power receiving antenna 203, rectifies and smoothes the power, and supplies the power to charge the secondary battery 205.

The power receiving unit 202 may be configured to transform the rectified and smoothed power to a predetermined voltage and supply the power to the power receiving-side control unit 201 and the power receiving-side communication unit 204. The power receiving unit 202 also detects the level of the received power. The power receiving unit 202 furthermore detects the remaining power in the secondary battery 205.

The power receiving antenna 203 is a meandering antenna, a flat microstrip antenna, or the like, and is connected to the power receiving unit 202. The power receiving antenna 203 receives the supplied power as microwaves output by the power supply device 100 and supplies the power to the power receiving unit 202. Here, a rectenna may be configured including the power receiving antenna 203 and a rectifying unit of the power receiving unit 202.

The power receiving-side communication unit 204 is constituted by an antenna for wireless communication and a communication control unit. The power receiving-side communication unit 204 communicates with the power supply device 100) according to a predetermined communication method.

The secondary battery 205 is a rechargeable battery such as a lithium-ion battery. In addition to the power receiving unit 202, the secondary battery 205 is connected to the power receiving-side control unit 201 and the power receiving-side communication unit 204, and supplies power from the secondary battery 205.

The sending antenna 206 is an antenna that sends the calibration signal, and sends radio waves for wireless communication that are nondirectional or almost nondirectional. The power receiving-side control unit 201 multiplexes the calibration signal sent from the sending antenna 206, and thus carries out frequency control.

The calibration signal sent from the sending antenna 206 may be a modulated signal or an unmodulated signal. The sending antenna 206 may be configured to share the wireless communication antenna included in the power receiving-side communication unit 204.

The configuration of the power receiving device 200 has been described, and thus an overview of the control of the power receiving device 200 will be given next. The power receiving-side control unit 201 notifies the power supply device 100, via the power receiving-side communication unit 204, that the power receiving device 200 is within a communicable range. The power receiving-side control unit 201 receives the feature information of the calibration signal from the power supply device 100 via the power receiving-side communication unit 204, and furthermore receives timing information pertaining to the sending of the calibration signal. The power receiving-side control unit 201 controls the calibration signal to the frequency indicated by the received feature information, and supplies the calibration signal to the sending antenna 206 at the time requested by the power supply device 100.

The power receiving device 200 continually charges the secondary battery 205 with the received power. When the power receiving unit 202 has detected that the secondary battery 205 is in a fully-charged state, the power receiving-side control unit 201 sends, via the power receiving-side communication unit 204, a signal to the power supply device 100 indicating that the secondary battery 205 is fully charged and requesting the supply of power to be stopped.

Sequence of Operations in Power Supply Control Process by Power Supply Device

Figure 3A:
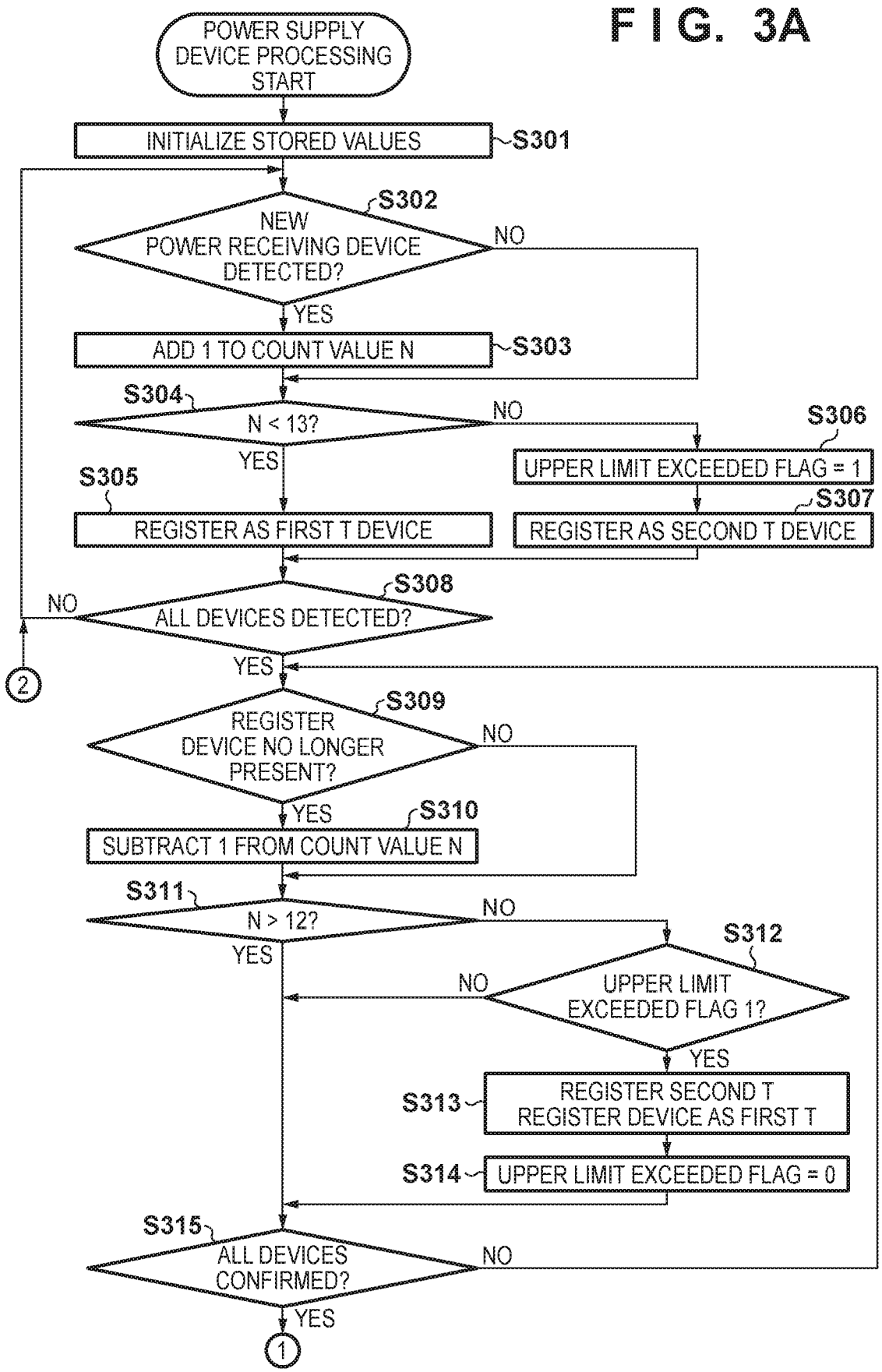
FIGS. 3A and 3B are flowcharts illustrating a sequence of operations in a control process of the power supply device according to the first embodiment.

Next, a sequence of operations in a control process carried out by the power supply device 100) according to the present embodiment will be described with reference to FIGS. 3A and 3B.

Figure 3B:
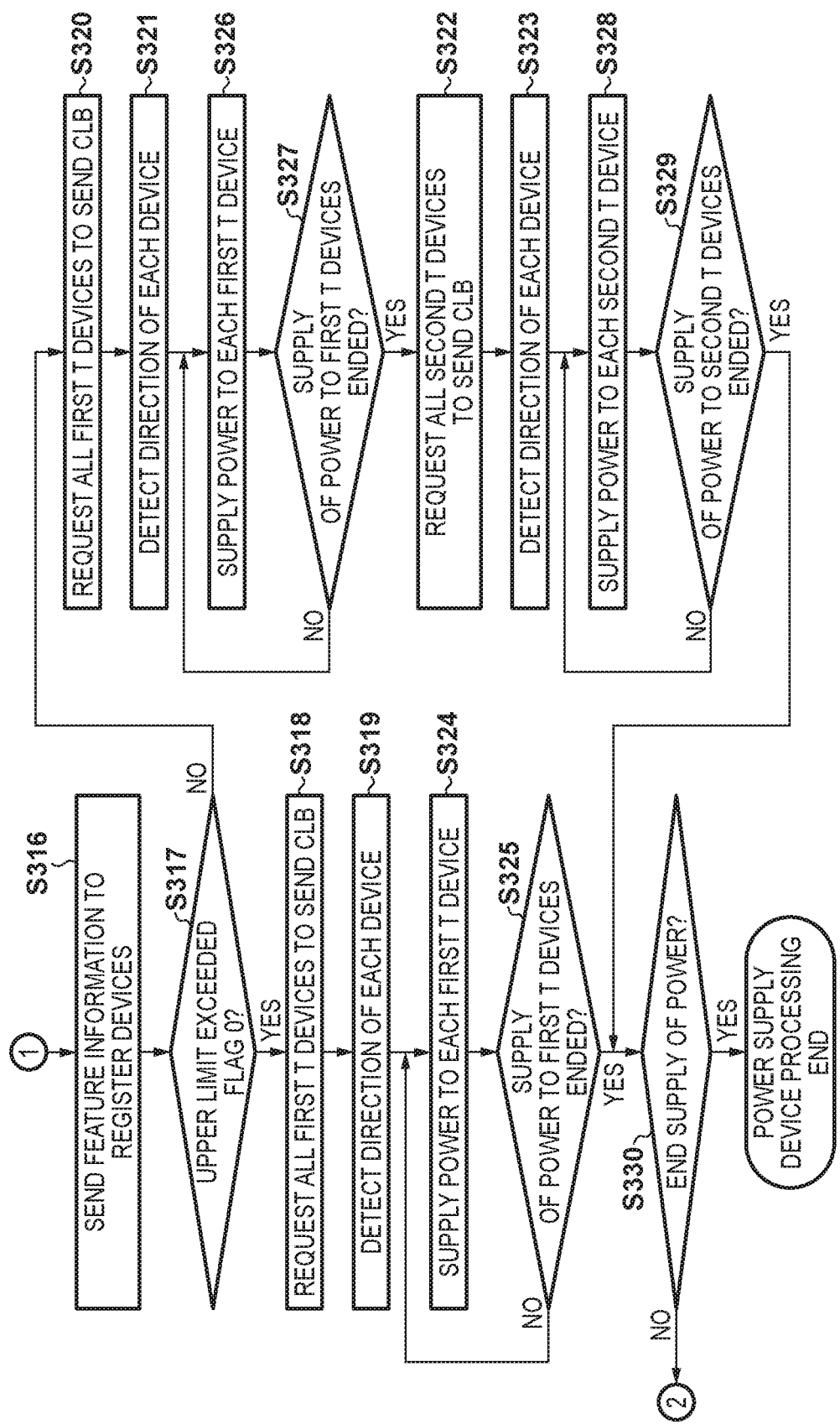

As the control process, the power supply device 100 carries out a device detection and registration process (S301 to S315 in FIG. 3A), a calibration (CLB) process (S316 to S323 in FIG. 3B), and a power supply process (S324 to S330 in FIG. 3B). These processes are realized by the power supply-side control unit 101 loading, into RAM, programs stored in ROM internal to the power supply-side control unit 101 and then executing those programs.

The device detection and registration process carried out by the power supply-side control unit 101 of the power supply device 100 will be described first. In S301, the power supply-side control unit 101 carries out initialization by setting a counter value N and an upper limit exceeded flag, which are stored in RAM internal to the power supply-side control unit 101, to 0, and clearing all registered device information.

In S302, the power supply-side control unit 101 detects that a power receiving device 200 is in a communication range by communicating with the power receiving device 200 through the power supply-side communication unit 104.

The power supply-side control unit 101 has detected a power receiving device 200 in S302, and thus adds 1 to the counter value N, which counts the number of power receiving devices 200, in S303. It is assumed here that the upper limit on the number of devices that can be multiplexed by power supply device 100 at one time is 12. In other words, there are twelve frequencies for the calibration signals that can be assigned to the power receiving devices 200.

In S304, the power supply-side control unit 101 determines whether or not the count value N is less than 13 (less than or equal to 12). The process moves to S305 if the count value N is determined to be less than or equal to 12, and moves to S306 if determined to be greater than or equal to 13.

In S305, the power supply-side control unit 101 has determined in S304 that the count value N is less than or equal to 12, and thus different frequency information can be assigned to all of the power receiving devices 200. The power receiving device 200 detected in S302 is registered to a first timing (first T) group. The "first timing group" is a group of the power receiving devices 200 that send their calibration signals at a first timing.

In S306, the power supply-side control unit 101 has determined in S304 that the count value N is greater than or equal to 13, and thus sets the upper limit exceeded flag to 1. The upper limit exceeded flag indicates that the number of power receiving devices 200 has exceeded an upper limit. This means that a group of power receiving devices 200 that send their calibration signals at the first timing and a group of power receiving devices 200 that send their calibration signals at a second timing will be necessary.

In S307, the power supply-side control unit 101 has determined in S304 that the count value N is greater than or equal to 13, and thus the power receiving device 200 detected in S302 is registered to a second timing (second T) group.

In S308, the power supply-side control unit 101 determines whether or not all of the power receiving devices 200 have been detected by communicating with the power receiving devices 200 through the power supply-side communication unit 104, and the process moves to S308 if it is determined that all of the devices have been detected. The process returns to S302 if the power supply-side control unit 101 determines that all of the power receiving devices 200 have not been detected.

In S309, the power supply-side control unit 101 determines whether or not a registered power receiving device 200 has left the communicable range by communicating with the power receiving device 200 using the power supply-side communication unit 104. If it is determined that the device has left, the process moves to S310, whereas if it is determined that the device is still present, the process moves to S311 without carrying out S310.

In S310, the power supply-side control unit 101 has determined in S309 that a registered power receiving device 200 has left, and thus subtracts 1 from the count value N. In S311, the power supply-side control unit 101 determines whether or not the count value N exceeds 12 (is greater than or equal to 13). The process moves to S315 if the count value exceeds 12, and moves to S312 if the count value is less than or equal to 12.

In S312, the power supply-side control unit 101 has determined in S311 that the count value N is less than or equal to 12, and thus determines whether or not the upper limit exceeded flag is 1. The process moves to S315 if the power supply-side control unit 101 has determined that the upper limit exceeded flag is 1, and moves to S313 if the power supply-side control unit 101 has determined that the upper limit exceeded flag is 0. Here, the power supply-side control unit 101 determines whether or not the upper limit exceeded flag is 1 in S312 in order to determine whether or not the count value N has become less than or equal to 12 due to the registered power receiving device 200 having left. This means that a power receiving device 200 that had been registered to the second timing group can now be put in the first timing group instead.

In S313, the power supply-side control unit 101 has determined in S312 that the upper limit exceeded flag is 1, and thus changes registered information of a power receiving device 200 in the second timing group to a power receiving device 200 in the first timing group. The registered information will be described in detail later using FIGS. 4A and 4B.

In S314, the power supply-side control unit 101 has determined in S311 that the count value N is less than or equal to 12 and in S312 that the upper limit exceeded flag is 1, and thus restores the upper limit exceeded flag to 0. This is control that returns the upper limit exceeded flag, which indicates that the upper limit of 12 devices has been exceeded, to 0 due to the registered number of power receiving devices 200 being less than or equal to 12.

In S315, the power supply-side control unit 101 determines whether or not the confirmation has ended for all of the power receiving devices 200 by communicating with the power receiving devices 200 using the power supply-side communication unit 104. The process returns to S309 if the confirmation has not ended, and moves to S316 if the confirmation has ended.

In S316, the power supply-side control unit 101 sends the frequency information to each of the power receiving devices 200 as the feature information for each of the registered power receiving devices 200. The frequency information for each of the registered power receiving devices 200 will be described later using FIGS. 4A and 4B. Here, the frequency information is different for each power receiving device 200 so that the calibration signals sent from the power receiving devices 200 at the same time are multiplexed (frequency-multiplexed, here) signals.

In S317, the power supply-side control unit 101 confirms whether or not the upper limit exceeded flag is 0 in order to confirm whether or not the number of registered power receiving devices 200 is greater than 12. The process moves to S318 if the upper limit exceeded flag is 0, and moves to S320 if the upper limit exceeded flag is not 0.

Here, the processes of S318, S319, S324, and S325 indicate that the number of registered power receiving devices 200 is less than or equal to 12 and that the calibration process and power supply process will be carried out at the first timing only. The processes of S320 to S323 and S326 to S329 indicate that the number of registered power receiving devices 200 greater than or equal to 13 and that the calibration process and power supply process will be carried out at the first timing and the second timing.

In S318, using the power supply-side communication unit 104, the power supply-side control unit 101 simultaneously requests all of the power receiving devices 200 registered for the first timing to send calibration (CLB) signals as the timing information.

In S319, using the array antenna 103, the power supply-side control unit 101 simultaneously receives the calibration signals sent from the power receiving devices 200 and detects the direction of each power receiving device 200. Here, the power receiving devices 200 send their calibration signals on the basis of the frequency information serving as the feature information sent from the power supply device 100 in S316.

In S324, the power supply-side control unit 101 has successfully detected the directions of the power receiving devices 200 in S319, and thus outputs the supplied power in those directions using the power supply unit 102. The power supply is carried out in time-division for each of the registered power receiving devices 200. The timewise relationship between the supply of power and calibration will be described later using the timing charts in FIGS. 5A to 5D. The power supply-side control unit 101 sets a power supply period from device to device at equal intervals, and once the supply of power to a given power receiving device 200 ends, the supply of power to the next power receiving device 200 is started.

In S325, the power supply-side control unit 101 determines whether or not the supply of power to all of the power receiving devices 200 registered to the first timing has ended, and the process moves to S330 if it is determined that the supply of power has ended. The process returns to S324 if the power supply-side control unit 101 determines that the supply of power has not ended.

In S320, using the power supply-side communication unit 104, the power supply-side control unit 101 simultaneously requests all of the power receiving devices 200 registered for the first timing to send the calibration (CLB) signals as the timing information, in the same manner as in S318.

In S321, using the array antenna 103, the power supply-side control unit 101 simultaneously receives the calibration signals sent from the power receiving devices 200 and detects the direction of each power receiving device 200.

In S326, the power supply-side control unit 101 has successfully detected the directions of the power receiving devices 200 in S319, and thus outputs the supplied power in those directions using the power supply unit 102, in the same manner as in S324.

In S327, the power supply-side control unit 101 determines whether or not the supply of power to all of the power receiving devices 200 registered to the first timing has ended, and the process moves to S322 if it is determined that the supply of power has ended. The process returns to S326 if the power supply-side control unit 101 determines that the supply of power has not ended.

In S322, using the power supply-side communication unit 104, the power supply-side control unit 101 simultaneously requests all of the power receiving devices 200 registered for the second timing to send calibration (CLB) signals as the timing information.

In S323, using the array antenna 103, the power supply-side control unit 101 simultaneously receives the calibration signals sent from the power receiving devices 200 and detects the direction of each power receiving device 200.

In S328, the power supply-side control unit 101 has successfully detected the directions of the power receiving devices 200 in S323, and thus outputs the supplied power in those directions using the power supply unit 102. In S329, the power supply-side control unit 101 determines whether or not the supply of power to all of the power receiving devices 200 registered to the second timing has ended, and the process moves to S330 if it is determined that the supply of power has ended. The process returns to S328 if the power supply-side control unit 101 determines that the supply of power has not ended.

In S330, the power supply-side control unit 101 determines whether or not the supply of power is to be stopped, and if it is determined that the supply of power is to be stopped, the control process of the power supply device 100 ends. The process returns to S302 if the power supply-side control unit 101 determines that the supply of power is not to be stopped. Here, the power supply-side control unit 101 determines whether or not a power supply stop request has been made by a power receiving device 200. A power receiving device 200 requests that the supply of power be stopped when, for example, the secondary battery 205 of the power receiving device 200 is in a fully-charged state, a charging error has occurred and power reception is to be stopped, or the like. The power supply stop requests from the power receiving devices 200 are managed individually by the power receiving devices 200, and the process of the power supply device ends when all power receiving devices no longer require power to be supplied.

Registered Information

FIGS. 4A and 4B are diagrams illustrating list information of the power receiving devices 200 registered by the power supply device 100. FIG. 4A is a diagram illustrating a case where there are 15 registered power receiving devices 200, and FIG. 4B is a diagram illustrating a case where the number of registered power receiving devices 200 has dropped from 15 to 11. For example, "item number", "power receiving device name", "timing group", "frequency information", and "power supply required" are registered in the list as the list information of the registered power receiving devices 200.

In FIG. 4A, there are 15 power receiving devices 200 (i.e. greater than or equal to 13), and thus there are two timing groups, i.e. the first timing and the second timing. However, in FIG. 4B, there are 12 or fewer power receiving devices 200, and thus there is only one timing group.

The frequencies indicated in FIG. 4A are different frequencies for each of the power receiving devices 200 registered in the first timing group from item number 1 to item number 12. However, for item number 13 to item number 15, which correspond to the second timing group, the frequencies are different within the group, but are the same as frequencies already assigned in the first timing group.

FIG. 4B illustrates a case where the number of power receiving devices 200 has decreased from 13 or more and has become 12 or fewer. In this case, as described with reference to S313 in FIG. 3A, the power receiving devices 200 that had been registered in the second timing group are instead registered as power receiving devices 200 for the first timing. In item number 2 in FIG. 4B, the power receiving device having the name "power receiving device 13" is registered in the first timing group, and this is the power receiving device 200 in item number 13 in FIG. 4A, which had been registered in the second timing group.

In FIGS. 4A and 4B, "power supply required" indicates whether or not the power receiving device 200 requires power to be supplied from the power supply device 100. A power receiving device 200 sends the power supply stop request when fully charged, when a charging error has occurred, or the like, and upon receiving the power supply stop request, the power supply device 100 deletes the corresponding power receiving device 200 from the list and stop supplying power.

Although deleted from this list, the name of the power receiving device 200 and information indicating that the supply of power is not required is managed separately in a power supply unrequired list (not illustrated). This is to prevent the power receiving device 200 from being registered in the list again in S302 of FIG. 3A. Additionally, if the power supply device 100 cannot communicate with the corresponding power receiving device 200, the corresponding device is also removed from the power supply unrequired list.

Timing Charts

FIGS. 5A to 5D illustrate the timings of power supply and calibration carried out by the power supply device 100 according to the present embodiment. The horizontal axes represent time and indicate time as progressing in the direction of the arrows.

FIG. 5A is a diagram illustrating the timing of power supply and calibration when there are four power receiving devices 200. In other words, the calibration is carried out at the first timing only. As illustrated here, the four power receiving devices 200 are calibrated simultaneously, and power is then sent to the power receiving devices 200 in sequence. Upon the supply of power to all four power receiving devices 200 ending, the four devices are again calibrated simultaneously, and power is again supplied.

FIGS. 5B, 5C, and 5D are diagrams illustrating the timing of power supply and calibration when there are 15 power receiving devices 200. In other words, the calibration is carried out at the first timing and the second timing.

In FIGS. 5B and 5C, 12 of the power receiving devices 200 are calibrated simultaneously at the first timing, and power is then supplied in sequence to each of those power receiving devices 200. Upon the supply of power to the 12 power receiving devices 200 ending, the remaining three devices (the power receiving devices 13 to 15) are calibrated simultaneously at the second timing, and power is then supplied in sequence to each of those power receiving devices 200. Upon the supply of power to the three power receiving devices 200 ending, the 12 power receiving devices 200 are again calibrated simultaneously, and power is again supplied.

FIGS. 5B and 5C are different in terms of the timings of the calibration. Compared to FIG. 5A, FIG. 5B illustrates control in which the power supply periods of the power receiving devices 200 are the same but the calibration carried out at the second timing has been added in addition to the supply of power to the power receiving devices 200. Compared to FIG. 5B, FIG. 5C illustrates a case where the power supply time has been shortened. There is a greater number of power receiving devices 200, and it is therefore more likely that the positions of the power receiving devices 200 will vary; the control thus carries out calibration more frequently than in the situation illustrated in FIG. 5B.

In FIGS. 5B and 5C, power is supplied after the calibration at the first timing, and the calibration at the second timing is then carried out. However, the control may be such that power is supplied to the 15 power receiving devices 200 after the calibrations at the first timing and the second timing have been carried out. FIG. 5D is a timing chart illustrating such control.

According to the present embodiment as described thus far, the power supply device 100 sends information controlling the sending of the calibration signals by the power receiving devices to the plurality of power receiving devices 200 in order to carry out the calibration simultaneously. As the information controlling the sending of the calibration signals, the power supply device sends multiplexing information enabling the calibration signals to be multiplexed and timing signals indicating the timing at which the calibration signals are to be sent. The power receiving devices 200 send their calibration signals on the basis of the received information, and thus the power supply device 100 can receive a plurality of calibration signals in the same period (simultaneously). The power supply device can then calibrate a plurality of the power receiving devices 200 at the same timing, which makes it possible to shorten the calibration time and lengthen the power supply time. In other words, when the power supply device supplies power to a plurality of power receiving devices, the efficiency of the supply of power to the power receiving devices per unit of time can be improved.

Second Embodiment

Next, a second embodiment will be described. The second embodiment adds to the first embodiment in that power is supplied to the respective devices having set a power supply order. As such, the configurations of the power supply device 100 and the power receiving devices 200 in the second embodiment are the same as in the first embodiment, and with the exception of the foregoing point, the control processes of the power supply device are same as well. As such, identical configurations and identical processes will be assigned the same reference signs as in the first embodiment, and redundant descriptions will be omitted, with the descriptions focusing on the differences.

Figure 6A:
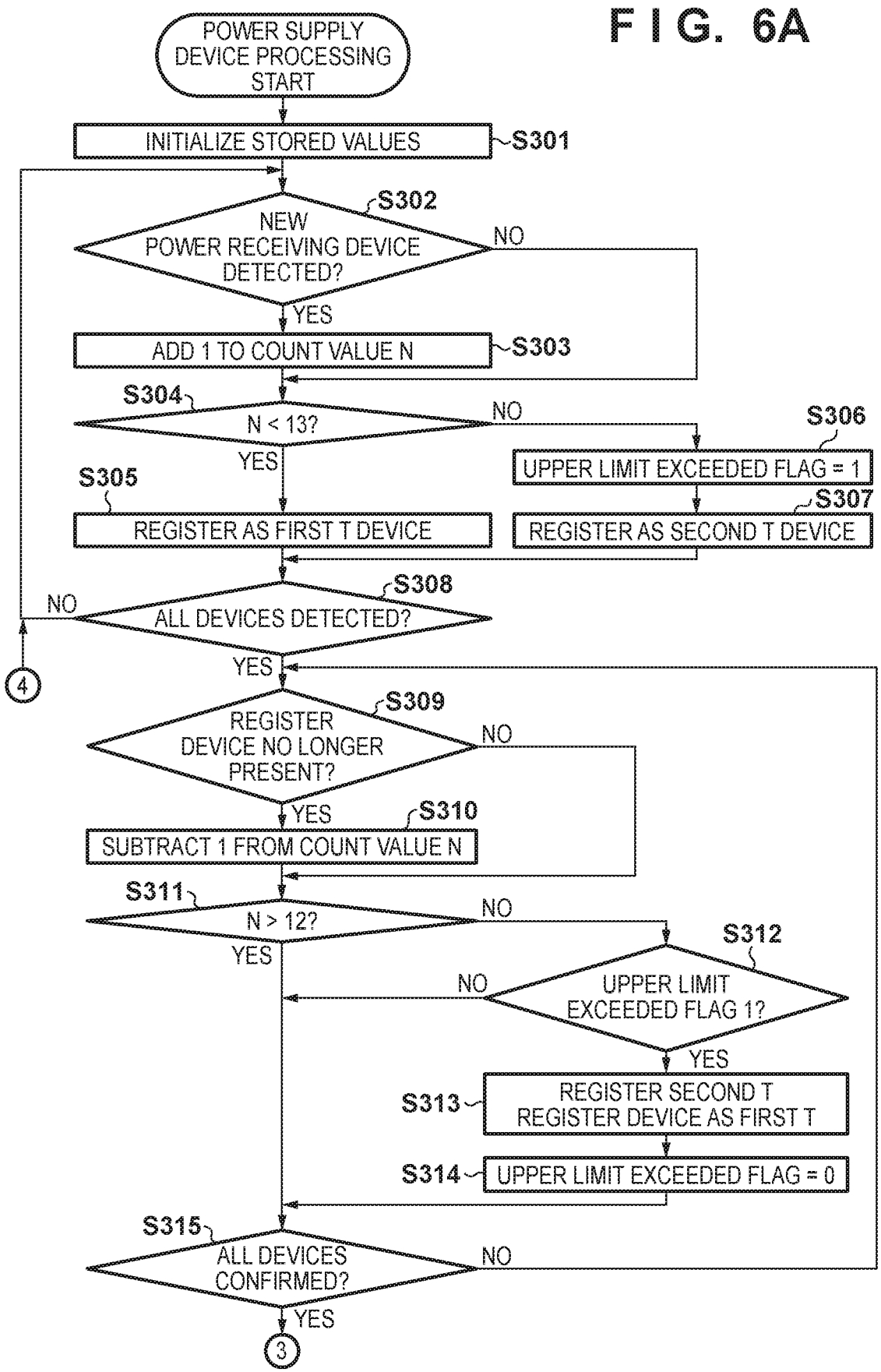
FIGS. 6A and 6B are flowcharts illustrating a sequence of operations in a control process of the power supply device according to a second embodiment.
Figure 6B:
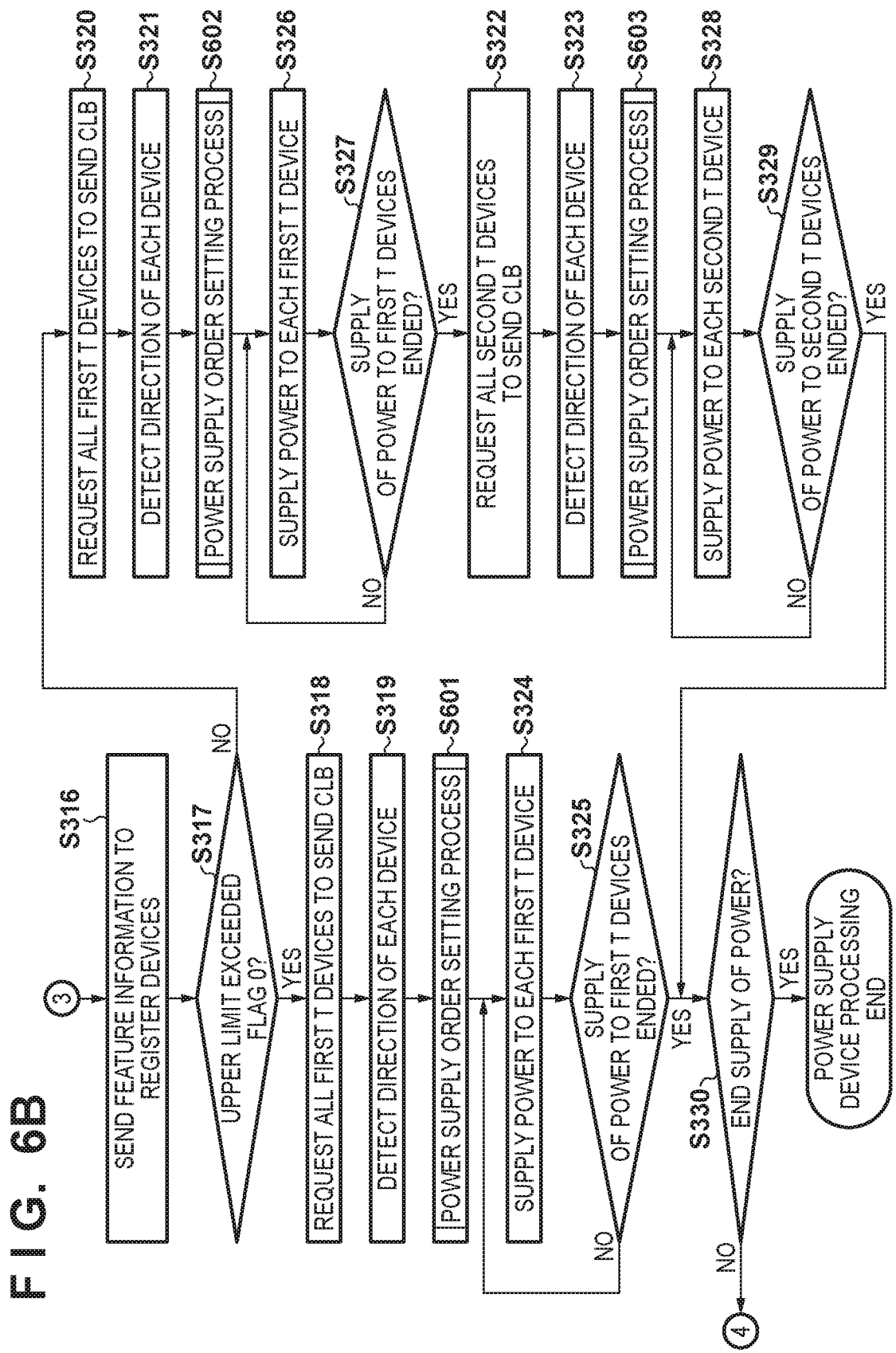

A control process carried out by the power supply device 100 according to the present embodiment will be described with reference to FIGS. 6A and 6B. Note that the flowcharts in FIGS. 6A and 6B add new steps S601, S602, and S603 to the control process of the power supply device described above with reference to FIGS. 3A and 3B.

S601, S602, and S603 are a power supply order setting process for determining which of the plurality of power receiving apparatuses the power supply device 100 will supply power to first. In this power supply order setting process, a movement frequency determined for each type of power receiving device 200 is taken into consideration, e.g. a device assumed to be more likely to move is placed earlier in the power supply order. Conversely, a device assumed not to move is placed later in the power supply order. Additionally, in the power supply order setting process according to the present embodiment, if a device has actually moved during the calibration period, that device is placed earlier in the power supply order.

Furthermore, the power supply device 100 of the present embodiment deletes detected power receiving devices from the power supply order in accordance with the states of those power receiving devices, adds newly-detected power receiving devices to the power supply order, and so on.

Note that the various power supply order setting processes described in the following third, fourth, fifth, sixth, and seventh embodiments all corresponds to variations on the details of the processes of S601. S602, and S603.

Sequence of Operations in Power Supply Order Setting Process by Power Supply Device 100

Figure 7:
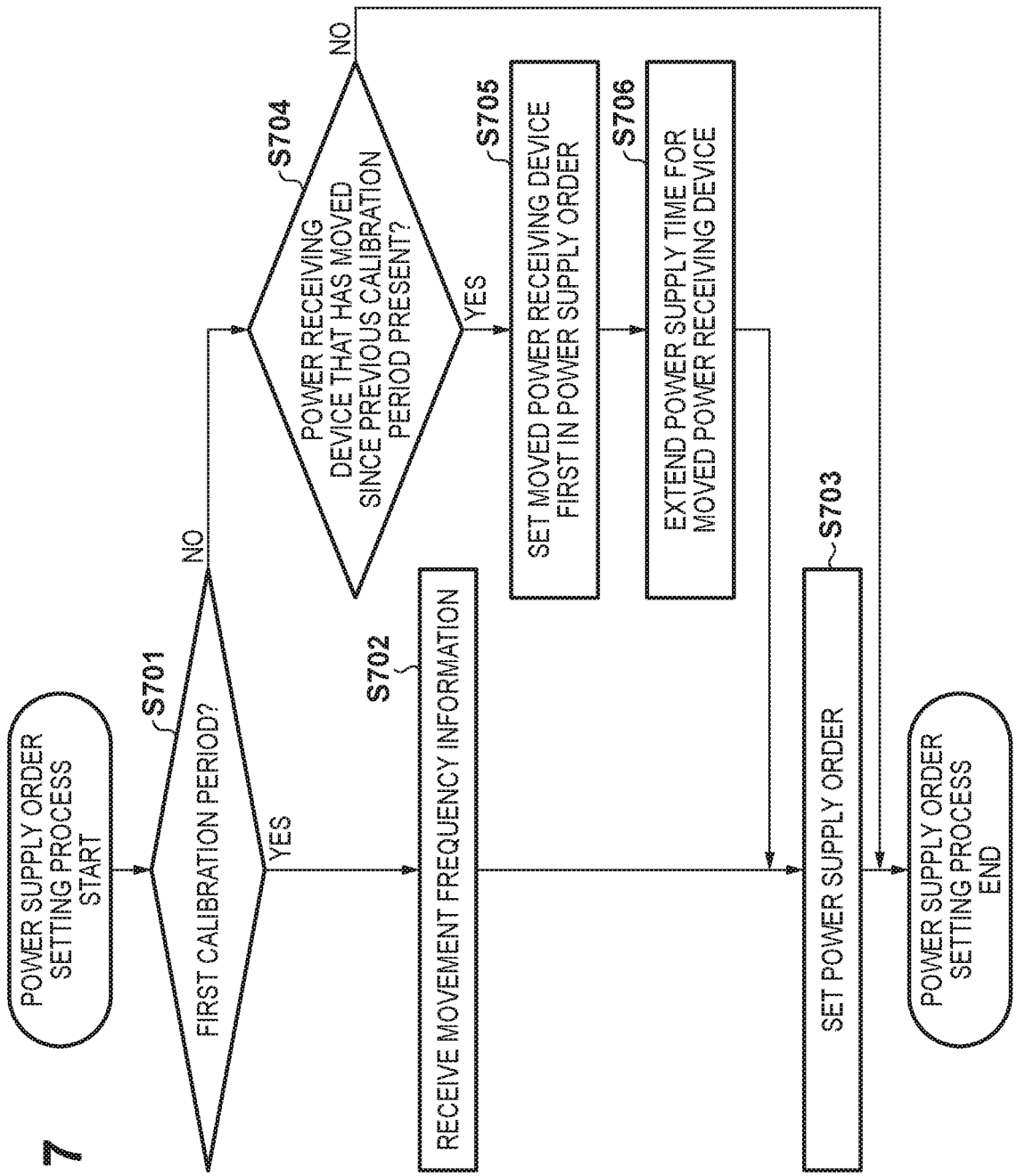
FIG. 7 is a flowchart illustrating a sequence of operations in a power supply order setting process according to the second embodiment.

A sequence of operations in the power supply order setting process according to the second embodiment will be described with reference to FIG. 7. These processes are realized by the power supply-side control unit 101 loading, into RAM, programs stored in ROM internal to the power supply-side control unit 101 and then executing those programs.

In S701, the power supply-side control unit 101 determines whether or not the calibration period currently being processed is the first calibration period, from a calibration period count value stored in the RAM. If it is determined that the calibration period currently being processed is the first calibration period, the process moves to S702. If it is determined that the calibration period currently being processed is the second or subsequent calibration period, the process moves to S704.

In S702, the power supply-side control unit 101 receives, through the power supply-side communication unit 104, movement frequency information (described later) of the power receiving devices 200 sent by the power receiving devices 200. In S703, the power supply-side control unit 101 sets the power supply order of the detected plurality of power receiving devices 200 on the basis of the received movement frequency information. Specifically, the movement frequency information is device information of the power receiving devices 200. Here, the descriptions will refer to the power receiving device 200a as a remote controller, the power receiving device 200b as a smartphone, the power receiving device 200c as a network camera, and the power receiving device 200d as a digital camera. The power supply-side control unit 101 sets the power supply order on the basis of the device information of the power receiving devices 200, namely "remote controller", "smartphone", "network camera", and "digital camera". For example, a smartphone is often used by a user, and is highly likely to move, and is thus set as first in the power supply order. The network camera is a stationary device, and does not move, and is thus set to fourth in the power supply order. The power supply-side control unit 101 may have, in its internal RAM, a table associating the device information of the power receiving devices 200 with weightings for the power supply order. The process ends once the power supply-side control unit 101 has set the power supply order for each of the power receiving devices 200.

In S704, the power supply-side control unit 101 determines whether there is a power receiving device 200 that has moved since the previous calibration period, on the basis of movement information of the power receiving devices 200 received from the power receiving devices 200 through the power supply-side communication unit 104. If it is determined that there are no power receiving devices 200 that have moved since the previous calibration period, the process ends without changing the power supply order set in the previous power supply order setting process. If it is determined that there is a power receiving device 200 that has moved since the previous calibration period, the process moves to S705.

In S705, the power supply-side control unit 101 sets the power receiving device 200 that has moved since the previous calibration period to first in the power supply order in the next power supply period, and the process then moves to S706.

In S706, the power supply-side control unit 101 extends the power supply time in the next power supply period for the power receiving devices 200 that has moved since the previous calibration period, and the process then moves to S703.

Power receiving devices 200 that have moved can be given higher priority for the power supply by carrying out the processes of S705 and S706. This is because it is assumed that when a device moves, that device will be unable to receive the supplied power radiated by the power supply device 100, or will be unable to receive that power efficiently. This will be described in detail with reference to FIG. 9A as well.

By setting the power supply order of the detected plurality of power receiving devices 200 as in this process, the power supply device 100 can carry out the power supply process efficiently.

Although the movement frequency information is described as the device information of the power receiving devices 200 in this process, the power supply order may be set using other information of the power receiving devices 200. For example, state information of the power receiving devices 200 may be used. Specifically, if a power receiving device 200 is in an operating state, it is assumed that the device will move as a result of being manipulated by a user, and thus the power supply-side control unit 101 carries out control to raise that device in the power supply order. On the other hand, if a power receiving device 200 is in a sleep state, the device is highly unlikely to move, and thus control is carried out to lower that device in the power supply order.

Information from accelerometers (not illustrated) included in the power receiving devices 200 may be used in addition to the movement frequency information. For example, if a power receiving device 200 moves extensively, it is assumed that the position of the device will vary, and thus the power supply-side control unit 101 raises that device in the power supply order. On the other hand, if a power receiving device 200 moves little or not at all, the position of the device is highly unlikely to vary, and thus that device is lowered in the power supply order.

Power supply history information of the power receiving devices 200 may be used in addition to the movement frequency information. Specifically, the power supply-side control unit 101 raises a power receiving device 200 in the power supply order if that device has only been able to receive less than a predetermined amount of power in the previous power supply period. On the other hand, the device is lowered in the power supply order if the device has been able to receive the predetermined amount of power or more.

It is assumed that the power supply-side control unit 101 may receive a plurality of pieces of the movement frequency information described above from the power receiving devices 200 and set the power supply order on the basis of the plurality of pieces of movement frequency information. At this time, even if there is no power receiving device 200 that has moved since the previous calibration period in S704, the process may move to S703 and the power supply order may be set again.

Control Process when Detecting Movement of Power Receiving Device

Furthermore, a sequence of operations in a control process carried out by the power supply device 100 according to the second embodiment will be described with reference to FIG. 8A. These processes are realized by the power supply-side control unit 101 loading, into RAM, programs stored in ROM internal to the power supply-side control unit 101 and then executing those programs. This process is a sequence of operations that runs in the background of the control process illustrated in FIGS. 3A and 3B.

In S801, the power supply-side control unit 101 determines whether there is a power receiving device 200 that has moved since the previous calibration period, on the basis of movement information of the power receiving devices 200 received from the detected power receiving devices 200 through the power supply-side communication unit 104. If it is determined that there are no power receiving devices 200 that have moved since the previous calibration period, the process moves to S802. If it is determined that there is a power receiving device 200 that has moved since the previous calibration period, the process moves to S803.

Figure 8A:
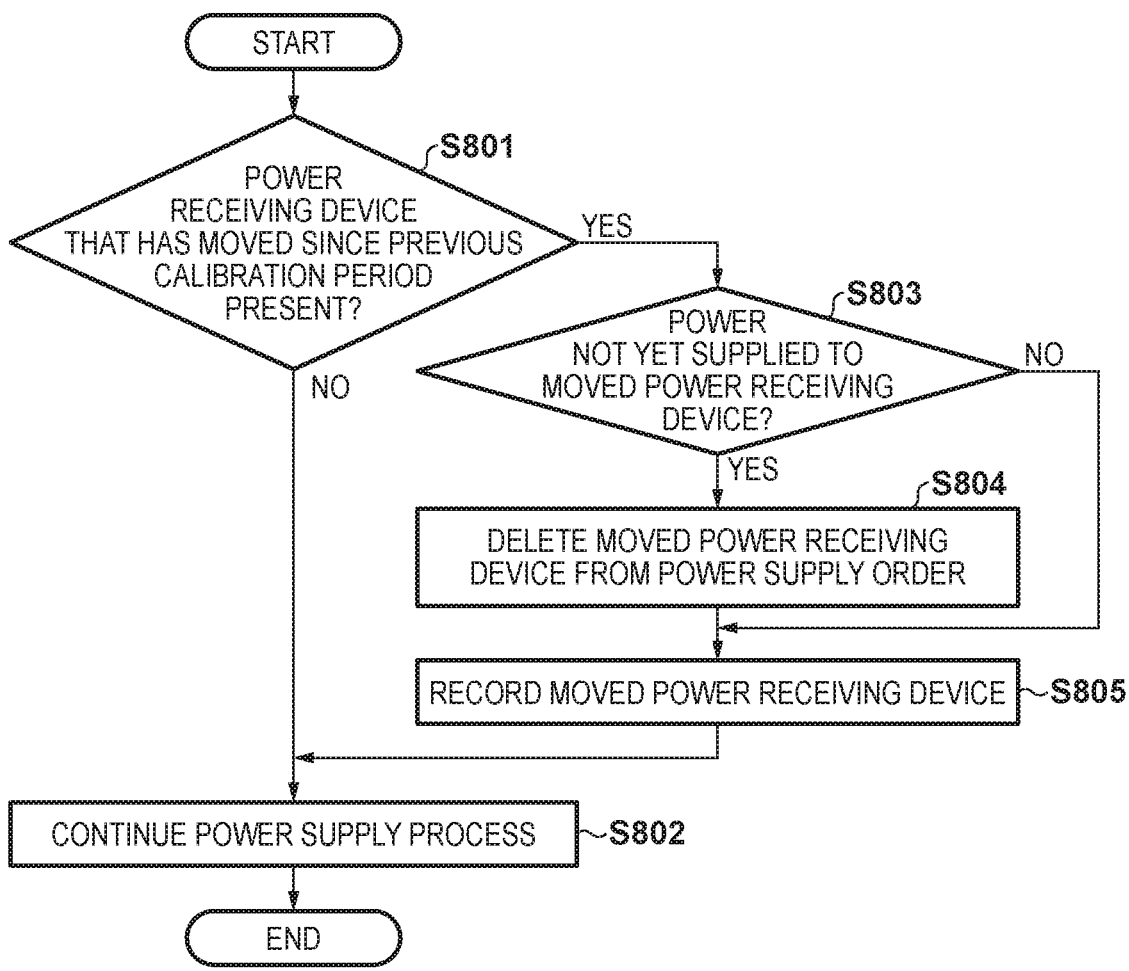
FIGS. 8A and 8B are flowcharts illustrating a sequence of operations in a control process carried out by the power supply device according to the second embodiment.

In S802, the power supply-side control unit 101 continues the power supply process being executed, and ends the process illustrated in FIG. 8A.

In S803, the power supply-side control unit 101 determines whether or not the power receiving device 200 for which movement has been detected is in a state prior to entering a power supply period. If it is determined that the power receiving device 200 that has moved is in a state prior to the supply of power, the process moves to S804. If it is determined that the power receiving device 200 that has moved is in a state after to the supply of power, the process moves to S805.

In S804, the power supply-side control unit 101 deletes the power receiving device 200 that has moved from the power supply order set earlier, and the process moves to S805. Through this, the supply of power to a power receiving device 200 that has moved and can therefore no longer be efficiently supplied with power can be stopped, and the supply of power to the next power receiving device 200 in order can be started immediately. This will be described in detail with reference to FIG. 9A as well.

In S805, the power supply-side control unit 101 stores the information of the power receiving device 200 that has moved in the RAM, after which the process moves to S802. The process of S704 may be executed on the basis of the information of the power receiving device 200 for which movement has been detected, which is stored in the RAM in the process illustrated in FIG. 8A.

Through this process, when a power receiving device 200 has moved and is therefore unable to receive the supplied power radiated by the power supply device 100, or is unable to receive that power efficiently, power is not supplied to that power receiving device 200, and the supply of power is instead started for the next power receiving device 200 in order. Doing so makes it possible to execute an efficient power supply process.

It is assumed that if none of the detected power receiving devices 200 have moved, this process may carry out control for moving to the next power supply period immediately after the present power supply period ends. This will be described in detail with reference to FIG. 9B as well.

Sequence of Operations in Control Process when New Power Receiving Device has been Detected A sequence of operations in a control process carried out by the power supply device 100 according to the present embodiment will be described with reference to FIG. 8B. This process is realized by the power supply-side control unit 101 executing a computer program stored in the RAM included in the power supply-side control unit 101. This process runs in the background of the control process illustrated in FIGS. 3A and 3B.

In S811, the power supply-side control unit 101 monitors whether or not a new power receiving device 200 is detected, through the power supply-side communication unit 104. If a new power receiving device 200 is detected, the process moves to S812. If a new power receiving device 200 is not detected, the power supply-side control unit 101 continues monitoring whether a new power receiving device 200 is detected.

Figure 8B:
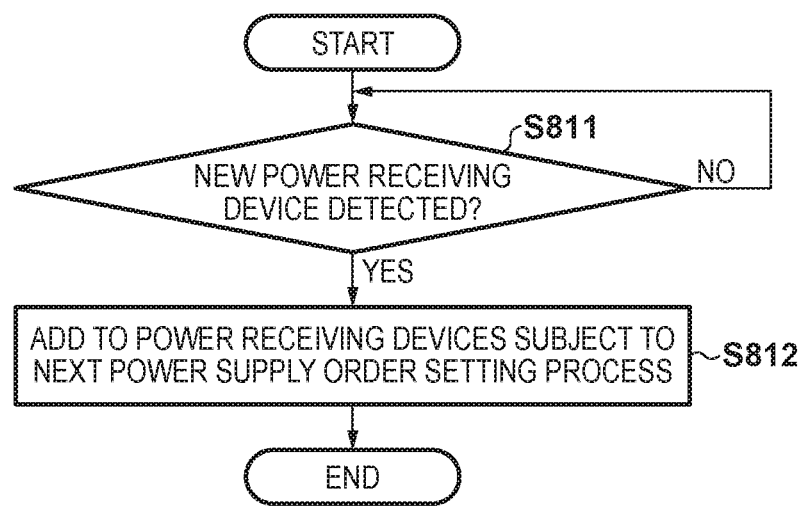

In S812, the power supply-side control unit 101 stores the newly-detected power receiving device 200 as subject to the next power supply order setting process (i.e. adds the power receiving device 200 be subject to the power supply order setting process), and then ends the process of FIG. 8B.

This process makes it possible to set the power supply order for a power receiving apparatus 200 newly detected during the power supply process.

Timing Chart

Next, timings in the power supply process according to the present embodiment will be described with reference to FIGS. 9A and 9B. A power supply process carried out when four power receiving devices 200 are detected is illustrated in this timing chart. The power supply process described here is assumed to be a process in which calibration periods and power supply periods occur in an alternating manner.

FIG. 9A illustrates an example of the power supply order setting process when a power receiving device 3 has moved before its turn for power supply period 1 has arrived.

First, in calibration period 1, calibration is carried out for a power receiving device 1, a power receiving device 2, the power receiving device 3, and a power receiving device 4. The power supply order is then set to the order of power receiving device 1, power receiving device 2, power receiving device 3, and power receiving device 4. It is assumed here that the power receiving device 3 has moved while power is being supplied to the power receiving device 1 in power supply period 1. In this case, the power receiving device 3 have moved before its turn for power supply period 1 has arrived, and is thus canceled from being subject to power supply in power supply period 1, with the power receiving device 4 being supplied with power after the power receiving device 2 is supplied with power.

Next, in calibration period 2, calibration is again carried out for the power receiving device 1, the power receiving device 2, the power receiving device 3, and the power receiving device 4. Because power was not supplied to the power receiving device 3 earlier in power supply period 1, the power supply order is set to the order of power receiving device 3, power receiving device 1, power receiving device 2, and power receiving device 4 in power supply period 2. The power supply time for the power receiving device 3 in power supply period 2 is set to be longer than for the power receiving device 1, the power receiving device 2, and the power receiving device 4.

Thus the efficiency of the overall power supply process can be increased by not supplying power to the power receiving device 3, which cannot by supplied with power efficiently in power supply period 1 with the settings made in calibration period 1. Raising the level of priority of the power receiving device 3 for the power supply in power supply period 2 makes it possible to supply power to the power receiving device 3 before the next time the power receiving device 3 moves, and makes it possible to reduce the likelihood that power will again not be supplied to the power receiving device 3.

On the other hand, FIG. 9B illustrates an example of the power supply order setting process when the four detected power receiving devices 200 have not moved.

First, in calibration period 1, calibration is carried out for the power receiving device 1, the power receiving device 2, the power receiving device 3, and the power receiving device 4. The power supply order is then set to the order of power receiving device 1, power receiving device 2, power receiving device 3, and power receiving device 4, and power is supplied to the power receiving devices 200 according to the power supply order. If the four detected power receiving devices 200 have not moved upon power supply period 1 ending, control is carried out to skip calibration period 2 and start power supply period 2. Through this, the efficiency of the overall power supply process can be increased by skipping the calibration period when the settings from calibration period 1 need not be changed.

Third Embodiment

Next, a third embodiment will be described. The third embodiment differs from the above-described embodiments in that the power supply order is set in accordance with the required charging times of the secondary batteries in the power receiving device. Of the power receiving devices constituting the wireless power supply system, the network camera is replaced with an activity meter, and different reference signs are used for the power receiving apparatuses for the sake of simplicity. However, the power receiving devices 200 and power receiving devices 1100 have the same configurations, and the configuration of the power supply device 100 is the same as well. Additionally, the control processes carried out by the power supply device are the same with the exception of the setting of the power supply order in accordance with the required charging time of the secondary batteries. As such, identical configurations and identical processes will be assigned the same reference signs as in the above-described embodiments, and redundant descriptions will be omitted, with the descriptions focusing on the differences.

The power supply device 100 according to the present embodiment obtains charging amount information (described later) from the power receiving devices and calculates a charging time required by each of the power receiving devices. The power supply order is then set to prioritize power receiving devices having shorter required charging times. Doing so makes it possible for a power receiving device having a short required charging time to reach a usable charge amount quickly without waiting for the charging periods of the other power receiving devices. This will be described in detail below.

As illustrated in FIG. 10B, the wireless power supply system according to the present embodiment is constituted by the power supply device 100 and a plurality of power receiving devices 1100 (the individual numbers of the power receiving devices are 1100a, 1100b, 1100c, and 1100d). The power receiving devices 1100 are an activity meter, indicated by the power receiving device 1100a; a smartphone, indicated by the power receiving device 1100b; a remote controller indicated by the power receiving device 1100c, and a camera, indicated by the power receiving device 1100d.

The power supply device 100 communicates with the power receiving devices 1100 wirelessly to detect that the power receiving devices 1100 are present. The power supply device 100 then receives calibration signals sent from the power receiving devices 1100 and detects the direction of each of the power receiving devices 1100.

Upon detecting the power receiving devices 1100, the power supply device 100 controls power supplied to the array antenna 103 within the power supply device 100, and radiates microwaves in the directions of the power receiving devices 1100 to output supplied power thereto.

Each of the power receiving devices 1100 receives the power supply output from the power supply device 100 and charges the secondary battery 205 within that power receiving device 1100. Each power receiving device 1100 holds information pertaining to the charging of its own secondary battery.

The charging amount information and the required charging time according to the present embodiment will be described next with reference to FIG. 10A. FIG. 10A illustrates a state of the charging of a secondary battery included in a power receiving device.

In FIG. 10A, the vertical axis represents the amount of charge in the secondary battery, and the horizontal axis represents time. 1000 in FIG. 10A represents a full charge amount, and represents an amount when the secondary battery included in the power receiving device 1100 is fully charged. 1010 represents a usable charge amount, and represents an amount of charge in the secondary battery that can be used by the power receiving device. 1020 represents the current charge amount, and represents the amount of charge currently in the secondary battery of the power receiving device. In FIG. 10A, the full charge amount 1000 is "10", the usable charge amount 1010 is "8", and the current charge amount 1020 is "2", for example. 1030 represents a required charge amount, and represents an amount required for charging from the current charge amount 1020 to the usable charge amount 1010. The full charge amount 1000, the usable charge amount 1010, the current charge amount 1020, and the required charge amount 1030 will be referred to collectively as the "charging amount information".

A required charging time 1040 is an amount of time required to charge the required charge amount. The required charging time can be found through the following formula, for example.

$$\text{required charging time} = \text{required charge amount}/(\text{charging current} \times \text{charging efficiency}) \quad \text{Formula (1)}$$

The present embodiment assumes that the charging amount information of the power receiving devices are the values indicated in FIG. 10B, for example. Specifically, the charging amount information of the power receiving device 1100a (the power receiving device 1) is assumed to be a full charge amount of 10 mAh, a usable charge amount of 8 mAh, a current charge amount of 2 mAh, and a required charge amount of 6 mAh. The charging amount information of the power receiving device 1100b (the power receiving device 2) is assumed to be a full charge amount of 1000 mAh, a usable charge amount of 800 mAh, a current charge amount of 100 mAh, and a required charge amount of 700 mAh. The charging amount information of the power receiving device 1000c (the power receiving device 3) is assumed to be a full charge amount of 4 mAh, a usable charge amount of 2 mAh, a current charge amount of 1 mAh, and a required charge amount of 1 mAh. The charging amount information of the power receiving device 1100d (the power receiving device 4) is assumed to be a full charge amount of 100 mAh, a usable charge amount of 80 mAh, a current charge amount of 70 mAh, and a required charge amount of 10 mAh.

The charging current and charging efficiency is assumed to be the same for each of the power receiving devices. Specifically, the charging current is assumed to be 200 mA, and the charging efficiency 50%.

Sequence of Operations in Power Supply Order Setting Process by Power Supply Device 100

Figure 11:
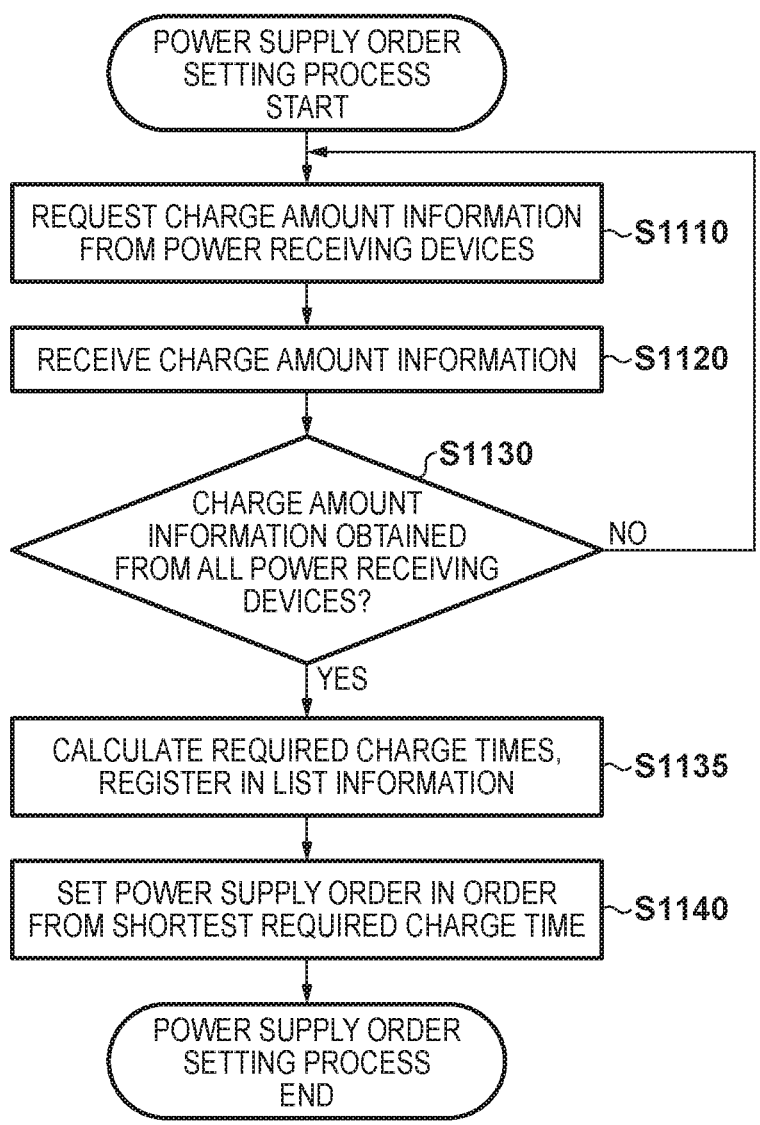
FIG. 11 is a flowchart illustrating a sequence of operations in a power supply order setting process according to the third embodiment.

A sequence of operations in the power supply order setting process according to the present embodiment will be described next with reference to FIGS. 11 and 12. FIG. 11 is a flowchart illustrating a sequence of operations in the power supply order setting process according to the present embodiment, and FIG. 12 is a diagram illustrating list information of the power receiving devices 1100 registered by the power supply device 100. The power supply order setting process illustrated in FIG. 11 is realized by the power supply-side control unit 101 loading, into RAM, programs stored in ROM internal to the power supply-side control unit 101 and then executing those programs.

In S1110, the power supply-side control unit 101 requests the power receiving devices 1100 to send the charging amount information.

In S1120, the power supply-side control unit 101 receives, through the power supply-side communication unit 104, the charging amount information sent from the power receiving devices 1100. The power supply-side control unit 101 registers the received charging amount information in the list information. The list information of the power receiving devices 1100 illustrated in FIG. 12 is an example of the list information registered by the power supply-side control unit 101, where "charging amount information" and "required charging time" fields have been added to the list information illustrated in FIGS. 4A and 4B. To simplify the illustration, the "charging amount information" field in the list information illustrated in FIG. 12 shows the full charge amount value of the charging amount information.

In S1130, the power supply-side control unit 101 determines whether the charging amount information has been obtained from all of the power receiving devices 1100. If the power supply-side control unit 101 determines that the charging amount information has been obtained from all of the power receiving devices 1100, the process moves to S1135, whereas if the power supply-side control unit 101 determines that the charging amount information has not been obtained from all of the power receiving devices 1100, the process moves to S1110, whereupon S1110 and S1120 are repeated.

In S1135, the power supply-side control unit 101 calculates the required charging time from the charging amount information, the charging current, and the charging efficiency, and registers the required charging time in the list information. Furthermore, in S1140, the power supply-side control unit 101 sets the power supply order so that charging is carried out in order starting with the shortest required charging time registered in the list information.

The power supply order setting process will be described further referring again to FIG. 12. The charging amount information of the power receiving devices is registered in a list as the information illustrated in FIG. 10B. The required charging time 1040 is calculated in S1135 through the above-described Formula (1) on the basis of the charging amount information registered in this list. The required charging time 1040 is 0.06 h for the power receiving device 1, 7 h for the power receiving device 2, 0.01 h for the power receiving device 3, and 0.1 h for the power receiving device 4. The power supply-side control unit 101 sets the power supply order so that the device having the shortest required charging time is charged first, and thus sets the power supply order so that the power receiving device 3, the power receiving device 1, the power receiving device 4, and the power receiving device 2 are charged in that order.

Timing Chart

Figure 13:
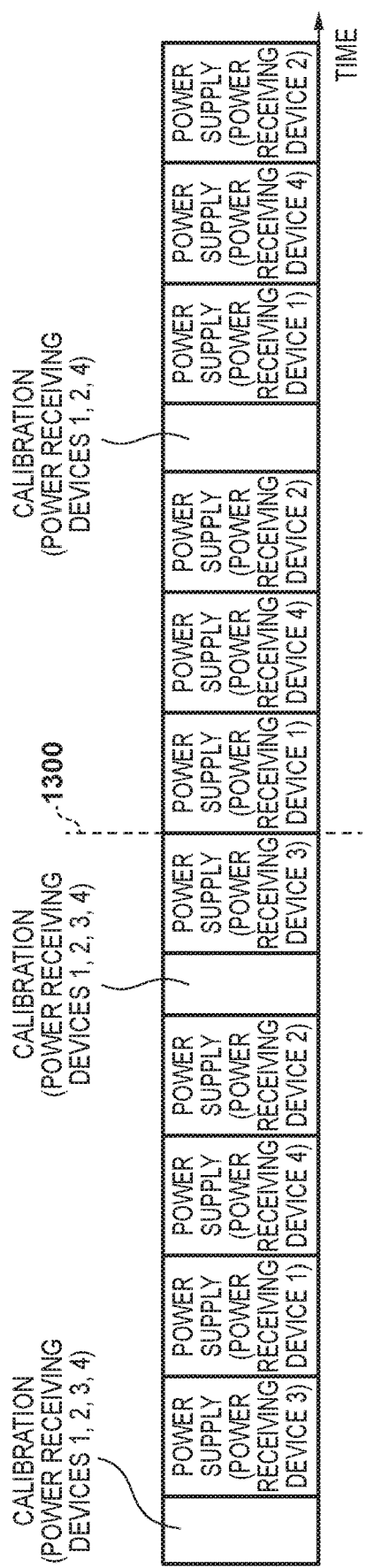
FIG. 13 is a timing chart illustrating a control process according to the third embodiment.

Timings of the power supply and calibration carried out by the power supply device 100 according to the present embodiment will be described next with reference to FIG. 13. In FIG. 13, the horizontal axis represents time and indicates time as progressing in the direction of the arrows. In the calibration illustrated in FIG. 13, the power supply order is set by carrying out the power supply order setting process according to the present embodiment as described above. The power receiving devices 1100 are then supplied with power according to the set power supply order (i.e. power receiving device 3, power receiving device 1, power receiving device 4, and power receiving device 2).

In FIG. 13, 1300 indicates the point in time when the power receiving device 3 is fully charged. Once the supply of power to the power receiving device 3 ends, the remaining three power receiving devices are calibrated at the same time in the next calibration, and power is then supplied to those three power receiving devices.

According to the present embodiment as described thus far, the power receiving devices having shorter required charging times are placed earlier in the power supply order. Accordingly, the supply of power to a power receiving device having a shorter required charging time need not be put off until the charging periods for the other power receiving devices, and thus a power receiving device having a shorter required charging time can reach its usable charge amounts more quickly. In other words, the power receiving device can be used sooner. Although the present embodiment describes there being four power receiving devices, the effect becomes more marked the more power receiving devices there are, such as 100 or 1,000.

Fourth Embodiment

Next, a fourth embodiment will be described. In the fourth embodiment, the power supply order is set on the basis of power supply efficiency values calculated using power receiving strengths of the power receiving devices (the power supply order is set to prioritize power receiving devices having higher power supply efficiency values). Accordingly, the configurations of the power supply device 100 and the power receiving devices 200 are the same as in the first embodiment and the second embodiment. The power supply device control process is also the same, with the exception of the power supply order being set on the basis of the power supply efficiency values calculated using the power receiving strengths of the power receiving devices. As such, identical configurations and identical processes will be assigned the same reference signs as in the above-described embodiments, and redundant descriptions will be omitted, with the descriptions focusing on the differences.

Sequence of Operations in Power Supply Order Setting Process by Power Supply Device 100

Figure 14:
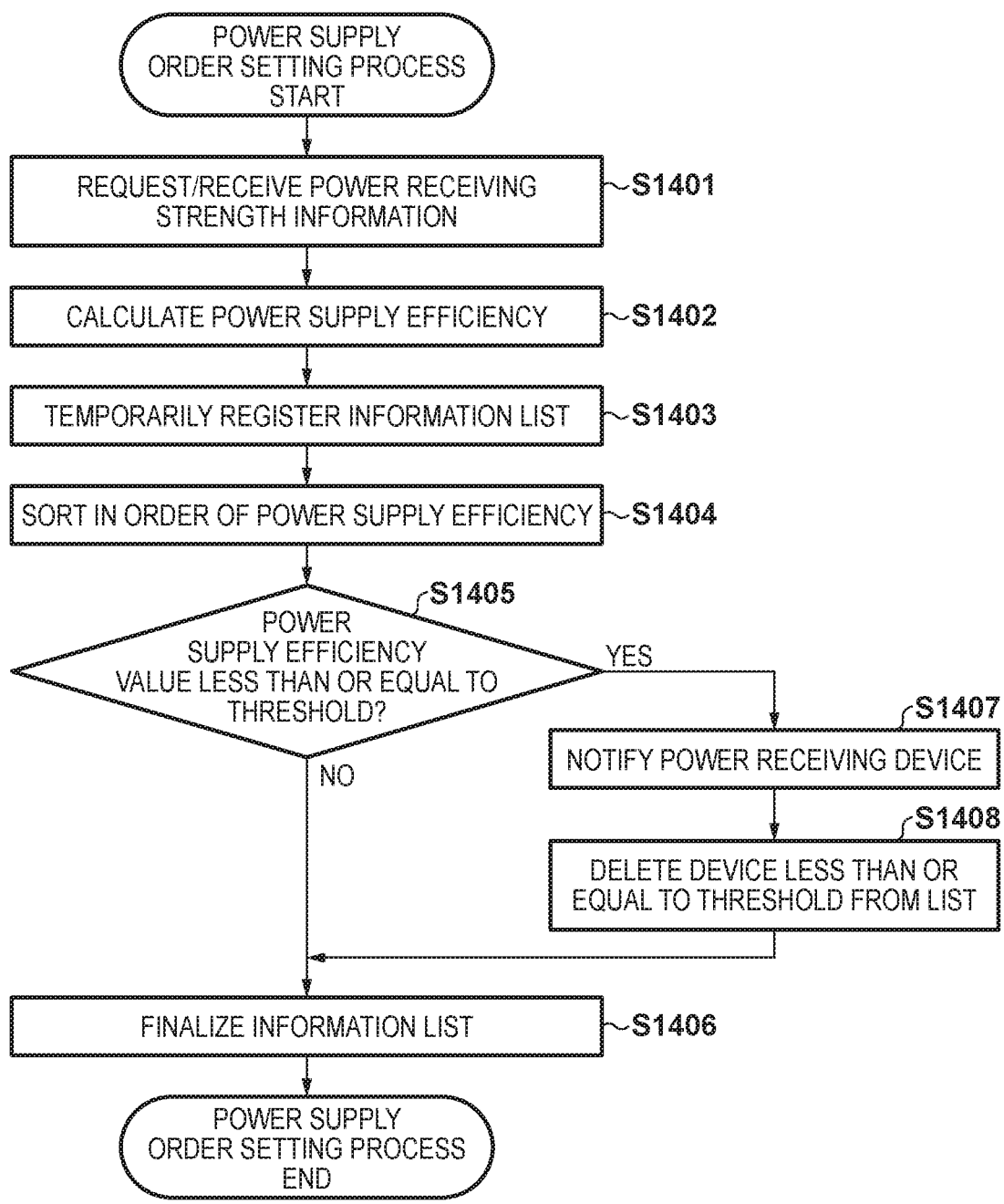
FIG. 14 is a flowchart illustrating a sequence of operations in a power supply order setting process according to a fourth embodiment.

A sequence of operations in the power supply order setting process carried out by the power supply device 100 according to the present embodiment will be described with reference to FIG. 14. The power supply order setting process illustrated in FIG. 14 is realized by the power supply-side control unit 101 loading, into RAM, programs stored in ROM internal to the power supply-side control unit 101 and then executing those programs.

In S1401, the power supply-side control unit 101 sends a request for power receiving strength information to the power receiving devices 200, and (through the power supply-side communication unit 104) receives the power receiving strength information from each of the power receiving devices 200. In S1402, the power supply-side control unit 101 calculates the power supply efficiency values using the power receiving strength information received from the power receiving devices 200. The power supply efficiency value is calculated from a ratio between the power receiving strength information received from the power receiving device 200 and a supplied power strength from the power supply device 100.

In S1403, the power supply-side control unit 101 temporarily registers the power supply efficiency values of each of the power receiving devices 200 in the information list as supplementary information. In S1404, the power supply-side control unit 101 sorts the registered information of the registered power receiving devices 200 in the information list in order from the highest power supply efficiency value.

In S1405, the power supply-side control unit 101 determines whether or not there is registered information in which the power supply efficiency value is less than or equal to a predetermined value. If the power supply-side control unit 101 determines that there is no registered information in which the power supply efficiency value is less than or equal to the predetermined value, the process moves to S1406. However, if the power supply-side control unit 101 determines that there is registered information in which the power supply efficiency value is less than or equal to the predetermined value, the process moves to S1407.

In S1407, the power supply-side control unit 101 notifies the corresponding power receiving device 200 that the power supply efficiency value is low. In S1408, the power supply-side control unit 101 updates the information list by deleting the power receiving device 200 having the power supply efficiency value less than or equal to the predetermined value from the information list sorted in S1404. Once the power supply-side control unit 101 has finished updating the registered information, the process moves to S1406.

In S1406, the power supply-side control unit 101 finalizes the information list.

Manipulating Information List in Power Supply Order Setting Process

The process through which the information list is manipulated during the above-described power supply order setting process will be described next with reference to FIGS. 15A to 15D.

FIG. 15A illustrates the data structure of a registration entry 1500 used when registering the power receiving devices 200 in the information list. Each registration entry 1500 holds the power receiving device name and the power supply efficiency value as the device information.

FIG. 15B illustrates a state after the above-described S1401 and S1402 have been carried out, where the registration entries 1500 for setting the power supply order for the power receiving devices 200 are temporarily registered in the information list in S1403. The present embodiment assumes that the registered order for the registration entries 1500 at this point in time is the order in which responses have been received from the power receiving devices 200 (the order is of course not particularly limited thereto, however).

A registration entry 1500a is an entry for the power receiving device 200a, and the power supply efficiency value is "0.5". A registration entry 1500b is an entry for the power receiving device 200b, and the power supply efficiency value is "0.7". Furthermore, a registration entry 1500c is an entry for the power receiving device 200c, and the power supply efficiency value is "0.01". A registration entry 1500d is an entry for the power receiving device 200d, and the power supply efficiency value is "0.4".

FIG. 15C illustrates a state in which the registration entries 1500 have been sorted in order from the highest power supply efficiency value in the above-described S1404. The registration entries are arranged in the order of registration entry 1500b, 1500a, 1500d, and 1500c as a result.

FIG. 15D illustrates the information list after a power receiving device 200 has been deleted as a result of the processes of S1405 and S1408. In other words, FIG. 15D illustrates a state in which it has been determined whether or not a power receiving device 200 having a power supply efficiency value of less than or equal to a predetermined threshold (e.g. 0.1) is present in the information list, and as a result, the power receiving device 200c, which has a power supply efficiency value of 0.01, has been deleted from the information list. Although the present embodiment describes an example where the threshold is 0.1, the threshold can be set as desired in accordance with the environment in which power is supplied. Ultimately, the registration entries are arranged in the order of registration entry 1500b, 1500a, and 1500d. The registration entry 1500c has too low a power supply efficiency value and is thus excluded from the supply of power. Although the registration entries in the information list are managed as a serial arrangement in a table in the present embodiment, the form in which the data is managed is not limited thereto, and another management means may be used.

According to the present embodiment as described thus far, when power is to be supplied to a plurality of power receiving devices, power is supplied in order from the power receiving device having the highest power supply efficiency value. As a result, power receiving devices having poor power supply efficiency are supplied with power later, which makes it possible to supply the power efficiently. Furthermore, not supplying power to power receiving devices having particularly poor power supply efficiency makes it possible to avoid the wasteful consumption of power.

Fifth Embodiment

Next, a fifth embodiment will be described. In the fifth embodiment, the power supply order of the power receiving devices is set on the basis of combination information held by the power receiving devices. Accordingly, the configurations of the power supply device 100 and the power receiving devices 200 are the same as in the first embodiment and the second embodiment. The power supply device control process is also the same, with the exception of the power supply order being set on the basis of the combination information held by the power receiving devices. As such, identical configurations and identical processes will be assigned the same reference signs as in the above-described embodiments, and redundant descriptions will be omitted, with the descriptions focusing on the differences.

In the present embodiment, the power supply order of the power receiving devices is set on the basis of combination information held by the power receiving devices. In particular, the power supply device 100 according to the present embodiment sets the power supply order for power receiving devices operating as a group, with priority given to power receiving devices that can only be used after being charged. For example, wireless earphones are a pair of power receiving devices, namely a right-ear device and a left-ear device, and thus can only be used once both devices are charged. With devices used as a pair (a group) in this manner, charging one device first and then charging the other device can take a long time. Additionally, if only one (some) of the devices to be used as a pair (group) are present, there are situations where the devices cannot be used effectively even once the charging is complete. Accordingly, in the present embodiment, devices constituting a pair (group) are placed next to each other in the power supply order on the basis of the combination information. Note that power receiving devices where all of the devices required for operation are present, power receiving devices that can operate independently, and so on are prioritized for power supply. This will be described in detail below.

Figure 16:
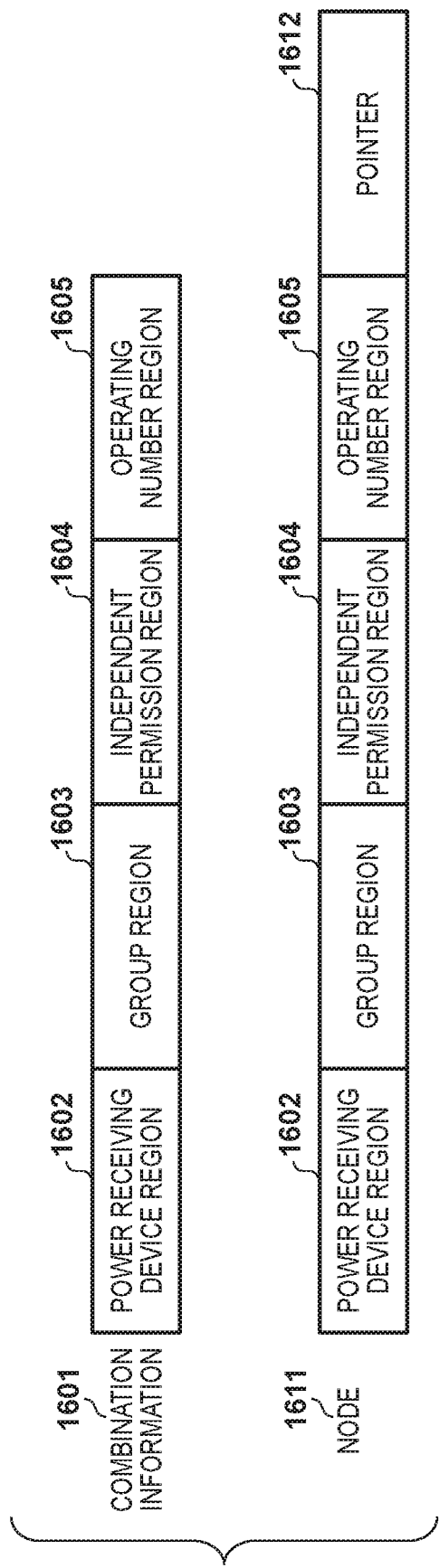
FIG. 16 is a diagram illustrating the structure of combination information held by a power receiving device and the structure of a node held by a power supply device according to a fifth embodiment.

The structure of the combination information held by the power receiving devices 200 and the structure of a node held by the power supply device 100 according to the present embodiment will be described next with reference to FIG. 16.

Combination information 1601 is held by each power receiving device 200, and includes a power receiving device region 1602, a group region 1603, an independent permission region 1604, and an operating number region 1605. The power receiving device region 1602 indicates to which power receiving device 200 the combination information 1601 corresponds. The group region 1603 indicates to which group the power receiving device 200 holding the combination information 1601 belongs. The independent permission region 1604 indicates whether or not the device can operate independently even when other power receiving devices 200 belonging to the same group are not present. If the independent permission region 1604 indicates that the device cannot operate independently, the operating number region 1605 indicates the number of other power receiving devices 200 belonging to the same group that are necessary for operation.

A node 1611 is held by the power supply device 100, and is constituted by data and a pointer 1612. The data includes regions that hold the power receiving device region 1602, the group region 1603, the independent permission region 1604, and the operating number region 1605 received from the power receiving devices 200. The node 1611 is an element having a linear list structure, and a data structure in which nodes 1611 are connected is established by the pointer 1612 specifying the address of a next node. The node following a given node 1611 is deleted by changing the pointer 1612 of that given node 1611 to the address of the node 1611 two nodes forward. Also, a new node 1611 is inserted by changing the pointer 1612 of a given node 1611 to the address of the new node 1611. These are typical operations in a linear list structure.

An example of a list of nodes held by the power supply device 100 according to the present embodiment will be described next with reference to FIG. 17. In the example of FIG. 17, a list constituted by seven nodes is used, and a power receiving device 1, a power receiving device 2, a power receiving device 3, a power receiving device 4, a power receiving device 5, a power receiving device 6, and a power receiving device 7 are assigned to the first node 1 in the list to the seventh node 7 in the list.

In this example of the node list, the power receiving device 1, the power receiving device 4, and the power receiving device 6 belong to the same group A. Likewise, the power receiving device 3 and the power receiving device 7 belong to the same group B; the power receiving device 5, to group C; and the power receiving device 2, to group D. The "independent permission" region being set to 0 indicates that the device cannot operate independently, and thus groups B and D cannot operate independently. The devices therefore must operate with other power receiving devices in the same group (i.e. operate as a plurality of power receiving apparatuses). The "operating number" region in the list illustrated in FIG. 17 indicates that when there are three power receiving devices in the same group, for group A, and two power receiving devices in the same group, for groups B, C, and D, those devices operate as a group.

Sequence of Operations in Power Supply Order Setting Process by Power Supply Device 100

A power supply order setting process for the power receiving devices 200 based on the combination information, carried out by the power supply device 100 according to the present embodiment, will be described next with reference to FIG. 18. The power supply order setting process illustrated in FIG. 18 is realized by the power supply-side control unit 101 loading, into RAM, programs stored in ROM internal to the power supply-side control unit 101 and then executing those programs.

In S1801, the power supply-side control unit 101 requests the power receiving devices 200, which have been detected through the device detection and registration process described in the first embodiment, to send the combination information 1601. In S1802, the power supply-side control unit 101 receives, through the power supply-side communication unit 104, the combination information 1601 sent from all of the power receiving devices 200 detected through the device detection and registration process.

In S1803, the power supply-side control unit 101 temporarily sets the power supply order on the basis of a predetermined condition. For example, the movement frequency information of the second embodiment, the charging amount information of the third embodiment, the power receiving strength information of the fourth embodiment, or the like is used as the predetermined condition for setting the power supply order.

In S1804, the power supply-side control unit 101 carries out a process for setting the power supply order of power receiving devices 200 belonging to the same group, using the combination information 1601. Details will be given later with reference to FIG. 19. In S1805, the power supply-side control unit 101 carries out a process for setting the power supply order of power receiving devices 200 for which there are no other power receiving devices 200 belonging to the same group, using the combination information 1601. Details will be given later with reference to FIG. 20.

Sequence of Operations in Power Supply Order Change Process for Power Receiving Devices Belonging to Same Group Next, a sequence of operations a power supply order change process for power receiving devices belonging to the same group, carried out by the power supply device 100, will be described with reference to FIG. 19. In this series of operations, the order of the nodes is rearranged so that the nodes are arranged by group.

In S1901, the power supply-side control unit 101 inputs the number of nodes in the list into a variable m, and initial values of 0 into variables i and j. In S1902, the power supply-side control unit 101 adds 1 to i, and in S1903, substitutes the value obtained by adding 1 to i for j.

In S1904, the power supply-side control unit 101 determines whether or not the group of the ith node in the list is the same as the group of the jth node in the list. If the power supply-side control unit 101 determines that the groups are the same, the process moves to S1905, but if the power supply-side control unit 101 determines that the groups are not the same, the process moves to S1907. In S1905, the power supply-side control unit 101 deletes the jth node in the list from the list. In S1906, the power supply-side control unit 101 inserts the jth node in the list, which has been deleted from the list, after the ith node (i.e. through S1905 and S1906, moves the node so as to be next to the nodes in the same group so as to collect the nodes into a group).

In S1907, the power supply-side control unit 101 determines whether or not j and m have the same value. If the power supply-side control unit 101 determines that j and m have the same value, the process moves to S1909, but if the power supply-side control unit 101 determines that j and m do not have the same value, the process moves to S1908. In S1908, the power supply-side control unit 101 repeats the same operations for the next node by adding 1 to j. The process returns to S1904 as a result.

In S1909, the power supply-side control unit 101 determines whether or not j and (m−1) have the same value. The power supply order change process for the power receiving devices belonging to the same group ends if j and (m−1) are determined to have the same value, and the process returns to S1902 if j and (m−1) are determined to have different values.

Sequence of Operations in Power Supply Order Change Process for Power Receiving Devices Belonging to Same Group Next, a sequence of operations in the power supply order change process for when there are no other power receiving devices belonging to the same group, carried out by the power supply device according to the present embodiment, will be described with reference to FIG. 20.

In S2001, the power supply-side control unit 101 inputs the number of nodes in the list into the variable m, and an initial value of 0 into a variable n. In S2002, the power supply-side control unit 101 substitutes m for the variable i and (m−1) for the variable j. In S2003, the power supply-side control unit 101 determines whether or not the ith node in the list can operate independently (i.e. whether or not "independent permission" is 0). If the power supply-side control unit 101 determines that the node being processed cannot operate independently (that "independent permission" is 0), the process moves to S2004, and if the power supply-side control unit 101 determines that the node being processed can operate independently (that "independent permission" is not 0), the process moves to S2005. In S2004, the power supply-side control unit 101 subtracts 1 from i and moves to the processing of another node of higher priority.

In S2005, the power supply-side control unit 101 substitutes the value obtained by subtracting 1 from i for j. In S2006, the power supply-side control unit 101 determines whether or not the group of the ith node in the list is the same as the group of the jth node in the list (i.e. the node above the ith node in the list). The process moves to S2007 if the groups are the same, and to S2009 if the groups are not the same. The power supply-side control unit 101 adds 1 to n in S2007 and subtracts 1 from j in S2008. In other words, the power supply-side control unit 101 repeats the process of counting the number of nodes in the same group.

On the other hand, if nodes from different groups have been discovered, in S2009, the power supply-side control unit 101 determines whether or not (n+1) has the same value as the number in "operating number" for the ith node in the list. In other words, the power supply-side control unit 101 determines whether or not the number of nodes matching the number specified by "operating number" in the ith node in the list is present in the same group, and the devices can operate as a group. The process moves to S2012 if the power supply-side control unit 101 determines that the values are the same (that the devices can operate as a group), and moves to S2010 if the power supply-side control unit 101 determines that the values are not the same (the number is lower than the operating number and thus the devices cannot operate as a group).

If the number of nodes in the same group does not match the number specified by the operating number, the power supply-side control unit 101 deletes the (i−n)th to ith nodes from the list in S2010. Then, in S2011, the power supply-side control unit 101 inserts the (i−n)th to ith nodes, which have been deleted from the list, after the mth node in the list.

In S2012, the power supply-side control unit 101 changes the node bring processed by subtracting (n+1) from i, and the process then moves to S2013. In S2013, it is determined whether or not all of the nodes have been processed (i.e. whether i is 0). If the power supply-side control unit 101 determines that all of the nodes have been processed (that i is 0), the power supply order change process in which there are no other power receiving devices belonging to the same group ends, and if i is not 0, the process returns to S2003.

The power supply order after the above-described power supply order setting process has been carried out will be described next with reference to FIGS. 21A and 21B. Note that the order of first to seventh in the list after the power supply order setting process is the order from first to seventh in the power supply order.

Figure 19:
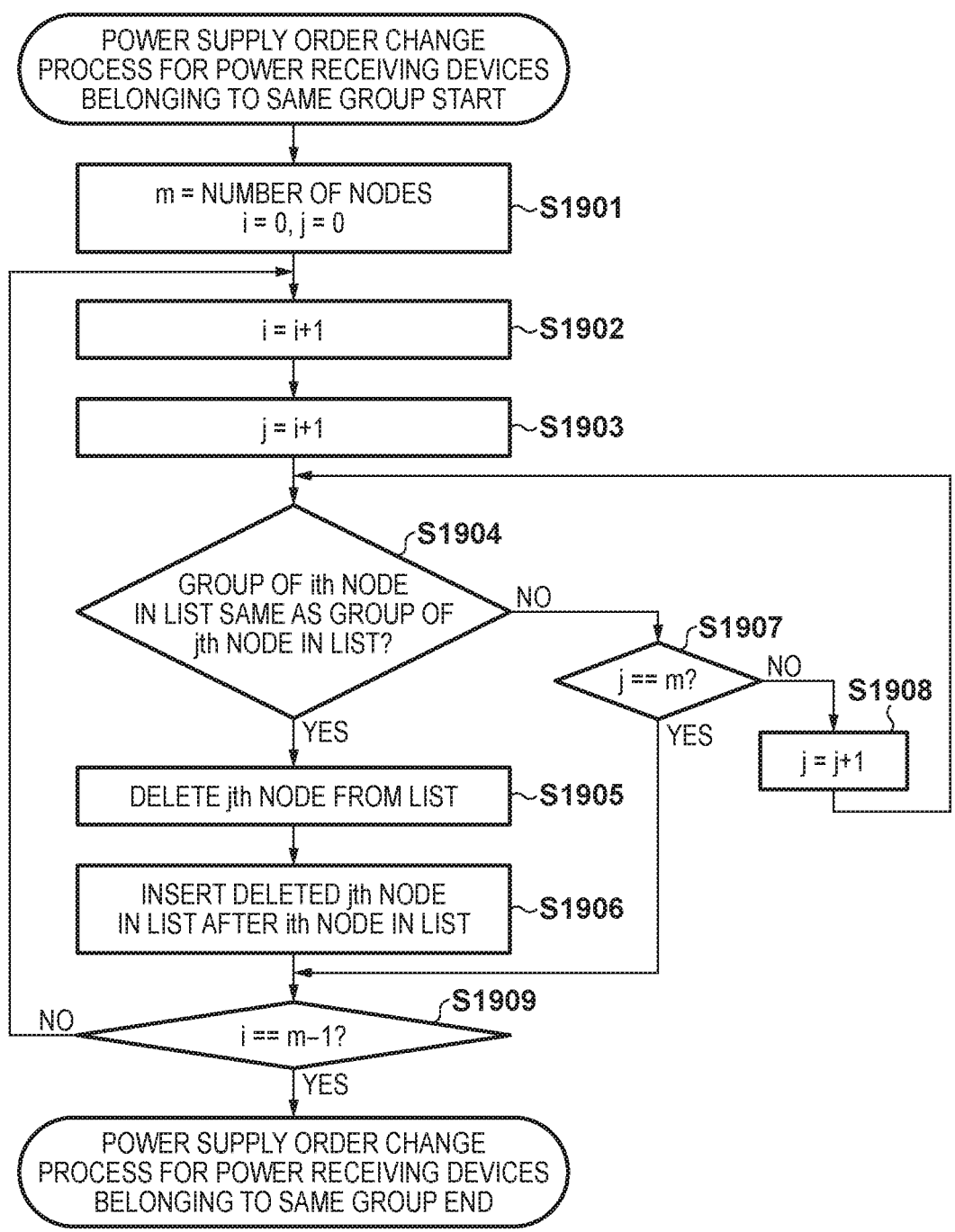
FIG. 19 is a flowchart illustrating a power supply order change process of power receiving devices belonging to the same group, according to the fifth embodiment.

FIG. 21A illustrates a state of the list after the power supply order change process for power receiving devices belonging to the same group, illustrated in FIG. 19, has been carried out on the list illustrated in FIG. 17. With respect to node 1, which is first in the list, the first node in the same group A in the list order is node 4. Accordingly, node 4 is inserted in the second place in the list. With respect to node 4, which is second in the list, the first node in the same group A in the list order is node 6. Accordingly, node 6 is inserted in the third place in the list.

With respect to node 6, which is third in the list, there is no first node in the same group A in the list order. Accordingly, node 2 remains fourth in the list. With respect to node 2, which is fourth in the list, there is no first node in the same group D in the list order. Accordingly, node 3 remains fifth in the list. With respect to node 3, which is fifth in the list, the first node in the same group B in the list order is node 7. Accordingly, node 7 is inserted in the sixth place in the list. With respect to node 7, which is sixth in the list, there is no first node in the same group B in the list order. Accordingly, node 5 remains seventh in the list.

As a result of this process, the list order is changed to node 1, node 4, node 6, node 2, node 3, node 7, and node 5.

Figure 20:
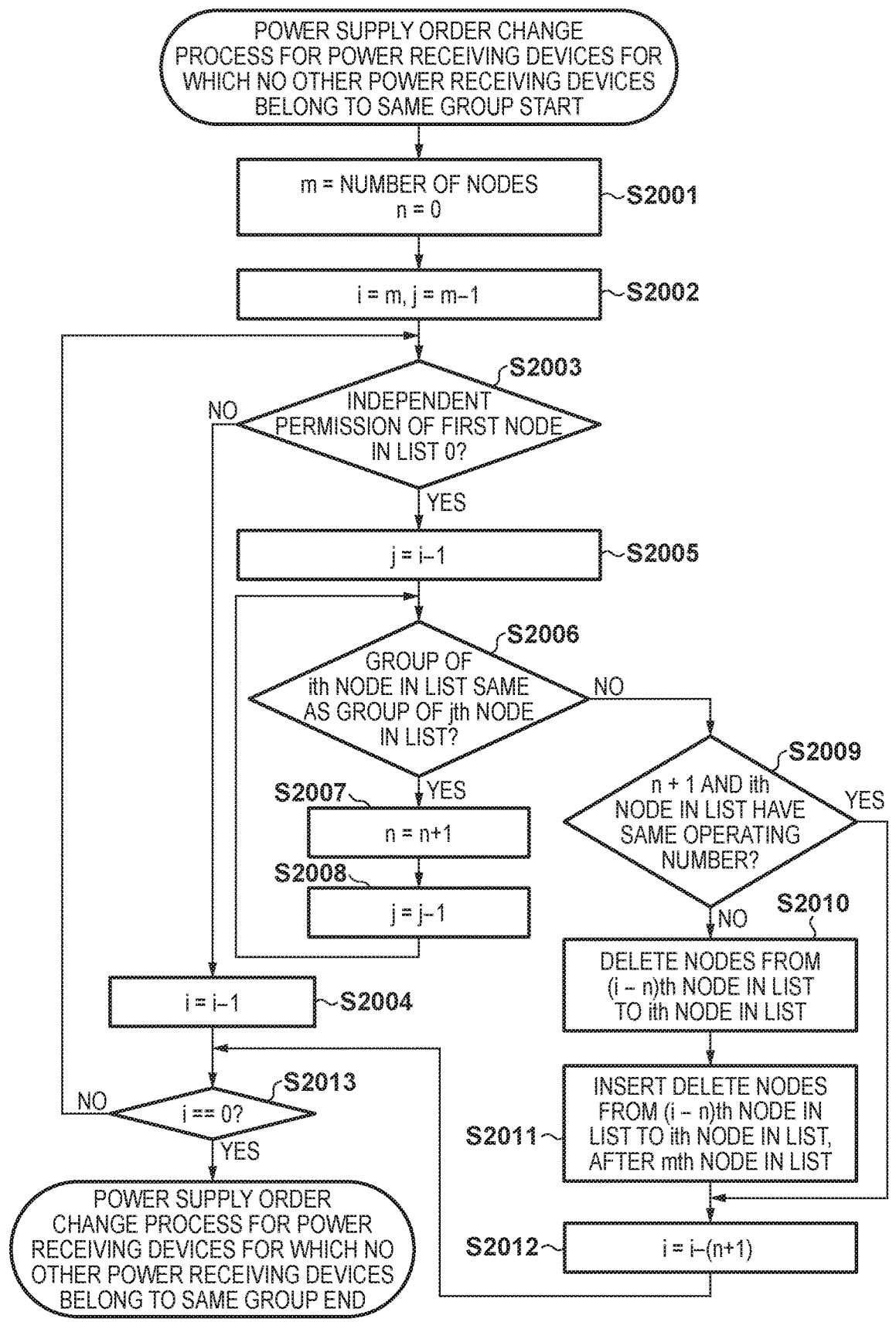
FIG. 20 is a flowchart illustrating a power supply order change process of a power receiving device for which no other power receiving devices belong to the same group, according to the fifth embodiment.

FIG. 21B illustrates a state of the list after the power supply order change process for when there are no other power receiving devices belonging to the same group, illustrated in FIG. 20, has been carried out on the list illustrated in FIG. 21A.

With respect to the seventh node in the list, in group C, the node in group C can operate independently. The order in the list therefore does not change.

With respect to the fifth and sixth nodes in the list, in group B, the nodes in group B cannot operate independently. There are two nodes in group B, namely nodes 3 and 7, which matches the operating number of group B, namely "2". The number of nodes in group B is the same as the operating number of group B, and thus the order of the list is not changed.

With respect to the fourth node in the list, in group D, the node in group D cannot operate independently. There is one node in group D, namely node 2, but the operating number in group D is "2". The number of nodes in group D is different from the operating number of group D, and thus node 2, which is fourth in the list, is inserted in seventh place in the list. With respect to the first to third nodes in the list, in group A, the nodes in group A can operate independently. The order in the list therefore does not change.

As a result of this process, the list order is node 1, node 4, node 6, node 3, node 7, node 5, and node 2. Accordingly, the power supply order after the power supply order setting process is carried out on the list in FIG. 17 is set to power receiving device 1, power receiving device 4, power receiving device 6, power receiving device 3, power receiving device 7, power receiving device 5, and power receiving device 2.

According to the present embodiment as described thus far, when the power receiving devices form groups and can operate as a group, power receiving devices that can operate independently, power receiving devices that cannot operate independently but that meet a specified number of devices, and so on are prioritized. Thus when supplying power to a plurality of power receiving devices, the supply of power will not be skewed toward a single power receiving device, and charging amounts can thus be balanced.

Sixth Embodiment Next, a sixth embodiment will be described. The sixth embodiment differs from the above-described embodiments in that the power supply order is set in accordance with emergency situation necessity level information. The power receiving devices constituting the wireless power supply system are different, and different reference signs are used for the power receiving apparatuses for the sake of simplicity. However, the power receiving devices 200 and power receiving devices 2200 have the same configurations, and the configuration of the power supply device 100 is the same as well. Additionally, the control processes carried out by the power supply device are the same with the exception of the setting of the power supply order in accordance with the emergency situation necessity level information. As such, identical configurations and identical processes will be assigned the same reference signs as in the above-described embodiments, and redundant descriptions will be omitted, with the descriptions focusing on the differences.

System Configuration

As illustrated in FIG. 22, the wireless power supply system according to the present embodiment is constituted by the power supply device 100 and a plurality of power receiving devices 2200 (the individual numbers of the power receiving devices are 2200a, 2200b, 2200c, 2200d, 2200e, and 2200f).

The power receiving devices 2200 are devices used in the event of an emergency, such as a flashlight, indicated by the power receiving device 2200a; a remote controller, indicated by the power receiving device 2200b; a flashlight, indicated by the power receiving device 2200c; a battery, indicated by the power receiving device 2200d; a camera, indicated by the power receiving device 2200e; and a headlamp, indicated by the power receiving device 2200f.

In this system, the power supply device 100 communicates with the power receiving devices 2200 wirelessly to detect that the power receiving devices 2200 are present. The power supply device 100 then receives calibration signals sent from the power receiving devices 2200 and detects the direction of each of the power receiving devices 2200. Upon detecting the power receiving devices 220X), the power supply device 100 controls power supplied to the array antenna 103 within the power supply device 100, and radiates microwaves in the directions of the power receiving devices 2200 to output supplied power thereto. Each of the power receiving devices 2200 receives the power supply output from the power supply device 100 and charges the secondary battery (not illustrated) within that power receiving device 2200.

In the present embodiment, each of the power receiving devices 2200 holds item information indicating the type of that device. Each of the power receiving devices 2200 also holds the emergency situation necessity level information, which is set in accordance with how necessary it is to use that device during an emergency. The magnitude of a necessity level indicated by the emergency situation necessity level information corresponds to the power supply order used when the power supply device 100 supplies power to the power receiving devices 2200, and thus power receiving apparatuses having higher necessity levels are prioritized in the power supply order.

For example, in the example illustrated in FIG. 22, the power receiving device 2200a holds item information of "flashlight" and emergency situation necessity level information of "1". The power receiving device 2200b holds item information of "remote controller" and an emergency situation necessity level information of "3", and the power receiving device 2200c holds item information of "flashlight" and emergency situation necessity level information of "1". Furthermore, the power receiving device 2200d holds item information of "battery" and emergency situation necessity level information of "1", and the power receiving device 2200e holds item information of "camera" and emergency situation necessity level information of "2". Finally, the power receiving device 2200f holds item information of "headlamp" and emergency situation necessity level information of "2". Although a lower value for the emergency situation necessity level information indicates a higher priority in the present embodiment, the values are not limited thereto, and for example, a higher value may indicate a higher priority instead.

Figure 23:
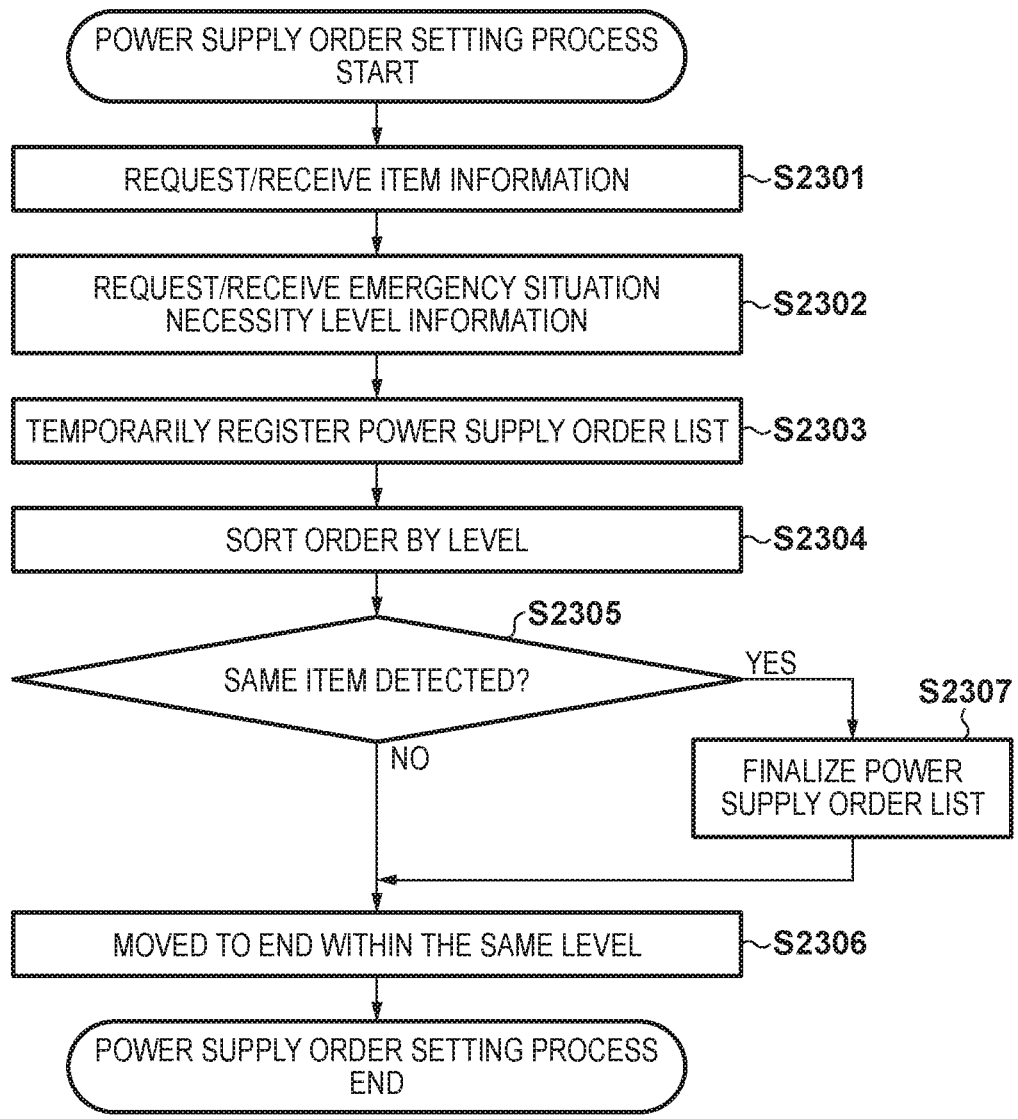
FIG. 23 is a flowchart illustrating a sequence of operations in a power supply order setting process according to the sixth embodiment.

Sequence of Operations in Power Supply Order Setting Process by Power Supply Device Next, a sequence of operations in a power supply order setting process carried out by the power supply device 100 according to the present embodiment will be described with reference to FIG. 23. The power supply order setting process illustrated in FIG. 23 is realized by the power supply-side control unit 101 loading, into RAM, programs stored in ROM internal to the power supply-side control unit 101 and then executing those programs.

In S2301, the power supply-side control unit 101 requests the item information from each of the power receiving devices 2200, and receives the item information from each of the power receiving devices 2200. In S2302, the power supply-side control unit 101 requests the emergency situation necessity level information from each of the power receiving devices 2200, and receives the emergency situation necessity level information from each of the power receiving devices 2200.

In S2303, the power supply-side control unit 101 temporarily registers the item information and emergency situation necessity level information of each of the power receiving devices 2200 in the information list as supplementary information. In S2304, the power supply-side control unit 101 sorts the registered information of the registered power receiving devices 2200 in the information list in order of priority according to the emergency situation necessity level information.

In S2305, the power supply-side control unit 101 determines whether or not, in a collection of registered information in which the emergency situation necessity level information has the same level, there is registered information having the same item information.

If the power supply-side control unit 101 determines that a plurality of instances of the same item information have not been detected, the process moves to S2306. On the other hand, if the power supply-side control unit 101 determines that a plurality of instances of the same item information have been detected, the process moves to S2307.

In S2306, the power supply-side control unit 101 finalizes the information list. In S2307, the power supply-side control unit 101 moves the second and subsequent detected registered information to the end of the registered information in which the emergency situation necessity level information has the same level. The changed information list is finalized in S2307.

Manipulating Information List During Power Supply Order Setting Process

FIGS. 24AA to 24AC illustrate a process through which the information list is manipulated, based on the operations in the power supply order setting process according to the present embodiment. FIG. 24AA illustrates the data structure of a registration entry 2400 used when registering the power receiving devices 2200 in the information list. The registration entry 2400 holds the power receiving device name, the item information, and the emergency situation necessity level information as the device information.

FIG. 24AB illustrates a state after the above-described S2301 and S2302 have been carried out, where the registration entries 2400 for setting the power supply order for the power receiving devices 2200 are temporarily registered in the information list in S2303. The present embodiment assumes that the registered order for the registration entries 2400 at this point in time is the order in which responses have been received from the power receiving devices 2200, but the order is of course not particularly limited thereto.

In the temporarily-registered information list, a registration entry 2400a is an entry for the power receiving device 2200a, where the item information is "flashlight" and the emergency situation necessity level information is "level 1". A registration entry 2400b is an entry for the power receiving device 2200b, where the item information is "remote controller" and the emergency situation necessity level information is "level 3". A registration entry 2400c is an entry for the power receiving device 2200c, where the item information is "flashlight" and the emergency situation necessity level information is "level 1". Furthermore, a registration entry 2400d is an entry for the power receiving device 2200d, where the item information is "battery" and the emergency situation necessity level information is "level 1". A registration entry 2400e is an entry for the power receiving device 2200e, where the item information is "camera" and the emergency situation necessity level information is "level 2". Finally, a registration entry 2400f is an entry for the power receiving device 2200f, where the item information is "headlamp" and the emergency situation necessity level information is "level 2".

FIG. 24AC illustrates a state in which the registration entries 2400 have been sorted in order according to the emergency situation necessity level information in the above-described S2304. In FIG. 24AC, the emergency situation necessity level information in the registration entry 2400b is "level 3", and because this is the lowest level among all the entries, that entry is moved to the end of the information list. The registration entries are arranged in the order of registration entry 2400a. 2400c, 2400d. 2400e, 2400f, and 2400b as a result.

FIG. 24B illustrates a state following a process in which, if entries of the same type of item are present among entries in which the emergency situation necessity level information has the same level in the above-described S2305 and S2307, the second and subsequent detected entries are moved to the end within that same level. To be more specific, the registration entry 2400c belongs to an entry group in which the emergency situation necessity level information is "level 1", and the registration entry 2400a, which has the same item information of "flashlight" as the registration entry 2400c, is present within that entry group. In the state illustrated in FIG. 24AC, described above, the registration entry 2400c was registered after the registration entry 2400a, and thus the registration entry 2400c is moved to the end in the entry group of "level 1". As a result, the entry group of "level 1" is arranged in the order of registration entry 2400a, 2400d, and 2400c, as indicated by the information list illustrated in FIG. 24B.

Although the registration entries in the information list are managed as a serial arrangement in a table in the present embodiment, the form in which the data is managed is not limited thereto. For example, the data may be managed as a hash tree data structure that takes the emergency situation necessity level information as hash keys, as illustrated in FIG. 24C.

According to the present embodiment as described thus far, when supplying power to a plurality of power receiving devices, the power supply order is set in accordance with how necessary each of emergency power receiving devices is during an emergency, and the power is supplied in order from devices having a higher degree of necessity. This makes it possible to increase the likelihood that power receiving devices for emergencies, which are highly necessary during an emergency, will be sufficiently charged and thus usable.

Seventh Embodiment

Next, a seventh embodiment will be described. In the seventh embodiment, the power supply order of the power receiving devices is set on the basis of usage expectation information. Accordingly, the configurations of the power supply device 100 and the power receiving devices 200 are the same as in the first embodiment and the second embodiment. Additionally, the control processes carried out by the power supply device are the same with the exception of the setting of the power supply order on the basis of the usage expectation information. As such, identical configurations and identical processes will be assigned the same reference signs as in the above-described embodiments, and redundant descriptions will be omitted, with the descriptions focusing on the differences.

In the setting of the power supply order according to the present embodiment, usage expectations are taken into consideration so that power receiving devices that are expected to be used are prioritized for charging, reducing the likelihood that the power receiving devices will run out of charge during use and become unusable. Furthermore, power receiving devices having longer usage periods are prioritized for charging, so that the necessary charging is carried out in light of the characteristics of each power receiving device.

FIG. 25 is a diagram illustrating the structure of the usage expectation information held by the power receiving devices 200 and the structure of a node held by the power supply device 100 according to the present embodiment. Usage expectation information 2501 is held by each power receiving device 200, and includes a power receiving device region 2502, a usage timing region 2503, a usage period region 2504, and a usage history region 2505. The power receiving device region 2502 indicates to which power receiving device 200 the usage expectation information 2501 corresponds. The usage timing region 2503, the usage period region 2504, and the usage history region 2505 will be described later with reference to FIG. 26.

A node 2511 is held by the power supply device 100, and is constituted by data and a pointer 2512. The data includes the power receiving device region 2502, the usage timing region 2503, the usage period region 2504, and the usage history region 2505 received from the power receiving devices 200. The node 2511 is an element having a linear list structure, and a data structure in which nodes 2511 are connected is established by the pointer 2512 specifying the address of a next node.

For example, with a linear list constituted by three nodes, the second node 2511 can be deleted from the linear list by changing the pointer 2512 of the first node 2511 to the address of the third node 2511. Additionally, a new node 2511 can be inserted between the first node 2511 and the second node 2511 by changing the pointer 2512 of the first node 2511 to the address of the new node 2511. These are typical operations in a linear list structure.

Figure 26:
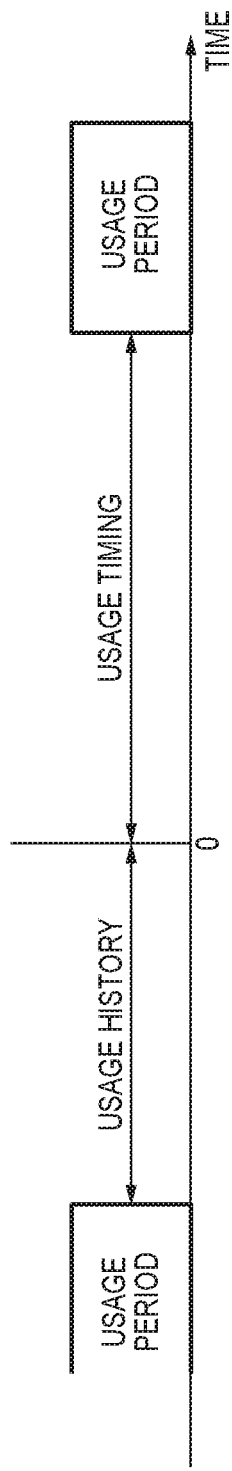
FIG. 26 is a diagram illustrating a usage timing, a usage period, and a usage history for a power receiving device according to the seventh embodiment.

FIG. 26 illustrates a usage timing, a usage period, and a usage history for a power receiving device according to the present embodiment. The horizontal axis represents time and indicates time as progressing in the direction of the arrows, with the point 0 representing the current time.

Referring again to FIG. 25, the usage timing region 2503 is a region holding a value indicating the usage timing, which is the time until the power receiving device 200 is to be used. The usage period region 2504 is a region holding a value indicating the usage period, which is a period in which the power receiving device 2000 is used. The usage history region 2505 is a region holding a value indicating the usage history, which is an amount of time that has passed since the power receiving device 200 was last used.

A list of nodes held by the power supply device 100 according to the present embodiment will be described next with reference to FIG. 27. In the example of FIG. 27, a list constituted by six nodes is used, and the usage expectation information 2501 of a power receiving device 1, a power receiving device 2, a power receiving device 3, a power receiving device 4, a power receiving device 5, and a power receiving device 6 are held by the first node 1 in the list to the sixth node 6 in the list. "0 hours" in the usage timing region 2503 indicates that no use is expected.

Specifically, it is expected that the power receiving device 1 will be used 10 hours from now, for one hour, and one hour has passed since the device was last used. It is expected that the power receiving device 2 will be used 0.1 hours from now, for two hours, and three hours have passed since the device was last used. It is not expected that the power receiving device 3 will be used (because the usage timing is "0"), and three hours have passed since the device was last used. Furthermore, it is expected that the power receiving device 4 will be used 10 hours from now, for two hours, and seven hours have passed since the device was last used. It is not expected that the power receiving device 5 will be used, and seven hours have passed since the device was last used; and it is expected that the power receiving device 6 will be used five hours from now, for one hour, and one hour has passed since the device was last used.

Figure 28:
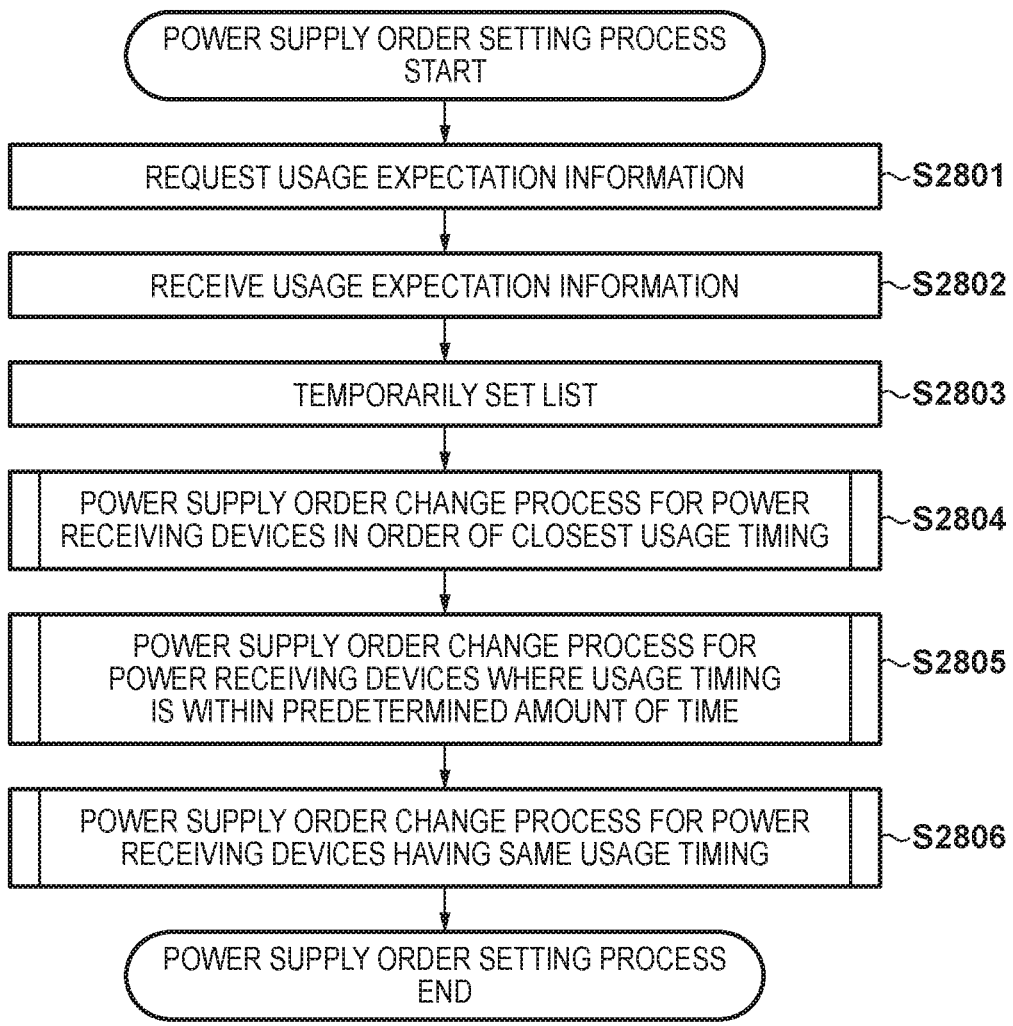
FIG. 28 is a flowchart illustrating a sequence of operations in a power supply order setting process according to the seventh embodiment.

Sequence of Operations in Power Supply Order Setting Process Based on Usage Expectation Information A sequence of operations in the power supply order setting process based on the usage expectation information, carried out by the power supply device 100 according to the present embodiment, will be described with reference to FIG. 28. The power supply order setting process illustrated in FIG. 28 is realized by the power supply-side control unit 101 loading, into RAM, programs stored in ROM internal to the power supply-side control unit 101 and then executing those programs.

In S2801, the power supply-side control unit 101 requests the power receiving devices 200, which have been detected through the device detection and registration process described in the first embodiment, to send the usage expectation information 2501. In S2802, the power supply-side control unit 101 receives the usage expectation information 2501 sent from all of the power receiving devices 200 detected through the device detection and registration process described in the first embodiment.

In S2803, the power supply-side control unit 101 creates the node 2511, which are elements having a linear list structure, from the received usage expectation information 2501, and temporarily sets the list. The list is temporarily set to the order in which the usage expectation information 2501 was received, for example.

In S2804, the power supply-side control unit 101 carries out a process for setting the power supply order of power receiving devices 200 in order of the device having the nearest usage timing, using the usage expectation information 2501. Details will be given later with reference to FIG. 29. Furthermore, in S2805, the power supply-side control unit 101 carries out a process for setting the power supply order of the power receiving devices 200 having usage timings within a predetermined amount of time, using the usage expectation information 2501. Details will be given later with reference to FIG. 30. In S2806, the power supply-side control unit 101 carries out a process for setting the power supply order of the power receiving devices 200 having the same usage timings, using the usage expectation information 2501. Details will be given later with reference to FIGS. 31A and 31B.

Figure 29:
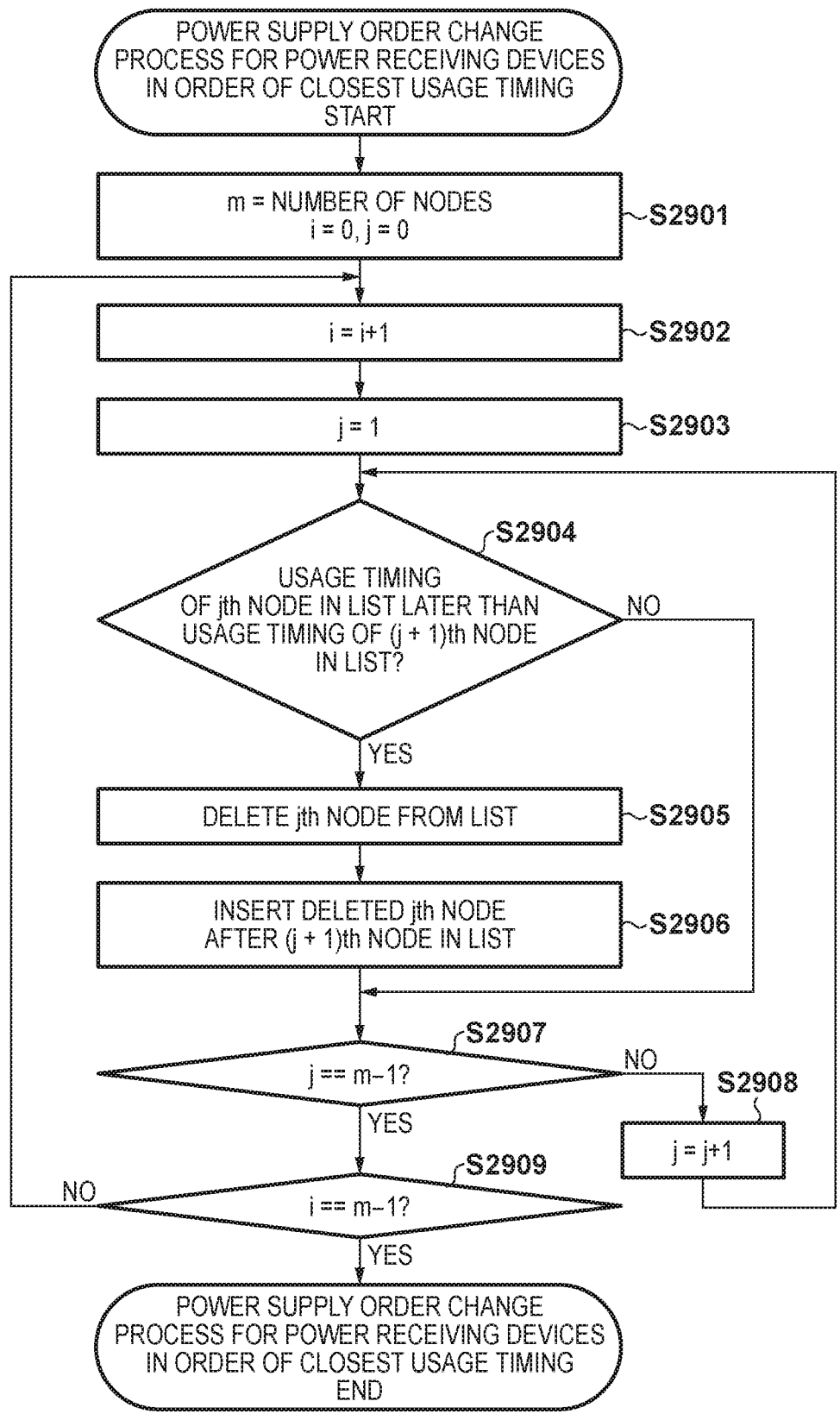
FIG. 29 is a flowchart illustrating a power supply order change process of power receiving devices ordered by which device has the nearest usage timing, according to the seventh embodiment.

A process for changing the power supply order of power receiving devices in order of the device having the nearest usage timing, carried out by the power supply device according to the present embodiment, will be described next with reference to FIG. 29.

In S2901, the power supply-side control unit 101 inputs the number of nodes in the list into a variable m, and initial values of 0 into variables i and j. In S2902 to S2903, the node being processed is taken as i+1 and a node to be evaluated is taken as j, and the nodes to be evaluated are set in order. In other words, in S2902, the power supply-side control unit 101 adds 1 to i. In S2903, the power supply-side control unit 101 substitutes 1 for j.

In S2904, the power supply-side control unit 101 determines whether or not the usage timing of the jth node in the list is further from the usage timing of the (j+1)th node in the list in order to rearranged the nodes to be evaluated in order from the node having the nearest usage timing. If the power supply-side control unit 101 determines that the node is further, the process moves to S2905, but if the power supply-side control unit 101 determines that the node is nearer, the process moves to S2907. In S2905, the power supply-side control unit 101 deletes the jth node in the list from the list. In S2906, the power supply-side control unit 101 inserts the jth node in the list, which was deleted from the list, after the (j+1)th node in the list. In other words, the jth node in the list is moved to after the (j+1)th node in the list.

In S2907, the power supply-side control unit 101 determines whether or not j and (m−i), which express positions in the list, have the same value. If the power supply-side control unit 101 determines that j and m have the same value, the process moves to S2909, but if the power supply-side control unit 101 determines that j and m do not have the same value, the process moves to S2908.

In S2908, the power supply-side control unit 101 adds 1 to j to change the node to be evaluated to a new node. In S2909, the power supply-side control unit 101 determines whether or not i and (m−1) have the same value (i.e. whether the node being processed is the last node in the list). If i and (m−1) are determined to have the same value, the process for changing the power supply order of power receiving devices in order of the device having the nearest usage timing is ended (because all of the nodes have been processed). However, if i and (m−1) are determined to have different values, the process returns to S2902 and the next node to be processed is then processed.

Figure 30:
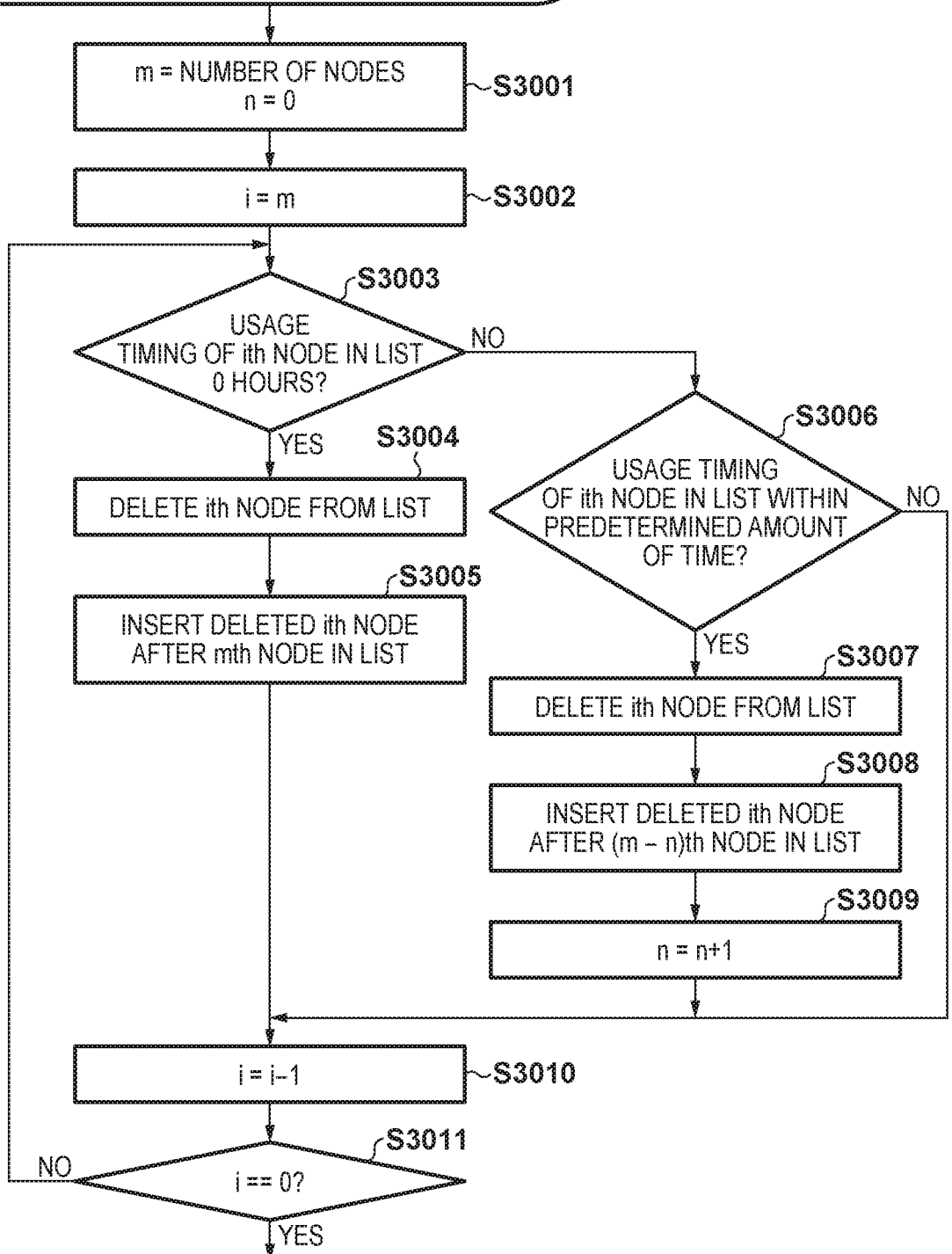
FIG. 30 is a flowchart illustrating a power supply order change process of power receiving devices having usage timings within a predetermined amount of time, according to the seventh embodiment.

A power supply order change process for power receiving devices having usage timings within a predetermined amount of time, carried out by the power supply device, will be described next with reference to FIG. 30.

In S3001, the power supply-side control unit 101 inputs the number of nodes in the list into the variable m and an initial value of 0 into the variable n, and in S3002, substitutes m for the variable i in order to set the final node in the list as the node to be processed. In S3003, the power supply-side control unit 101 determines whether or not the usage timing of the ith node in the list is 0 hours (i.e. whether the device is expected to be used). If the power supply-side control unit 101 determines that the usage timing is 0 hours (that the device is not expected to be used), the process moves to S3004, but if the power supply-side control unit 101 determines that the usage timing is not 0 hours (that the device is expected to be used), the process moves to S3006.

In S3004, the power supply-side control unit 101 deletes the ith node in the list from the list in order to give a lower priority to power receiving devices not expected to be used. Then, in S3005, the power supply-side control unit 101 inserts the jth node in the list, which was deleted from the list, after the mth node in the list.

In S3006, the power supply-side control unit 101 determines whether or not the usage timing of the ith node in the list is within a predetermined amount of time. If the power supply-side control unit 101 determines that the usage timing is within the predetermined amount of time, the process moves to S3007, but if the power supply-side control unit 101 determines that the usage timing is not within the predetermined amount of time, the process moves to S3010.

In S3007, the power supply-side control unit 101 deletes the ith node from the list, and furthermore, in S3008, inserts the jth node in the list, which was deleted from the list, after the (m−n)th node in the list. In other words, the power supply-side control unit 101 rearranges the nodes so that the priority levels of all nodes having a usage timing within the predetermined amount of time are raised together.

The power supply-side control unit 101 adds 1 to n in S3009 and subtracts 1 from i in S3010. In S3011, the power supply-side control unit 101 determines whether or not i is 0. If the power supply-side control unit 101 determines that the process has ended for all of the nodes (that i is 0), the power supply order change process for power receiving devices having usage timings within a predetermined amount of time ends. On the other hand, if the process has not ended for all of the nodes (i is not 0), the process returns to S3003 and is repeated.

Furthermore, a sequence of operations in the power supply order change process for power receiving devices having the same usage timing, carried out by the power supply device, will be described with reference to FIGS. 31A and 31B.

In S3101, the power supply-side control unit 101 inputs the number of nodes in the list into the variable m, and an initial value of 0 into the variables n, i, j, and k. In S3102 to S3103, the node being processed is taken as i+1 and a node to be evaluated is taken as j, and the nodes to be evaluated are set in order. In other words, in S3102, the power supply-side control unit 101 adds 1 to i, and furthermore, in S3103, substitutes the value obtained by adding 1 to i for j.

In S3104, the power supply-side control unit 101 determines whether or not the usage timing of the ith node in the list is the same as the usage timing of the jth node in the list. If the power supply-side control unit 101 determines that the usage timings of the nodes are the same, the process moves to S3105, but if the power supply-side control unit 101 determines that the usage timings of the nodes are not the same, the process moves to S3108.

In S3105, the power supply-side control unit 101 adds 1 to n. In other words, if it has been determined that the usage timings of the nodes are the same, the number of nodes for which the usage timings are the same is incremented. Then, in S3106, the power supply-side control unit 101 determines whether or not j and m have the same value. If the power supply-side control unit 101 determines that j and m have the same value (i.e. that all candidate nodes have been examined), the process moves to S3108, but if the power supply-side control unit 101 determines that j and m do not have the same value, the process moves to S3107 to further examine candidate nodes. The power supply-side control unit 101 adds 1 to j in S3107.

In S3108, the power supply-side control unit 101 determines whether or not n is 0 in order to evaluate the number of nodes for which the usage timings are the same. If the power supply-side control unit 101 determines that n is 0, the process moves to S3121, but if the power supply-side control unit 101 determines that n is not 0, the process moves to S3109.

In S3109, the power supply-side control unit 101 determines whether or not the usage timing of the ith node in the list is set to 0 hours. If the usage timing is determined to be 0 hours, the process moves to S3110, but if the usage timing is determined to not be 0 hours, the process moves to S3111.

In S3110, the power supply-side control unit 101 determines whether or not the usage timing of the ith node in the list is older than the usage history of the (i+1)th node in the list. If the power supply-side control unit 101 determines that the usage history of the ith node in the list is older, the process moves to S3112, but if the power supply-side control unit 101 determines that the usage history of the ith node in the list is newer, the process moves to S3114.

On the other hand, in S3111, the power supply-side control unit 101 determines, for nodes in which the usage timing is not 0, whether or not the usage period of the ith node in the list is shorter than the usage period of the (i+1)th node in the list. If the power supply-side control unit 101 determines that the usage period of the ith node in the list is shorter, the process moves to S3112, but if the power supply-side control unit 101 determines that the usage period of the ith node in the list is longer, the process moves to S3114.

In S3112, the power supply-side control unit 101 deletes the ith node from the list, and furthermore, in S3113, inserts the ith node in the list, which was deleted from the list, after the (i+1)th node in the list.

In S3114, the power supply-side control unit 101 determines whether or not i and (j−(2+k)) have the same value. If the power supply-side control unit 101 determines that i and (j=(2+k)) have the same value, the process moves to S3116. If the power supply-side control unit 101 determines that i and (j−(2+k)) do not have the same value, the process moves to S3115 in order to update the node being processed and repeat the process. In S3115, i is incremented, and the process returns to S3109.

In S3116, the power supply-side control unit 101 determines whether or not k and (n−1) have the same value. The process moves to S3119 if it is determined that k and (n−1) have the same value, and moves to S3117 if it is determined that k and (n−1) do not have the same value.

The power supply-side control unit 101 subtracts (n−1) from i in S3117 and adds 1 to k in S3118. The power supply-side control unit 101 adds n to i in S3119, and in S3120, inputs 0 into the variables n and k so that the node can be processed as a new node having the same usage timing.

In S3121, the power supply-side control unit 101 determines whether or not all of the nodes to be processed have been evaluated (i.e. whether i and (m−1) have the same value). If the power supply-side control unit 101 determines that i and (m−1) have the same value, the power supply order change process for power receiving devices having the same usage timing ends, whereas if the power supply-side control unit 101 determines that i and (m−1) do not have the same value, the process returns to S3102 to process a new node.

The power supply order after the above-described power supply order setting process according to the present embodiment has been carried out will be described next with reference to FIGS. 32A to 32C. Note that the order of first to sixth in the list after the power supply order setting process is the order from first to sixth in the power supply order.

FIG. 32A illustrates a list obtained after the power supply order change process of power receiving devices in order of the device having the nearest usage timing, described with reference to FIG. 29, has been carried out on the list illustrated in FIG. 27. The process illustrated in FIG. 29 is also called "bubble sorting". In this process, the order is not changed when the nodes being compared have the same usage timings. As a result, the list order is node 3, node 5, node 2, node 6, node 1, and node 4.

FIG. 32B illustrates a list obtained after the power supply order change process of power receiving devices in which the usage timings are within the predetermined amount of time, described with reference to FIG. 30, has been carried out on the list illustrated in FIG. 32A. Note that the power supply order change process for the power receiving devices having usage timings within the predetermined amount of time changes the power supply order from the sixth place in the list, and for example, the predetermined amount of time for the usage timings is set to 0.5 hours in FIG. 32B.

First, with respect to node 4, which is sixth in the list, the usage timing is 10 hours later, which comes after the predetermined amount of time of 0.5 hours; as such, the order of that node in the list is not changed. Also, with respect to node 1, which is fifth in the list, the usage timing is 10 hours later, which comes after the predetermined amount of time of 0.5 hours; as such, the order of that node in the list is not changed. Likewise, with respect to node 6, which is fourth in the list, the usage timing is 5 hours later, which comes after the predetermined amount of time of 0.5 hours; as such, the order of that node in the list is not changed.

On the other hand, with respect to node 2, which is third in the list, the usage timing is 0.1 hours later, which is within the predetermined amount of time of 0.5 hours; as such, the power supply-side control unit 101 inserts node 2 into sixth place in the list. Furthermore, with respect to node 5, which is second in the list, the usage timing is 0 hours, and thus the power supply-side control unit 101 inserts node 5 into sixth place in the list. Further still, with respect to node 3, which is first in the list, the usage timing is 0 hours, and thus the power supply-side control unit 101 inserts node 3 into sixth place in the list. As a result, the list order is node 6, node 1, node 4, node 2, node 5, and node 3.

Figure 31A:
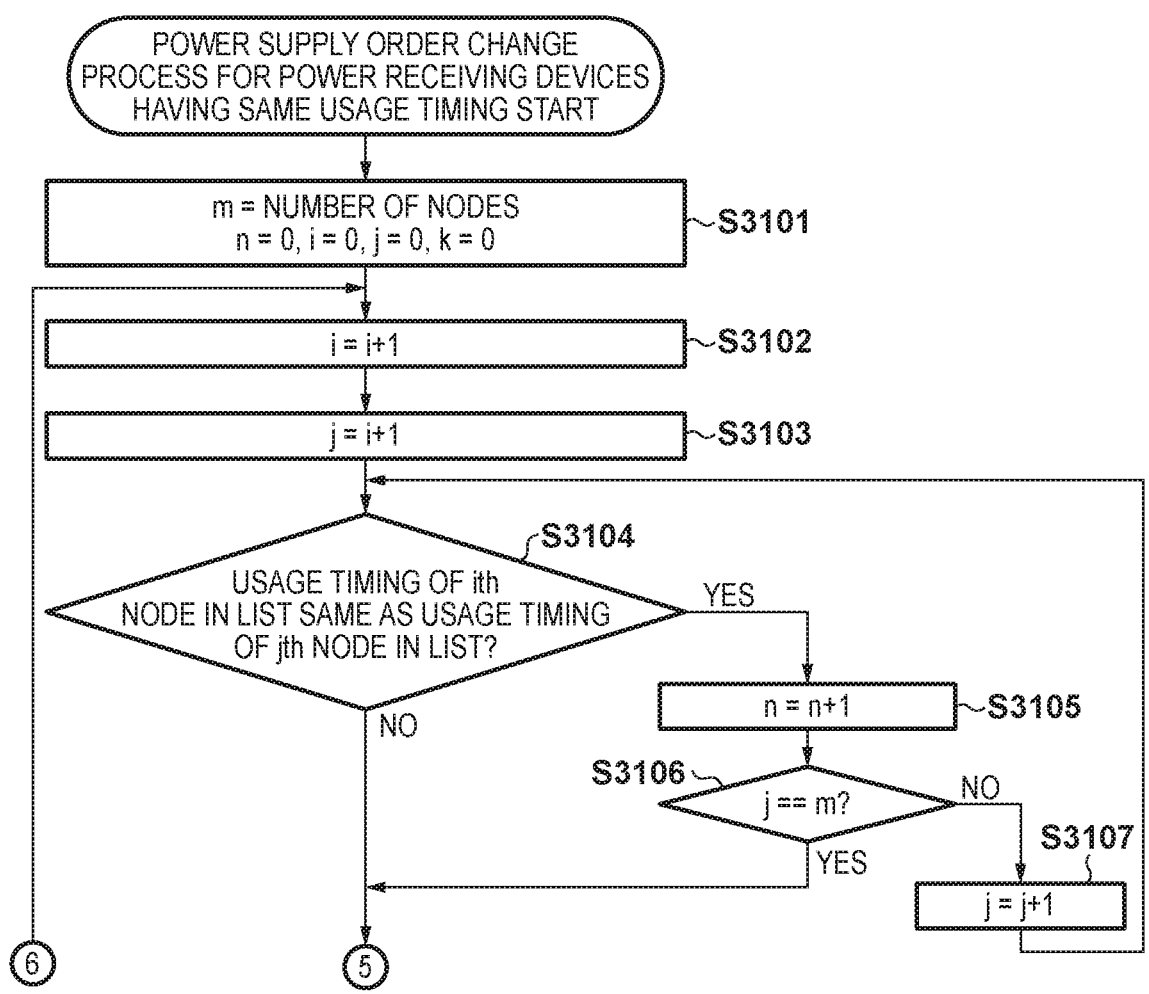
FIGS. 31A and 31B are flowcharts illustrating a power supply order change process of power receiving devices having the same usage timings, according to the seventh embodiment.
Figure 31B:
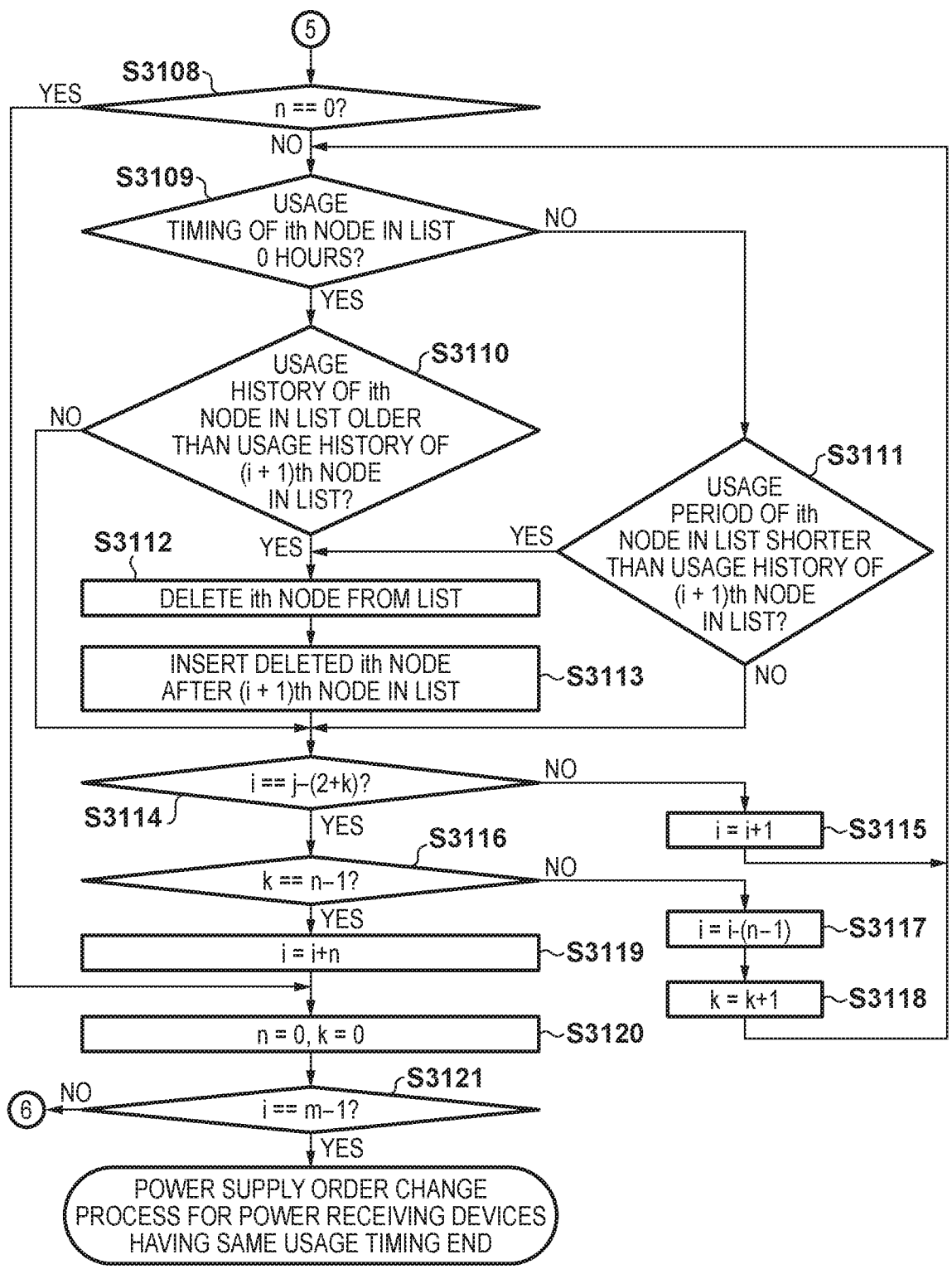

Furthermore, FIG. 32C illustrates a list obtained after the power supply order change process for the same usage timings, illustrated in FIGS. 31A and 31B, have been executed on the list illustrated in FIG. 32B.

In the list illustrated in FIG. 32B, with respect to node 6, which is first in the list, there are no nodes having the same usage timing, and thus the order in the list is not changed. Furthermore, with the second and third nodes in the list, for which the usage timing is 10 hours later, the usage timings are the same and the usage timings are not 0 hours later. The usage periods of these nodes are therefore compared. The comparison shows that the usage period of node 1 is shorter than node 4, and thus node 1 is inserted into third place in the list. Additionally, with respect to node 2, which is fourth in the list, there are no nodes having the same usage timing, and thus the order in the list is not changed.

For the fifth and sixth nodes in the list, in which the usage timing is 0 hours later, the usage timings are the same and the usage timings are 0 hours later, and thus the power supply-side control unit 101 compares the usage histories of the nodes. Comparing the usage histories shows that the usage history of node 5 is older than node 3, and thus node 5 is inserted into sixth place in the list.

As a result of this process, the list order is node 6, node 1, node 4, node 2, node 3, and node 5. Accordingly, the power supply order after the power supply order setting process is carried out on the list in FIG. 27 is finalized as power receiving device 6, power receiving device 4, power receiving device 1, power receiving device 2, power receiving device 3, and power receiving device 5.

According to the present embodiment as described thus far, when supplying power to a plurality of power receiving devices, power receiving devices expected to be used are charged with priority. Doing so makes it possible to prevent a situation in which a power receiving device has an insufficient charge and cannot operate when the device is to be used.

Additionally, by prioritizing the charging of power receiving devices having longer usage periods, each power receiving device can be charged according to the charge required during the usage period. Furthermore, by lowering the level of priority in the power supply order for power receiving devices expected to be used immediately, the charging can be carried out efficiently in a limited charging period.

Although the foregoing embodiment describes an example in which the usage expectation information is sent from the power receiving devices to the power supply device, the method is not limited thereto. For example, the power supply device may hold the usage expectation information of all of the power receiving devices in advance. Alternatively, the power supply device or a separately-provided server may estimate the expected usage of the power receiving devices on the basis of lifestyle patterns of the user of the power receiving devices, and the usage expectation information may be generated on the basis thereof. The above-described present embodiment can be applied in any of these situations.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-102961, filed May 24, 2017, which is hereby incorporated by reference herein in its entirety.

What is claimed is:

1. A power supply apparatus that can wirelessly supply power to a plurality of power receiving apparatuses, the power supply apparatus comprising:
a plurality of antennae;
a communication antenna; and
a control unit,
wherein the control unit carries out control so that timing information and feature information are sent, via the communication antenna, to the plurality of power receiving apparatuses, the timing information being for controlling the plurality of power receiving apparatuses to send calibrations signals at the same time during a same predetermined calibration period, and the feature information being different for each power receiving apparatus to control sending of the calibration signals so that the calibration signals are multiplexed and can be distinguished from each other even if the calibration signals overlap by being sent during the same predetermined calibration period;
the control unit carries out control so that the calibration signals according to the feature information are received via the plurality of antennae; and
the control unit carries out control so that power is supplied to each of the plurality of power receiving apparatuses in turn via the plurality of antennae in accordance with respective directions of the plurality of power receiving apparatuses indicated by the calibration signals during a period of power supply,
wherein the control unit does not make the predetermined calibration period between the power supply to each power receiving apparatus, and after the period of power supply to each power receiving apparatus has elapsed, the control unit sends the timing information and the feature information that is different for each power receiving apparatus, again via the communication antenna, to the plurality of power receiving apparatuses.

2. The power supply apparatus according to claim 1, wherein the feature information includes at least one of frequency information, code information, and modulation information pertaining to the sending of the calibration signals by each of the plurality of power receiving apparatuses.

3. The power supply apparatus according to claim 1, wherein the control unit divides the plurality of power receiving apparatuses into groups based on the number of power receiving apparatuses, and sends information pertaining to the sending timing to the plurality of power receiving apparatuses so that each group sends the calibration signals at different timings.

4. The power supply apparatus according to claim 3, wherein the control unit divides the plurality of power receiving apparatuses into groups in the case where the number of the plurality of power receiving apparatuses is greater than a number to which the feature information can be assigned.

5. The power supply apparatus according to claim 1, wherein the control unit further sets an order in which the control unit supplies power to the plurality of power receiving apparatuses in accordance with features of the plurality of power receiving apparatuses, and controls the control unit to output supplied power to the plurality of power receiving apparatuses in accordance with the set power supply order.

6. The power supply apparatus according to claim 5, wherein the control unit sets the power supply order using movement frequency information for taking movement of the plurality of power receiving apparatuses into consideration, the movement frequency information being obtained through the communication antenna.

7. The power supply apparatus according to claim 6, wherein the movement frequency information includes one of device information of a power receiving apparatus, state information of the power receiving apparatus, and sensor information obtained from sensors included in the power receiving apparatus.

8. The power supply apparatus according to claim 5, further comprising a detection unit configured to detect movement in a power receiving apparatus,
wherein the control unit sets the power supply order to prioritize a power receiving apparatus for which movement has been detected over a power receiving apparatus for which movement has not been detected.

9. The power supply apparatus according to claim 8, wherein the control unit sets an amount of time of supplying power to the power receiving apparatus for which movement has been detected to be longer than an amount of time of supplying power to the power receiving apparatus for which movement has not been detected.

10. The power supply apparatus according to claim 5, wherein the control unit obtains a required charging time expressing an amount of charging time required until each power receiving apparatus reaches a usable charge, or information for calculating the required charging times, from the plurality of power receiving apparatuses via the communication antenna, and sets the power supply order using the required charging times.

11. The power supply apparatus according to claim 5, wherein the control unit sets the power supply order so that a power receiving apparatus having shorter required charging times is prioritized.

12. The power supply apparatus according to claim 5, wherein the control unit sets the power supply order based on a power supply efficiency calculated using a power receiving strength of each power receiving apparatus.

13. The power supply apparatus according to claim 12, wherein the power supply efficiency is found from a ratio between a power receiving strength received from a power receiving apparatus and a supplied power strength from the control unit.

14. The power supply apparatus according to claim 12, wherein the control unit sets the power supply order so that a power receiving apparatus having higher power supply efficiencies is prioritized.

15. A control method of a power supply apparatus, the power supply apparatus including a plurality of antennae and a communication antenna and being capable of supplying power wirelessly to a plurality of power receiving apparatuses, the control method comprising:

sending timing information and feature information, via the communication antenna, to the plurality of power receiving apparatuses, wherein the timing information is for controlling the plurality of power receiving apparatuses to send calibration signals at the same time during a same predetermined calibration period, and the feature information is different for each power receiving apparatus to control sending of the calibration signals so that the calibration signals are multiplexed and can be distinguished from each other even if the calibration signals overlap by being sent during the same predetermined calibration period;

receiving the calibration signals according to the feature information via the plurality of antennae; and supplying power to each of the plurality of power receiving apparatuses in turn via the plurality of antennae in accordance with respective directions of the plurality of power receiving apparatuses indicated by the calibration signals during a period of power supply, wherein the predetermined calibration period is not made between the power supply to each power receiving apparatus, and after the period of power supply to each power receiving apparatus has elapsed, sending the timing information and the feature information that is different for each power receiving apparatus, again via the communication antenna, to the plurality of power receiving apparatuses.

16. A non-transitory computer-readable storage medium storing a program for causing a computer to execute a control method of a power supply apparatus, the power supply apparatus including a plurality of antennae and a communication antenna and being capable of supplying power wirelessly to a plurality of power receiving apparatuses, the control method comprising:

sending timing information and feature information, via the communication antenna, to the plurality of power receiving apparatuses, wherein the timing information is for controlling the plurality of power receiving apparatuses to send calibration signals at the same time during a same predetermined calibration period, and the feature information is different for each power receiving apparatus to control sending of the calibration signals so that the calibration signals are multiplexed and can be distinguished from each other even if the calibration signals overlap by being sent during the same predetermined calibration period;

receiving the calibration signals according to the feature information via the plurality of antennae; and supplying power to each of the plurality of power receiving apparatuses in turn via the plurality of antennae in accordance with respective directions of the plurality of power receiving apparatuses indicated by the calibration signals during a period of power supply, wherein the predetermined calibration period is not made between the power supply to each power receiving apparatus, and after the period of power supply to each power receiving apparatus has elapsed, sending the timing information and the feature information that is different for each power receiving apparatus, again via the communication antenna, to the plurality of power receiving apparatuses.

* * * * *